United States Patent
Dray et al.

(10) Patent No.: US 10,655,774 B1
(45) Date of Patent: *May 19, 2020

(54) PIG RAMP, SYSTEM AND METHOD

(71) Applicant: MARKWEST ENERGY PARTNERS, L.P., Denver, CO (US)

(72) Inventors: Danny Lee Dray, Jewett, OH (US); Bryan Anthony Crowe, Uhrichsville, OH (US); David Abraham Fitch, Bridgeport, WV (US); William Lee Sprowls, Washington, PA (US); John Charles Mollenkopf, Bow Mar, CO (US); Dustin Michael Howell, Barnesville, OH (US)

(73) Assignee: MARKWEST ENERGY PARTNERS, L.P., Denver, CO (US)

(*) Notice: Subject to any disclaimer, the term of this patent is extended or adjusted under 35 U.S.C. 154(b) by 23 days.

This patent is subject to a terminal disclaimer.

(21) Appl. No.: 16/246,801

(22) Filed: Jan. 14, 2019

Related U.S. Application Data

(60) Continuation of application No. 16/150,454, filed on Oct. 3, 2018, now Pat. No. 10,408,377, which is a
(Continued)

(51) Int. Cl.
*F16L 55/46* (2006.01)

(52) U.S. Cl.
CPC .................... *F16L 55/46* (2013.01)

(58) Field of Classification Search
CPC .......................................... F16L 55/46
(Continued)

(56) References Cited

U.S. PATENT DOCUMENTS

| 3,303,525 A | 2/1967 | Peoples |
| 3,809,113 A | 5/1974 | Grove |

(Continued)

FOREIGN PATENT DOCUMENTS

| CN | 103497804 | 1/2014 |
| GB | 1179978 | 2/1970 |

OTHER PUBLICATIONS

Douglas Daniel Sampaio Santana, et al., "Estimation of trajectories of pipelines PIGs using inertial measurements and non linear sensor fusion," Industry Applications (Induscon), 2010 9th IEEE/IAS International Conference, Sao Paulo, Brazil, Nov. 8-10, 2010, http://ieeexplore.ieee.org/xpl/login.jsp?tp=&arnumber=5739911&url=http%3A%2F%2Fieeexplore.ieee.org%2Fxpls%2Fabs_all.jsp%3Farnumber%3D5739911, abstract only.
(Continued)

*Primary Examiner* — Laura C Guidotti
(74) *Attorney, Agent, or Firm* — Womble Bond Dickinson (US) LLP

(57) ABSTRACT

Embodiments of the present disclosure include a pig ramp for receiving and supporting a pig in a pig receiver includes a frame portion having an inner diameter, the inner diameter of the ring being larger than an outer diameter of a pig. The pig ramp also includes one or more ramp segments extending longitudinally away from the frame portion, the one or more ramp segments being coupled to a back side of the frame portion at a lower portion and positioned to receive and support the pig when positioned thereon to elevate the pig above a bottom of a tubular.

25 Claims, 35 Drawing Sheets

Related U.S. Application Data continuation of application No. 15/987,057, filed on May 23, 2018, now Pat. No. 10,197,206, which is a continuation of application No. 15/896,172, filed on Feb. 14, 2018, now Pat. No. 10,012,340, which is a continuation of application No. 15/896,149, filed on Feb. 14, 2018, now Pat. No. 10,094,508, which is a division of application No. 15/798,479, filed on Oct. 31, 2017, now Pat. No. 10,001,240.

(60) Provisional application No. 62/416,646, filed on Nov. 2, 2016.

(58) Field of Classification Search
USPC .................................................. 15/104.062
See application file for complete search history.

(56) References Cited

U.S. PATENT DOCUMENTS

| | | | |
|---|---|---|---|
| 3,961,493 | A | 6/1976 | Nolan, Jr. |
| 4,073,303 | A | 2/1978 | Foley, Jr. |
| 4,457,037 | A | 7/1984 | Rylander |
| 5,595,709 | A | 1/1997 | Klemp |
| 5,962,774 | A | 10/1999 | Mowry |
| 6,022,421 | A | 2/2000 | Bath |
| 6,834,531 | B2 | 12/2004 | Rust |
| 7,749,308 | B2 | 7/2010 | McCully |
| 7,815,744 | B2 | 10/2010 | Abney et al. |
| 8,312,584 | B2 | 11/2012 | Hodde |
| 8,413,484 | B2 | 4/2013 | Lubkowitz |
| 9,175,235 | B2 | 11/2015 | Kastner |
| 9,310,016 | B2 | 4/2016 | Hodde |
| 9,329,066 | B2 | 5/2016 | Skarping |
| 9,518,693 | B2 | 12/2016 | Hodde |
| 10,001,240 | B1 | 6/2018 | Dray et al. |
| 10,012,340 | B1 | 7/2018 | Dray et al. |
| 10,094,508 | B1 | 10/2018 | Dray et al. |
| 10,408,377 | B1 * | 9/2019 | Dray ................... F16L 55/46 |
| 2006/0125826 | A1 | 6/2006 | Lubkowitz |
| 2012/0185220 | A1 | 7/2012 | Shippen |
| 2013/0125323 | A1 | 5/2013 | Henderson |
| 2014/0176344 | A1 | 6/2014 | Littlestar |
| 2014/0345370 | A1 | 11/2014 | Marotta |
| 2015/0323119 | A1 | 11/2015 | Giunta |
| 2016/0091467 | A1 | 3/2016 | Morris |
| 2016/0169436 | A1 | 6/2016 | Sander et al. |
| 2016/0175634 | A1 | 6/2016 | Radian |
| 2016/0363249 | A1 | 12/2016 | Disher |
| 2016/0369930 | A1 | 12/2016 | Poe et al. |

OTHER PUBLICATIONS

Ferdinando Felli, et al., "Structural Health Monitoring of Pipelines for Environment Pollution Mitigation," ASME 2015 Conference on Smart Materials, Adaptive Structures and Intelligent Systems, Volume 2: Integrated System Design and Implementation; Structural Health Monitoring; Bioinspired Smart Materials and Systems; Energy Harvesting, Colorado Springs, CO, USA, Sep. 21-23, 2015, http://proceedings.asmedigitalcollection.asme.org/proceeding.aspx?articleid=2481537, abstract only.

Gerhard Geiger, "Pipeline Leak Detection Technologies and Emergency Shutdown Protocols," 2014 10th International Pipeline Conference, Volume 1: Design and Constructions; Environment; Pipeline Automation and Measurement, Calgary, Alberta, Canada, Sep. 29-Oct. 3, 2014, http://proceedings.asmedigitalcollection.asme.org/proceeding.aspx?articleid=2022559, abstract only.

* cited by examiner

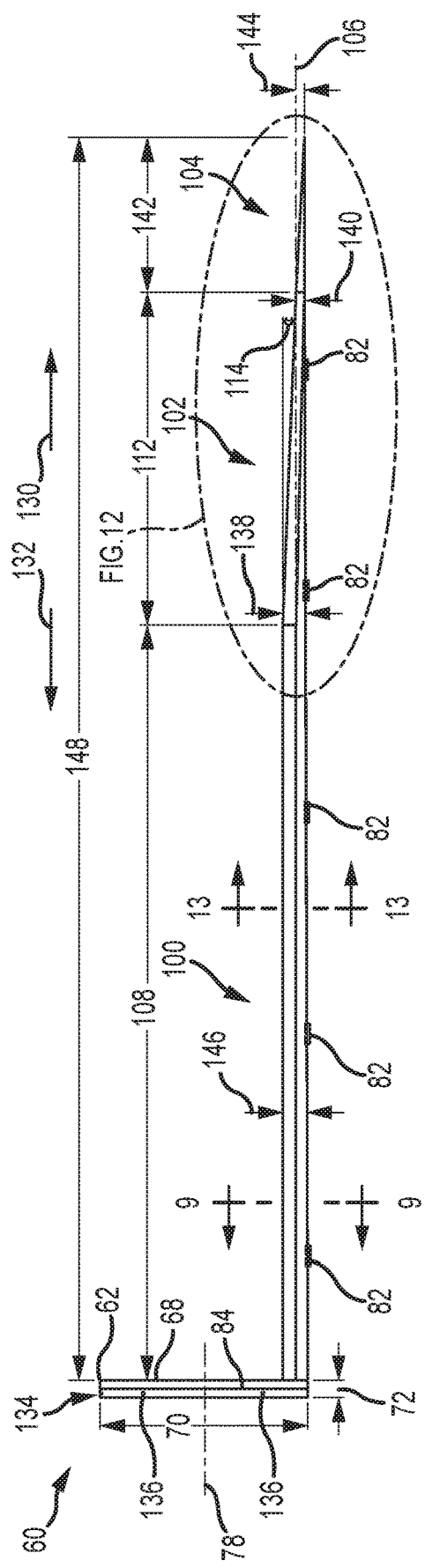
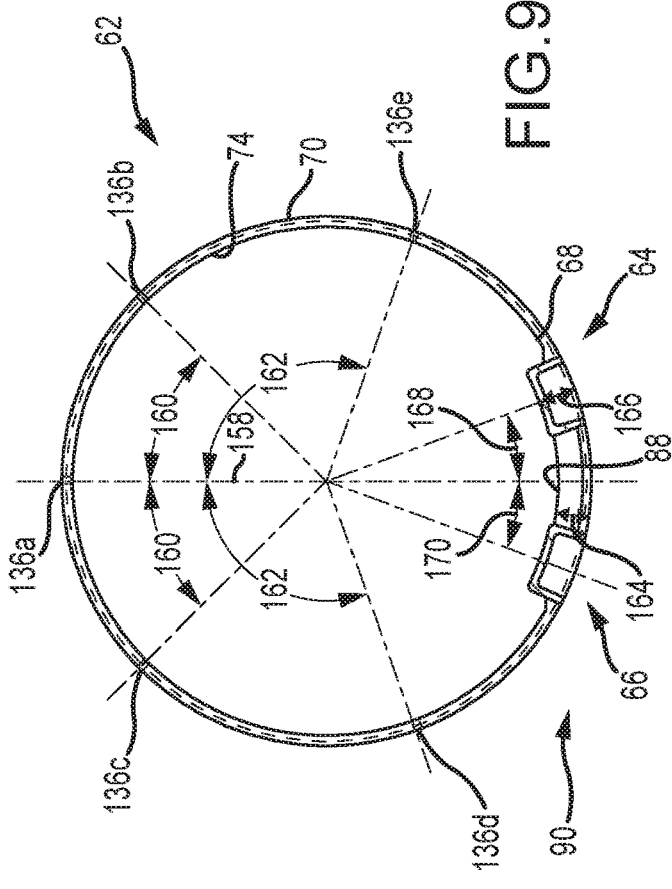
FIG.8
FIG.9

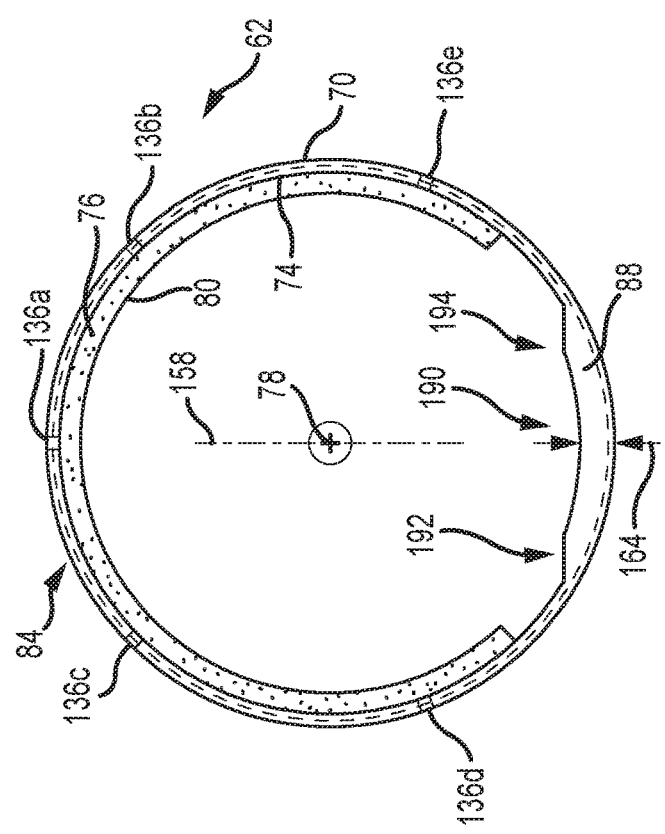
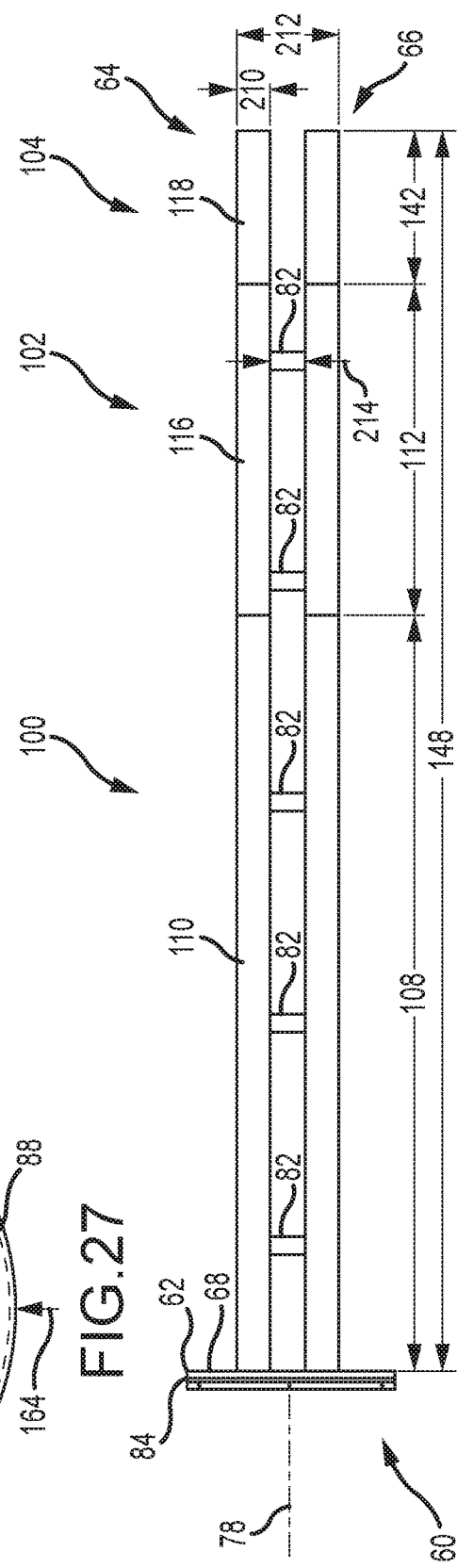
FIG.27
FIG.28

PIG RAMP, SYSTEM AND METHOD

CROSS-REFERENCE TO RELATED APPLICATIONS

This application claims the benefit of, and is a continuation of U.S. patent application Ser. No. 16/150,454, filed Oct. 3, 2018, titled "PIG RAMP, SYSTEM AND METHOD," which is a continuation of U.S. patent application Ser. No. 15/987,057, filed May 23, 2018, titled "PIG RAMP, SYSTEM AND METHOD," which is a continuation of U.S. patent application Ser. No. 15/896,172, filed Feb. 14, 2018, titled "PIG RAMP, SYSTEM AND METHOD," now U.S. Pat. No. 10,012,340, issued Jul. 3, 2018, which is a continuation of U.S. patent application Ser. No. 15/896,149, filed Feb. 14, 2018, titled "PIG RAMP, SYSTEM AND METHOD," now U.S. Pat. No. 10,094,508, issued Oct. 9, 2018, which is a divisional of U.S. patent application Ser. No. 15/798,479, filed Oct. 31, 2017, titled "PIG RAMP, SYSTEM AND METHOD," now U.S. Pat. No. 10,001,240, issued Jun. 19, 2018, which is related to, and claims the benefit of, U.S. Provisional Application No. 62/416,646, filed Nov. 2, 2016, titled "PIG RAMP SYSTEM AND METHOD," all of which are incorporated herein by reference in their entireties.

BACKGROUND

1. Field of the Invention

The present disclosure relates to hydrocarbon pipeline inspection and maintenance services. More particularly, the present disclosure relates to systems and methods for reducing emissions during pipeline inspection and maintenance services.

2. Description of Related Art

Pipelines are utilized for the transportation of goods or materials through tubular structures (e.g., pipes) over distances. In some cases, the goods or materials can include crude and refined petroleum products, fuels, and other fluids (e.g., sewage, slurry, water). Typically, pipelines include compressor and/or pumping stations to add energy to the goods or materials to drive the goods or materials through the pipeline, thereby enabling efficient transportation of goods or materials over long distances at a lower cost than other transportation methods, such as utilizing trucks, rail roads, or ships. In the oil and gas industry, the pipelines typically include hydrocarbon products such as crude oil, refined oil products, gaseous fuels (e.g., natural gas, liquefied natural gas, etc.), and the like for transportation from a refinery, well site, port, or storage facility. Because the hydrocarbon products are potentially hazardous if released into the atmosphere and areas surrounding the pipeline, such as soil for buried pipelines, pipelines are routinely inspected for leakage and/or thinning wall areas. In certain instances, a pig instrument is used during inspection. Moreover, pipelines may be cleaned to increase throughout utilizing the pig instrument. Pigging of the pipeline is done without stopping the flow in the pipeline because the product provides the energy to drive the pig through the pipeline. As a result, pipelines can include a number of pig launchers and/or pig receivers to introduce the pigs into the pipeline for various maintenance activities. Upon completion, the pig is removed from the pipeline. As the pig is driven through the pipeline, fluids may accumulate in front of the pig and around the sides of the pig. It is now recognized that new systems and methods for removing pigs from pig receivers are desired.

SUMMARY

Applicants recognized that there is a risk that fluids may be released to the atmosphere when the pig is removed from the pipeline, other problems noted above herein. Applicants conceived and developed embodiments of systems and methods, according to the present disclosure, for pipeline inspection, maintenance and other pipeline services.

In an embodiment, a pig ramp for receiving and supporting a pig in a pig receiver includes a frame portion having an inner diameter. The inner diameter of the ring, for example, may be larger than an outer diameter of a pig. The pig ramp also includes one or more ramp segments extending longitudinally away from the frame portion. The one or more ramp segments may be connected to a back side of the frame portion at a lower portion and positioned to receive and support the pig when positioned thereon to elevate the pig above a bottom of a tubular.

In another embodiment, a system for receiving and supporting a pig positioned within a pig receiver includes a tubular forming at least a portion of the pig receiver. The tubular, has, for example, an outlet with a moveable cover. The system also includes a pig ramp positioned within an interior volume of the tubular. The pig ramp has one or more ramp segments arranged near a lower portion of the pig receiver to receive and support the pig above a lower wall of the tubular when the pig is positioned on the pig ramp.

In an embodiment, a method of removing a pig from a pig receiver includes opening the pig receiver having the pig positioned therein. The pig, for example, may be positioned on a pig ramp arranged within an interior volume of the pig receiver. The method also includes moving the pig through a frame portion of the pig ramp. The frame portion has a seal extending radially outward such that a substantially fluid tight seal is formed between the frame portion of the pig ramp and a bore of the pig receiver. The method further may include damming fluid accumulated within the pig receiver via the frame portion of the pig ramp. The frame portion blocks the accumulated fluid from flowing through an outlet of the pig receiver when the pig is removed from the pig receiver.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

FIG. 8 is a side elevational view of the pig ramp of FIG. 6, in accordance with an embodiment of the present disclosure;

FIG. 9 is a rear cross-sectional view, taken along line 9-9, of the pig ramp of FIG. 6, in accordance with embodiments of the present disclosure;

FIG. 27 is a front elevational view of the pig ramp of FIG. 23, in accordance with an embodiment of the present disclosure;

FIG. 28 is a top plan view of the pig ramp of FIG. 23, in accordance with an embodiment of the present disclosure;

DETAILED DESCRIPTION

Figure 1:
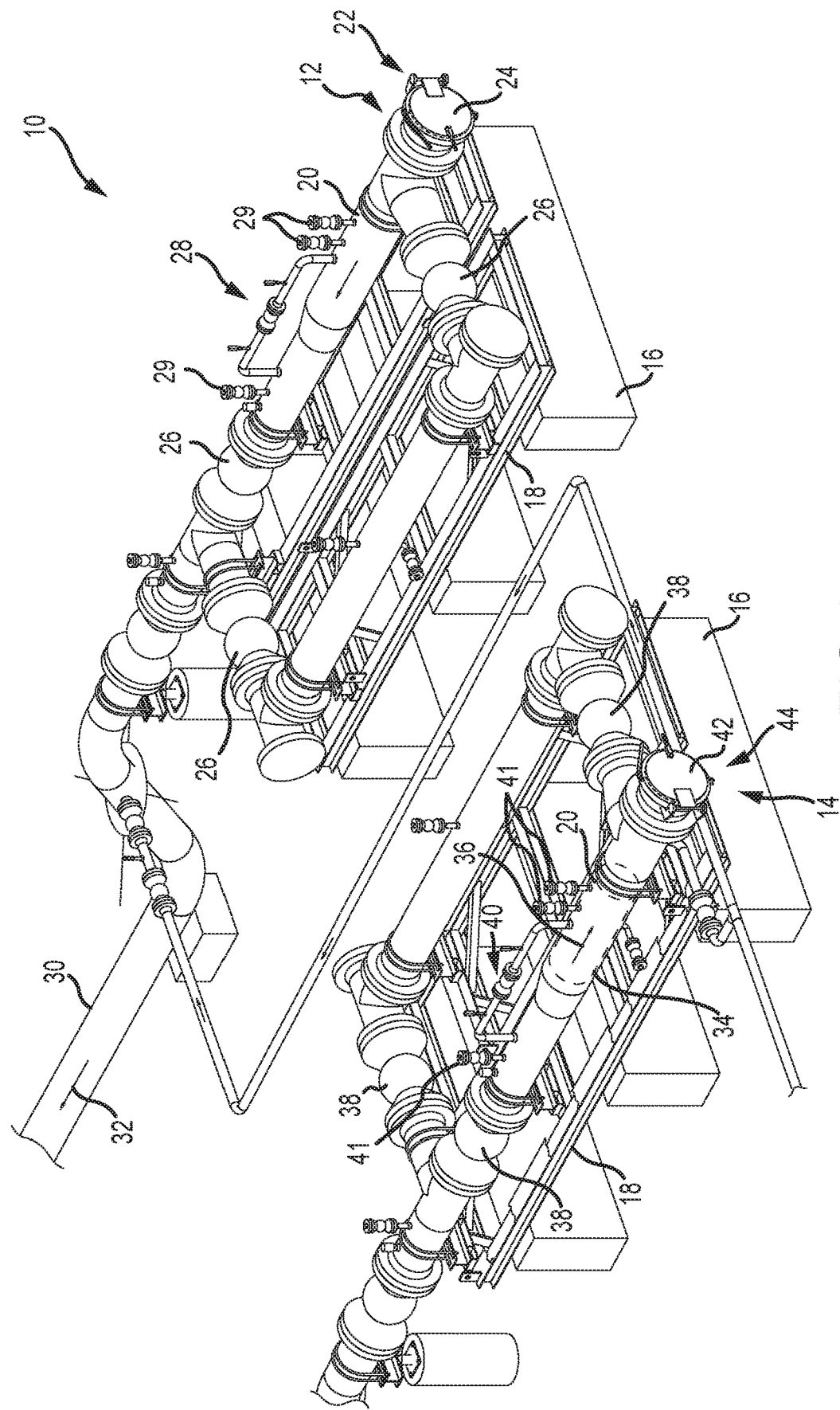
FIG. 1 is a perspective view of an embodiment of a pig launching and receiving station, in accordance with an embodiment of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a pig ramp formed, at least partially, by a ring (e.g., a frame) and a pair of ramp segments extending longitudinally away from the ring. In certain embodiments, the ramp segments are arranged at an angle relative to a radial axis of the pig ramp. By arranging the ramp segments at an angle, the ramp segments are positioned to receive a pig having a generally cylindrical shape. Moreover, the weight of the pig is distributed along the pig ramp due to the angled position of the ramp segments. In certain embodiments, the ramp segments are coupled together by a plurality of ramp connectors. As such, the structural integrity of the ramp segments is improved to receive and support the weight of the pig. In certain embodiments, the pig ramp includes a seal positioned about the frame. The seal is arranged to block fluid flow downstream of the pig ramp. That is, the seal, in combination with the frame, form a dam that substantially blocks fluid from flowing downstream of the pig ramp. In certain embodiments, the ring includes a gasket extending radially inward toward a longitudinal axis of the pig ramp. The gasket forms an inner diameter that is smaller than an outer diameter of the pig. As a result, as the pig is moved through the ring, the gasket contacts the outer diameter of the pig and scrapes and/or removes accumulated debris and liquid. In this manner, the pig can be cleaned before being removed from a pig receiver, thereby reducing emissions due to removal of the pig.

FIG. 1 is a front perspective view of an embodiment of a launching and receiving station 10. As shown in the illustrated embodiment, the launching and receiving station 10 includes a pig launcher 12 and a pig receiver 14. As used herein, pig refers to a device or mechanism inserted into a tubular (e.g., pipe) that performs various inspection and or maintenance operations, such as cleaning the interior of the tubular, detecting pipe wall thickness, detecting leaks, or the like. The pig launcher 12 includes a skid 16 having a frame 18 that supports sections of tubulars 20 in the form of pipes forming at least a portion of the respective pig launcher 12 and pig receiver 14. While the illustrated embodiment is described as a skid 16, it should be appreciated that in certain embodiments the launching and receiving station 10 may not be skid mounted. That is, the launching and receiving station 10 may include footers (e.g., concrete footers) to form a substantially stationary launching and receiving station 10. As illustrated, various valving and piping structures known to one skilled in the art are incorporated into the skid 16, and therefore a detailed description of these components is omitted.

In operation, a pig is inserted into the pig launcher 12 via an inlet 22 having a door 24. As will be appreciated, block valves 26 are arranged downstream of the door 24, along with an equalization line 28 and vents 29 to enable the inlet 22 to be effectively isolated from a pipeline 30. As a result, the pig can be inserted into the inlet 22 while the pipeline 30 is flowing materials (e.g., hydrocarbons, water, refined products, etc.) as illustrated by the arrow 32. For example, the pig launcher 12 may be depressurized before the door 24 is opened, for example, via the vents 29. Moreover, before the door 24 is opened, the block valves 26 may be moved to a closed position to effectively isolate the pig launcher 12 from the pipeline 30. After the pig 34 is installed, the door 24 can be closed and the block valves 26 may be moved to the open position to facilitate injection of the pig 34 into the pipeline 30. In this manner, routine inspection and maintenance of the pipeline 30 may be performed without impacting the flow materials through the pipeline 30.

In the illustrated embodiment, the pig receiver 14 is arranged proximate the pig launcher 12. As will be understood by one skilled in the art, the pipeline 30 is typically arranged to travel between two points arranged a distance apart from one another, often many miles, and therefore, the pig inserted into the pig launcher 12 may not return to the pig receiver 14. Instead, a second launching and receiving station 10 may be arranged downstream along the pipeline 30 to receive the pig inserted at the pig launcher 12. The pig receiver 14 may receive a pig 34 inserted into the pipeline 30 at a different location downstream from the pig receiver 14, as illustrated by the arrow 36. In the illustrated embodiment, the pig receiver 14 includes block valves 38, an equalization line 40, and vents 41 to enable the operator to effectively isolate the pig receiver 14 from the pipeline 30, thereby enabling the removal of the pig 34 from the pig receiver 14. For example, as the pig 34 is received by the pig receiver 14, one or more of the block valves 38 may be moved to the closed position to isolate the pig receiver 14 from the pipeline 30. Thereafter, the pig receiver 14 may be vented via the vents 41 to reduce the pressure in the pig receiver 14. Moreover, in certain embodiments, the pig 34 may be "stuck" or otherwise blocked within the pig receiver 14 due to the pressure in the line. As a result, the equalization line 40 may be utilized to selectively clear pressure from upstream and/or downstream of the pig 34, thereby unblocking the pig 34 within the pig receiver 14. Thereafter, the door 42 is moved to an open position to enable removal of the pig 34 through an outlet 44.

In certain embodiments, the pig 34 is utilized to clean and/or clear a section of the pipeline 30 during cleaning, flooding, de-watering, commissioning, and/or de-commissioning. For example, the pig 34 may include seals and/or gaskets, magnets, brushes, discs, cups, and/or the like that extend along an outer circumference and contact an inner diameter of the pipeline 30. As the pig 34 is propelled through the pipeline 30, for example, by the flowable material in the pipeline 30, liquids, debris, scale, sedimentation, and the like (e.g., build up) that has accumulated along the inner diameter of the pipeline 30 may be loosened and removed from the inner diameter of the pipeline 30. As a result, the inner diameter of the pipeline 30 may be effectively increased, thereby enabling larger throughout, which leads to greater efficiencies for operators. As will be described in detail below, when the pig 34 reaches the pig receiver 14, the debris, scale, sedimentation, liquids, and the like may be in various positions along the length of the pig 34, such as at the tip or between the seals, gaskets, magnets, brushes, etc. Moreover, liquids may accumulate upstream of the pig 34 and/or along the sides of the pig 34. In certain embodiments, this build up and fluid accumulation may be formed from materials that contain hydrocarbon products, and therefore, emissions to the atmosphere may result. As a result, removing the pig 34 from the pig receiver 14 may lead to emissions. As will be described in detail below, the use of a pig ramp may reduce these emissions, thereby improving the environmental quality of removing the pig 34 from the pig receiver 14.

Figure 2:
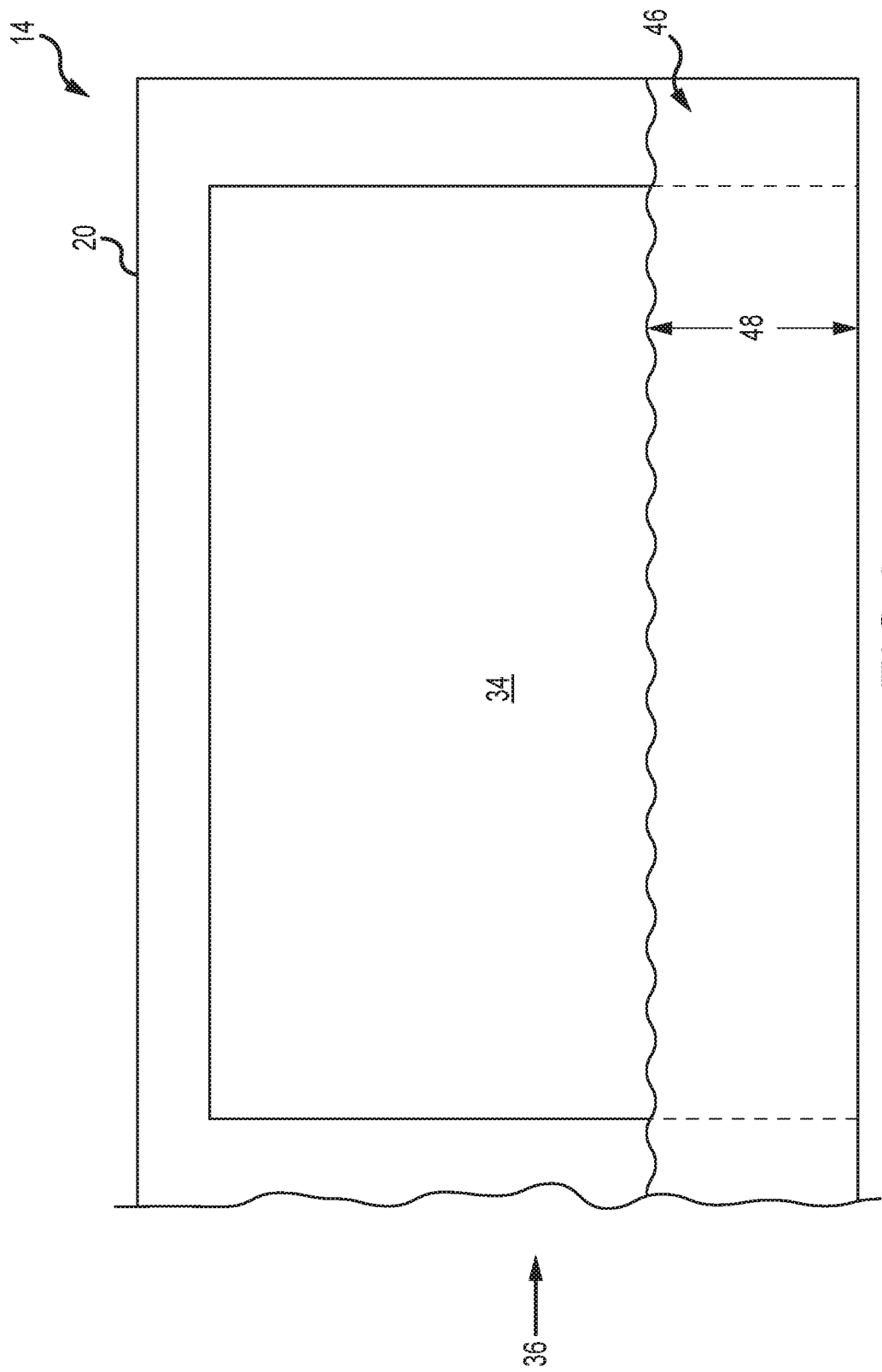
FIG. 2 is a schematic side elevational view of a prior art arrangement of a pig within a pig receiver.

FIG. 2 is a schematic side elevational view of the pig 34 positioned in the pig receiver 14. As shown, when the pig 34 is arranged within the pig receiver 14, the pig 34 sits on the bottom of the tubular 20, due to gravity and the weight of the pig 34. As a result, the pig 34 is in direct contact with the tubular 20. This contact applies a force to the pig 34 that may lead to deformation and/or damage to certain components of the pig 34, such as brushes or sensors. It should be appreciated that the illustrated pig 34 has been simplified for this discussion, and in certain embodiments the pig 34 may include various instruments, different diameters along the length of the pig, and the like. Moreover, as will be described below, traditional methods of pig 34 typically lead to emission events.

In operation, the pig 34 is transported through the pipeline 30 via the force applied by the fluids and/or materials traveling through the pipeline 30. As a result, in certain embodiments, fluid 46 (such as the working fluid, pipeline drip liquids, or the like) may accumulate around the pig 34, for example, in front of the pig 34 or along the sides of the pig 34. Moreover, because the pig 34 may deform when sitting in the pig receiver 14, thereby conforming to the tubular 20, the fluid 34 positioned downstream of the pig 34 may be dammed or blocked between the pig 34 and the door 42. As a result, when the pig receiver 14 is depressurized and opened, the fluid 46 may exit the pig receiver 14 as the pig 34 is removed, thereby causing an emission event. It should be appreciated that the quantity of fluid 46 in the pig receiver 14 varies due to the size of the tubular 20. However, in certain embodiments, up to twenty gallons of fluid 46 may accumulate in the pig receiver 14 and be released when the pig receiver 14 is opened.

In the illustrated embodiment, the fluid 46 forms a liquid level 48 within the tubular 20 of the pig receiver 14. That is, the fluid 46 accumulates (e.g., between the door 42 and the pig 34) along the length of the pig 34. However, it should be appreciated that in certain embodiments the fluid 46 will not accumulate around all sides of the pig 34. For example, in embodiments where the pig receiver 14 is positioned at a downward angle to facilitate drainage, the fluid 46 and the liquid level 48 may be arranged predominantly in the "dammed" area between the pig 34 and the door 42. As will be appreciated, flow of the fluid in the direction 36 drives the fluid 46 along and in front of the pig 34, thereby capturing the fluid 46 downstream of the pig 34. As described above, this fluid 46 may be released during pig removal, resulting in emissions.

Figure 3:
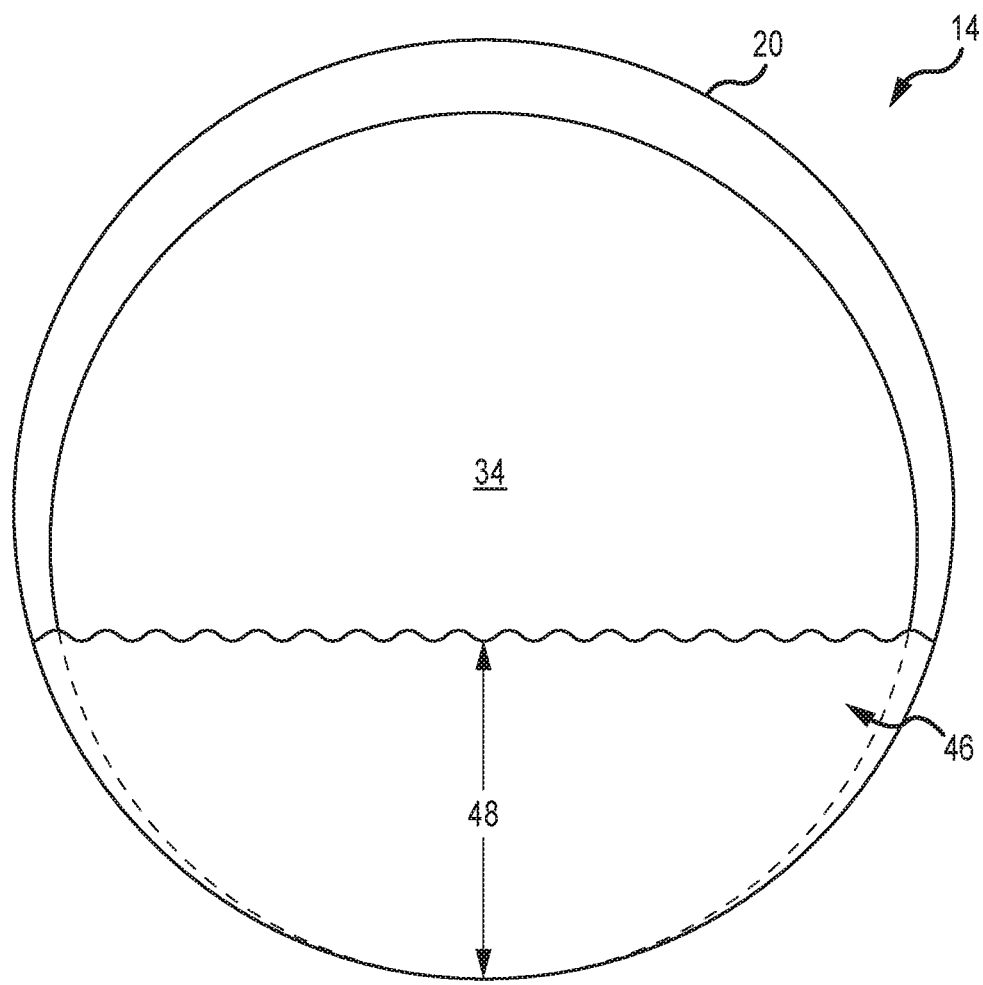
FIG. 3 is a schematic front elevational view of a prior art arrangement of a pig within a pig receiver.

FIG. 3 is a front elevational view of the pig 34 arranged within the pig receiver 14. As described above, as the pig 34 rests on the bottom of the tubular 20, the weight of the pig 34 may deform the pig 34, thereby blocking the fluid 46 from flowing out of the pig receiver 14. That is, the fluid 46 is dammed between the pig 34 and the door 42. As such, the fluid 46 accumulates and forms the liquid level 48. It should be appreciated that the height of the liquid level 48 may vary based on the size of the pig receiver 14. For example, the liquid level 48 may be a quarter inch, a half inch, one inch, two inches, three inches, or any other reasonably height. As such, a quantity of fluid 46 is positioned between the pig 34 and the door 42, thereby increasing the likelihood of an emission event when the door 42 is opened.

Figure 4:
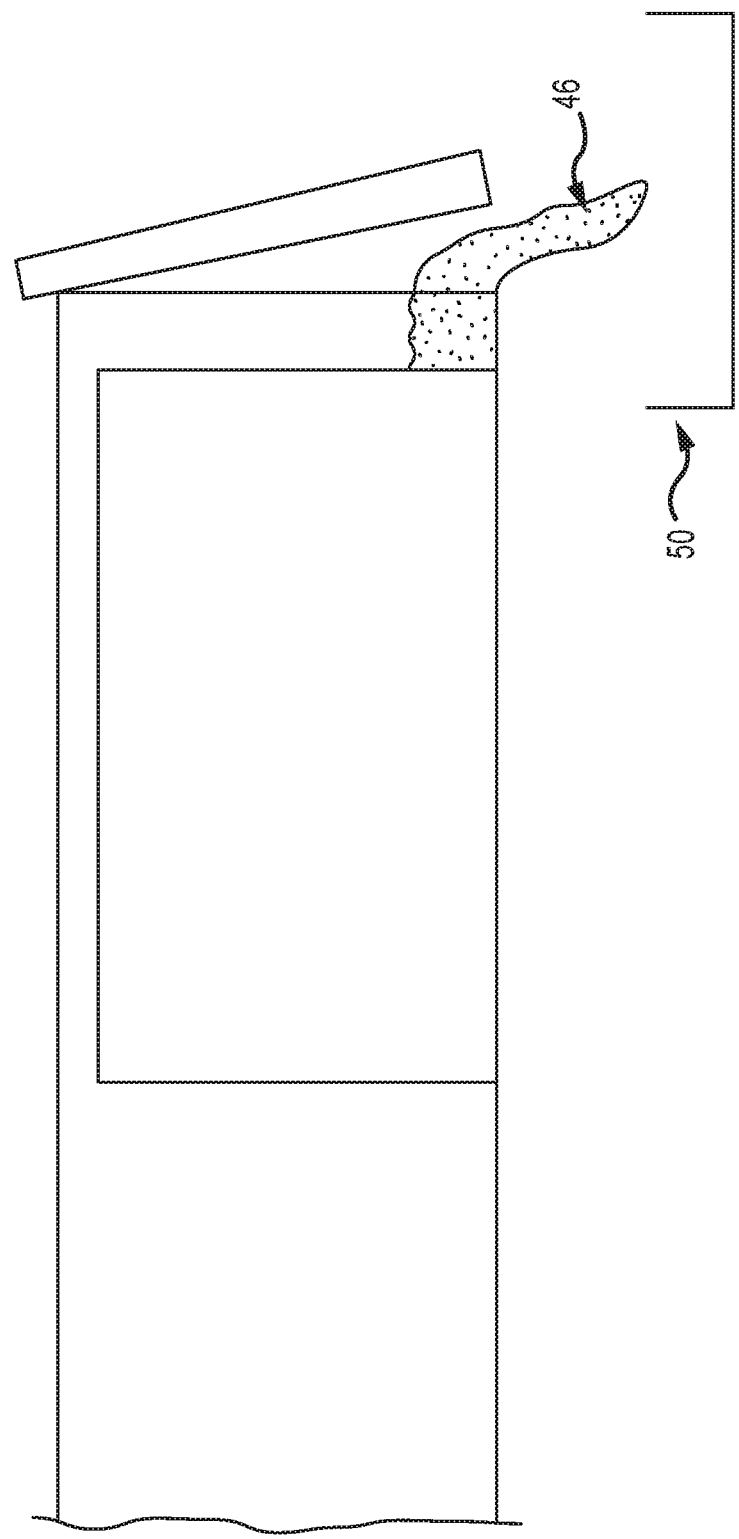
FIG. 4 is a schematic side elevational view of a prior art arrangement of a pig being removed from a pig receiver.

FIG. 4 is a schematic side view of the pig receiver 14 being opened to facilitate removal of the pig 34. In the illustrated embodiment, the pig receiver 14 is opened by removing the door 42 from its position covering the outlet 44. As described above, in certain embodiments, the fluid 46 accumulates between the pig 34 and the door 42 due, at least in part, to the deformation of the pig 34 as the pig 34 rests on the tubular 20. As a result, as the door 42 is opened, the fluid 46 flows out of the tubular 20 and into the container 50. As described above, in certain embodiments, the quantity of fluid 46 contained between the pig 34 and the door 42 (and/or along the pig 34) may result in emissions. Accordingly, it is now recognized that improved methods of draining the pig receiver 14 before removing the pig 34 are desirable.

Figure 5:
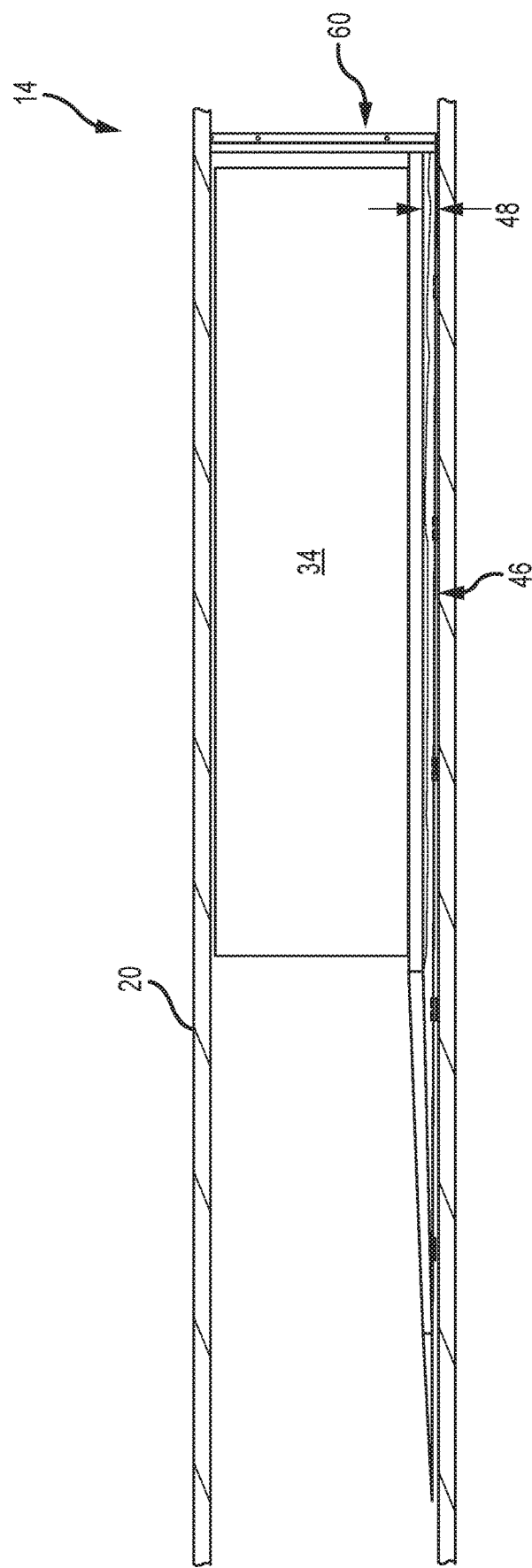
FIG. 5 is a schematic sectional view of an embodiment of a pig arranged on a pig ramp, in accordance with an embodiment of the present disclosure.

FIG. 5 is a schematic side elevational view of the pig 34 positioned within the pig receiver 14 and on a pig ramp 60. As will be described in detail below, the pig ramp 60 is a removable component that may be inserted into the tubular 20 forming at least part of the pig receiver 14. In the illustrated embodiment, the pig ramp 60 includes a ring 62 (e.g., a frame component) having a pair of ramp segments 64, 66 extending longitudinally into the tubular 20. The ramp segments 64, 66 receive and support the pig 34, thereby lifting the pig 34 from the bottom of the tubular 20 to facilitate drainage of the fluid 46 before the pig 34 is removed from the pig receiver 14. Moreover, as shown in the illustrated embodiment, the ring 62 blocks the fluid 46 from accumulating near the outlet 44 and/or door 42. That is, the ring 62 acts as a dam for fluid 46 to block the fluid 46 from extending to the door 42. As will be described below, in operation, the pig 34 is removed through the ring 62, and as a result, the ring 62 remains substantially stationary in the tubular 20, thereby facilitating blocking flow of the fluid 46 out of the pig receiver 14.

As described above, the ramp segments 64, 66 lift the pig 34 upwards and away from the bottom of the tubular 20, thereby enabling the fluid 46 accumulated around and in front of the pig 34 to drain away from the door 42. Moreover, because the pig 34 is elevated on the ramp segments 64, 66, the fluid 46 on the pig 34 may also drain off of the pig 34 via gravity. That is, the operator may wait to remove the pig 34 from the pig receiver 14 after the pig 34 is on the pig ramp 60 to provide time for the fluid 46 is drain off of the pig 34 and for the fluid 46 to drain back into the tubular 20 and away from the door 42. Moreover, in certain embodiments, the tubular 20 may be angled (e.g., angled away from the door 42) to further facilitate drainage.

Figure 6:
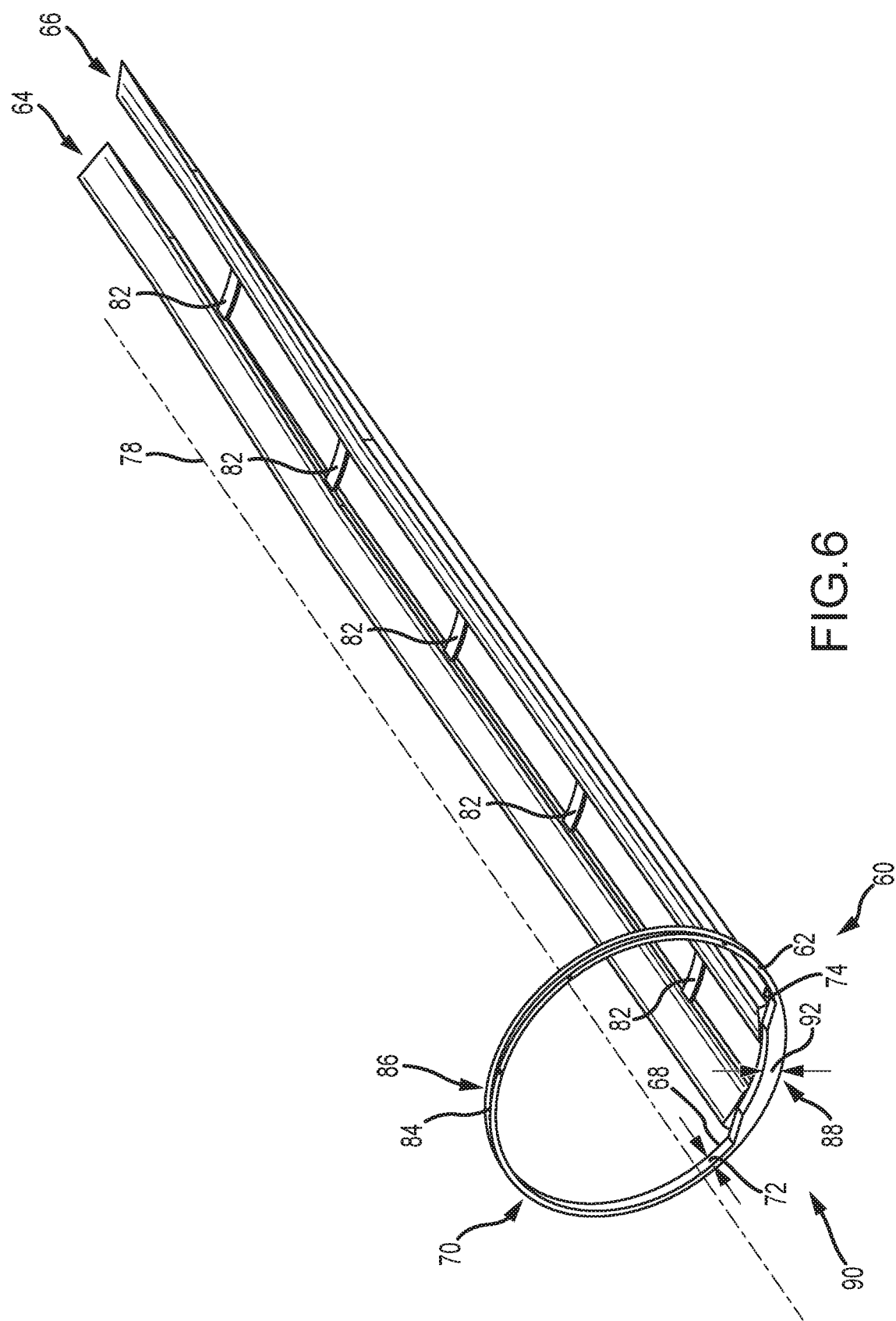
FIG. 6 is a perspective view of an embodiment of a pig ramp, in accordance with an embodiment of the present disclosure.

FIG. 6 is a front perspective view of an embodiment of the pig ramp 60 for use in the pig receiver 14. In the illustrated embodiment, the pig ramp 60 includes the ring 62 (e.g., the frame) and the pair of ramp segments 64, 66 extending from the ring 62. As will be described below, in certain embodiments the ramp segments 64, 66 are coupled to the ring 62 at an angle (e.g., along the curvature of the ring 62) to facilitate receiving and supporting the pig 34. That is, the weight of the pig 34 may be distributed about the ramp segments 64, 66 efficiently because the ramp segments 64, 66 are disposed at an angle to not only conform to the generally cylindrical shape of the pig 34, but to also distribute the forces over a greater area. In the illustrated embodiment, the ramp segments 64, 66 are coupled to a back side 68 of the ring 62. In operation, the back side 68 and the ramp segments 64, 66 will extend into the pig receiver 14 in a direction opposite the flow of the pig 34 (e.g., opposite arrow 36 in FIG. 1). As will be described below, the pig 34 travels along the ramp segments 64, 66 toward the ring 62 for subsequent removal from the pig receiver 14.

In the illustrated embodiment, the ring 62 has a substantially cylindrical shape that enables the ring 62, and the pig ramp 60 itself, to be inserted into the pig receiver 14 such that the ring 62 substantially corresponds to the inner diameter of the pig receiver 14. In other words, an outer diameter 70 of the ring 62 is particularly selected to fit within the inner diameter of the tubular 20 that forms at least a portion of the pig receiver 14. However, it should be appreciated that the frame-like ring 62 may not be generally cylindrical in all embodiments. For example, the ring 62 may be arcuate, elliptical, polygonal, or any other shape that facilitates insertion and removal from the pig receiver 14. As illustrated, the ring 62 has a thickness 72 and an inner diameter 74. The inner diameter 74 is necessarily smaller than the inner diameter of the tubular 20, and therefore provides reduced clearance for the pig 34 when the pig 34 is removed from the pig receiver 14. As will be described below, this reduced diameter enables the pig ramp 60 to remove debris and/or liquid that is stuck to the pig 34 before removal from the pig receiver 14, thereby reducing emission events caused by the removal of the pig 34. Moreover, in certain embodiments, varying the inner diameter 74 may reduce the weight of the pig ramp 60, thereby making it easier to install and remove the pig ramp 60 from the pig receiver 14. For example, in certain embodiments, debris, paraffin, salt, and the like may accumulate on and around the pig ramp 60. By facilitating removal for cleaning, the pig ramp 60 may be used efficiently for longer periods of time.

Returning to the ramp segments 64, 66, in the illustrated embodiment the ramp segments 64, 66 extend longitudinally along a longitudinal axis 78 and are coupled together via a plurality of ramp connectors 82. While the illustrated embodiment includes the plurality of ramp connectors 82, in other embodiments there may be only one ramp connector 82 or no ramp connectors 82. As will be described below, in certain embodiments the ramp connectors 82 includes a curve or bend due to the angular mounting of the ramp segments 64, 66 to the ring 62. Moreover, the angular bend of the ramp connectors 82 redistributes forces along the curved edge more effectively than a straight edge would. However, it should be appreciated that each ramp connector 82 may not be identical. For example, some ramp connectors 82 may include curved edges while other ramp connectors may have substantially straight edges.

In the illustrated embodiment, the ring 62 includes a groove 84 formed along the circumference of the ring 62. In certain embodiments, the groove 84 may receive a seal 86 that is positioned, at least partially, within the groove 84. For example, a portion of the seal 86 may extend radially outward from the groove 84. The seal 86 may form a barrier between the ring 62 and the inner diameter of the tubular 20 of the pig receiver 14, thereby substantially blocking liquid or gaseous emission from flowing out of the pig receiver 14 through the space between the ring 62 and the tubular 20. In other words, the ring 62 along with the seal 86 may be utilized to effectively dam the fluid 46 from flowing toward the outlet 44 when the pig 34 is removed from the pig receiver 14, thereby reducing the likelihood of an emission event. Moreover, the seal 86 may be utilized to maintain the position of the pig ramp 60 within the pig receiver 14. For example, as described above, product flowing through the pipeline 30 is utilized to drive movement of the pig 34 through the pipeline 30. In certain embodiments, the pig 34 may impart a force on the pig ramp 60 when the pig 34 is driven toward the pig receiver 14. The seal 86 may, at least partially, absorb a portion of the force imparted by the pig 34, thereby preventing the pig ramp 60 from moving or sliding within the pig receiver 14.

Furthermore, as shown in the illustrated embodiment, the ring 62 includes a lip 88 at a lower portion 90 of the ring 62. As will be described below, the lip 88 extends radially inward toward the longitudinal axis 78 and forms a surface that enables the ramp segments 64, 66 to couple to the ring 62. This is, because a thickness 92 of the lip 88 is greater than the thickness 72 of the ring 62, larger forces can be transmitted to the lip 88, thereby improving the reliability and longevity of the pig ramp 60.

Figure 7:
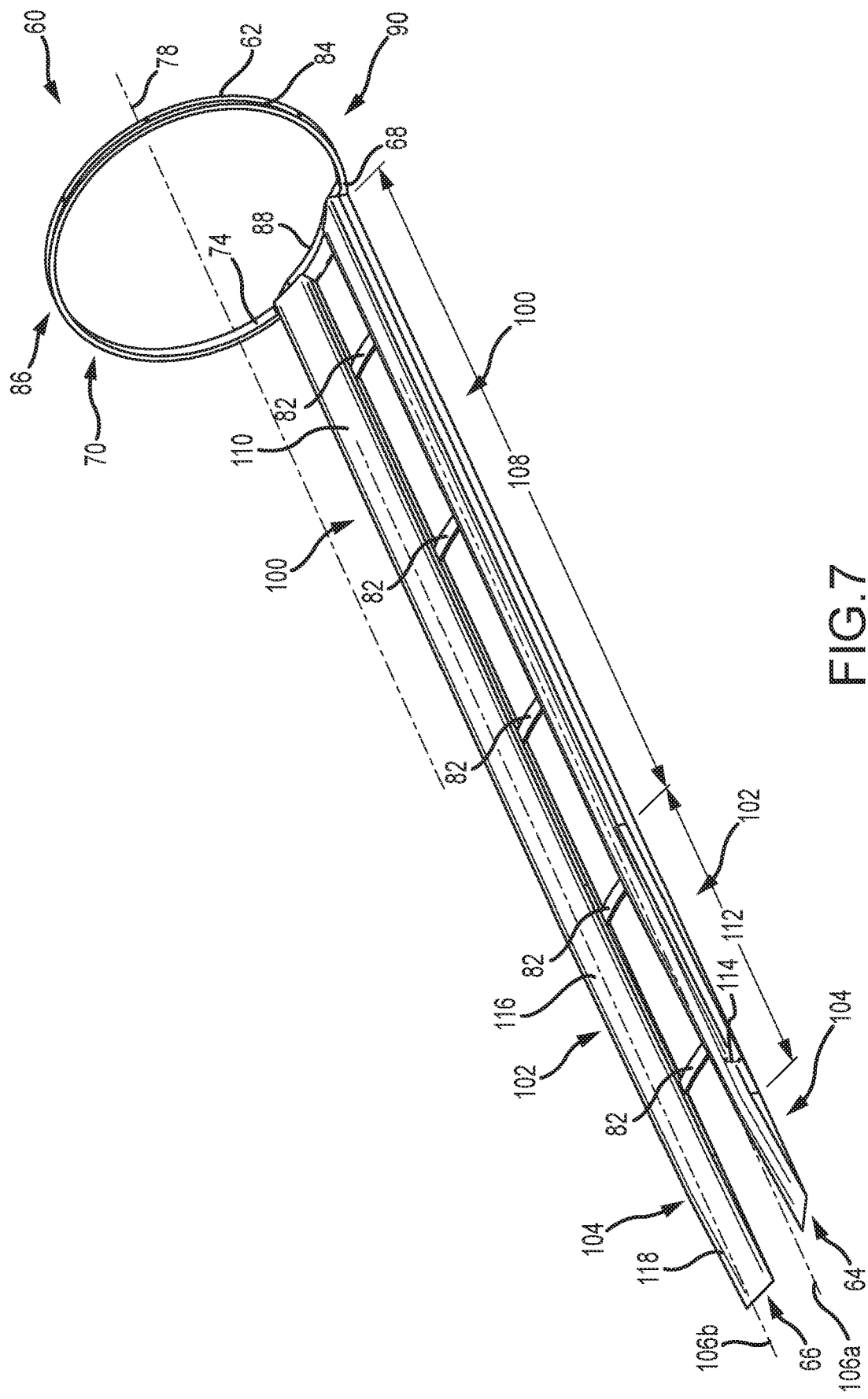
FIG. 7 is another perspective view of the pig ramp of FIG. 6, in accordance with an embodiment of the present disclosure.

FIG. 7 is a rear perspective view of the pig ramp 60. As shown in the illustrated embodiment, the ramp segments 64, 66 extend longitudinally away from the ring 62 and substantially parallel to the longitudinal axis 78. The ramp segments 64, 66 are coupled to the lip 88 on the back side 68 of the ring 62. In certain embodiments, the ramp segments 64, 66 are welded to the lip 88. However, in other embodiments, the ramp segments 64, 66 can be otherwise connected to the lip 88, for example, via fasteners, adhesives, or the like. In operation, the pig 34 will rest on the ramp segments 64, 66 when it is in the pig receiver 14. Accordingly, the connection between the ramp segments 64, 66 and the ring 62 is particularly selected to provide sufficient strength and flexibility to receive pigs 34 having a variety of sizes and weights.

In the illustrated embodiment, the ramp segments 64, 66 are positioned at angles relative to one another along the circumference of the ring 62. In other words, the ramp segments 64, 66 are arranged along the arc formed by the ring 62 to provide an angled platform to receive the pig 34. As will be described below, this angled position of the ramp segments 64, 66 enables the pig ramp 60 to receive pigs 34 having a variety of sizes. Moreover, the angled position of the ramp segments 64, 66 directs debris and liquid from the pig 34 downward toward the inner diameter of the tubular 20 forming the pig receiver 14. For example, as the pig 34 is sitting on the ramp segments 64, 66 before removal, the liquid accumulating along the pig 34 and in front of the pig 34 may drain back into the tubular 20 because the ramp segments 64, 66 raise the pig 34 off of the bottom of the tubular 20, thereby forming a flow path for the liquid 46. In this manner, the debris and liquid can be removed from the pig 34, drained back into the tubular 20, or blocked from exiting the tubular 20 before the pig 34 is removed from the pig receiver 14, thereby reducing the emissions.

As shown in FIG. 7, the ramp segments 64, 66 each include a first segment 100, a second segment 102, and a third segment 104. That is, a respective ramp segment axis 106 of the ramp segments 64, 66 extends along the ramp segment 64 substantially parallel to the longitudinal axis 78. Moreover, each of the first segment 100, the second segment 102, and the third segment 104 is arranged substantially coaxially along the ramp segment axis 106. In certain embodiments, the ramp segments 64, 66 may be substantially identical to one another. Also, in certain embodiments, the ramp segments 64, 66 may not be identical for one another. For example, one may be longer, shorter, wider, positioned at a different angle, or have different segment lengths.

In the illustrated embodiment, the first segment 100 has a first segment length 108 extending longitudinally away from the ring 62 along the respective ramp segment axis 106a, 106b. The first segment length 108 may be particularly selected to be substantially equal to a length of the pig 34. However, in other embodiments, the first segment length 108 may be longer than or shorter than the length of the pig 34. As will be appreciated, selecting the first segment length 108 to be substantially similar to the length of the pig 34 provides support for the pig 34 on the pig ramp 60. In the illustrated embodiment, a first segment surface 110 is substantially planar. That is, the first segment surface 108 is substantially flat and substantially parallel to the longitudinal axis 78. This provides a flat, secure surface for the pig 34. However, it should be appreciated that in other embodiments the first segment surface 110 may not be planar and/or flat. For example, the first segment surface 110 may include knurling, textures, adhesives, or other features to further secure the pig 34 to the first segment surface 110.

As shown in FIG. 7, the second segment 102 has a second segment length 112 that is shorter than the first segment length 108, in the illustrated embodiment. However, it should be appreciated that, in certain embodiments, the second segment length 112 may be greater than or equal to the first segment length 108. In the illustrated embodiment, the second segment 102 is downwardly angled, relative to the first segment 100. In other words, an angle 114 is formed between the first segment surface 110 and a second segment surface 116. In certain embodiments, the angled second segment surface 116 facilitates the drainage and removal of liquids from the pig 34 and/or the tubular 20. For example, liquid on the pig 34 may run down toward the ramp segments 64, 66, via gravity, as the pig 34 sits on the pig ramp 60. In certain embodiments, the fluid 46 may flow down along the pig 34 to the ramp segments 64, 66 and the angled second segment surface 116 directs the liquid away from the pig 34 and toward the third segment 104. In this manner, liquids removed from the pig 34 are directed away from the pig 34, thereby decreasing the likelihood of emissions when the pig 34 is removed from the pig receiver 14. Additionally, in certain embodiments, arranging the second segment 102 in a downwardly angled manner enables a reduced portion of the ramp segments 64, 66 to contact the wall of the tubular 20, thereby increasing the flow area for the fluid 46 to flow back into the tubular 20 and/or accumulate below the pig 34. Moreover, as will be described below, the angled second segment 102 may facilitate positioning the pig 34 on the pig ramp 60. For example, as shown in the illustrated embodiment, the far end (e.g., the end farther away from the ring 62) of the second segment 102 is at a lower vertical position than the first segment 100. As a result, the second segment 102 will be positioned closer to the inner bore of the tubular 20 forming the pig receiver 14 than the first segment 100. As the pig 34 is driven toward the pig receiver 14, the lower second segment 102 enables the pig ramp 60 to direct larger pigs 34 toward the ring 62 and away from the surface of the tubular 20, thereby lifting the pig 34 away from the surface of the tubular 20 to enable fluid 46 to accumulate below the pig 34 and remain in the tubular 20 as the pig 34 is removed from the pig receiver 14.

In the illustrated embodiment, the third segment 104 is coupled to the second segment 102, which is coupled to the first segment 100. In certain embodiments, the first, second, and third segments 100, 102, 104 are coupled together via welding, fasteners, or the like. However, in certain embodiments, the first, second, and third segments 100, 102, 104 are an integral piece forming the respective ramp segments 64, 66. Moreover, as illustrated, the first, second, and third segments 100, 102, 104 are arranged in a substantially side-by-side coaxial relationship. That is, the ramp segments 64, 66 are substantially parallel to the longitudinal axis 78. However, in certain embodiments, the ramp segments 64, 66 may be inwardly angled (e.g., toward the longitudinal axis) or outwardly angled (e.g., away from the longitudinal axis).

As shown in FIG. 7, a third segment surface 118 is positioned lower than the first segment surface 110 and the second segment surface 116. In other words, because the third segment 104 is coupled to the downwardly angled second segment 102, the third segment 104 is arranged lower (e.g., closer to the inner diameter of the tubular 102) than the first and second segments 100, 102. Moreover, the third segment 104 tapers down to be substantially flat and/or very thin to thereby contact the walls of the tubular 20 to enable the pig 34 to travel along the ramp segments 64, 66.

As illustrated, the end of the third segment 104 is very thing, thereby decreasing the likelihood that the pig 34 will get stuck when contacting the ramp segments 64, 66 and/or receive damage due to contact with the ramp segments 64, 66. In operation, the third segment 104 may be utilized to lift and direct the pig 34 away from the inner diameter of the tubular 102 forming the pig receiver 14 and toward the first segment 100. For example, in certain embodiments, the pig 34 contacts the inner diameter of the tubular 102 in order to remove debris, sediment, deposits, and the like from the walls of the tubular 102. As the pig 34 is moved toward the pig ramp 60, the third segment 104 may contact the pig 34 first, because the third segment 104 is closer to the walls of the tubular 102. As a result, the third segment 104 may provide separation of the pig 34 from the walls of the tubular 20, thereby directing the pig 34 toward the ring 62 for subsequent removal from the pig receiver 14.

FIG. 8 is a side elevational view of the pig ramp 60. In operation, as will be described below, the ring 62 is arranged proximate the outlet 44 of the pig receiver 14 and the ramp segments 64, 66 extend inwardly (e.g., longitudinally away from the ring 62) into the tubular 20 forming the pig receiver 14. Accordingly, the arrow 130 will be utilized to represent the upstream direction (relative to the direction of movement of the pig 34) and the arrow 132 will be utilized to represent the downstream direction (relative to the direction of movement of the pig 34).

In the illustrated embodiment, the ring 62 is arranged at the downstream side 132 of the pig ramp 60. As illustrated, the ring 62 includes the groove 84 extending substantially about a circumference 134 of the ring 62. In other words, the groove 84 may extend substantially about the entire ring 62, thereby facilitating installation of a seal 86 about the ring 62. As described above, the seal 86 is utilized to form a barrier between the outlet 44 and the fluid 46 accumulating in the tubular 20 when the pig 34 is removed from the pig receiver 14. The seal 86 extends radially outwardly from the ring 62 to contact the interior diameter of the tubular 20. As a result, the pig ramp 60 is held in position within the pig receiver 14 and fluid 46 accumulating upstream of the ring 62 will be blocked by the ring 62 and/or the seal 86 from flowing toward the outlet 44. However, in certain embodiments, the groove 84 and the seal 86 may be omitted. Furthermore, in the illustrated embodiment, the ring 62 includes holes 136 positioned circumferentially about the ring 62. In certain embodiments, the holes 136 may include fasteners to couple the seal 86 to the ring 62. Moreover, in certain embodiments the holes 136 may be utilized to secure the pig ramp 60 to the interior diameter of the tubular 20. For example, the holes 136 may receive screws or pins that drive the seal 86 radially outward toward the inner diameter of the tubular 20 to thereby secure the pig ramp 60 within the tubular 20. The illustrated embodiment includes two visible holes 136, however, in other embodiments there may be more or fewer holes. Furthermore, the holes 136 may be evenly spaced about the circumference 134 of the ring 62. For example, in certain embodiments, the ring 62 includes five holes 136 positioned at different locations about the circumference 134. In certain embodiments, the holes 136 may be formed within the groove 84. However, in other embodiments, for example, where there is no groove 84, the holes 136 are formed in any reasonable position along the circumference 134 of the ring 62.

As shown in FIG. 8, the ramp segments 64, 66 extend in the upstream direction 130 from the back side 68 of the ring 62. In certain embodiments, the ramp segments 64, 66 are formed from steel channel (e.g., C channel, c-shaped structural steel) having legs that end farther downward (e.g., toward the bottom wall of the pipe) than the top surface. As described above, the first segment 100 extends in the upstream direction 130 for the first segment length 108. The first segment surface 110 is substantially parallel to the longitudinal axis 78, in the illustrated embodiment, and provides a seating surface for the pig 34 when the pig 34 is driven toward the ring 62. As will be appreciated, the first segment length 108 may be particularly selected to accommodate a variety of pig receiver 14 configurations and pigs 34.

In the illustrated embodiment, the second segment 102 is coupled to the first segment 102 and extends in the upstream direction 130 for the second segment length 112. As described above, the angle 114 is formed between the first segment surface 110 and the second segment surface 116. In other words, the second segment surface 116 is downwardly angled relative to the first segment surface 110. As a result, the second segment surface 116 is lower (e.g., closer to the bottom wall of the tubular 20) than the first segment surface 110, when the pig ramp 60 is positioned in the pig receiver 14. Therefore, the pig 34 may be separated from the inner wall of the tubular 20 and directed toward the first segment surface 110 when the pig 34 is driven along the second segment length 112.

In certain embodiments, the second segment 102 includes a variable thickness. That is, a downstream second segment thickness 138 may be larger than an upstream second segment thickness 140. For example, as described above, in certain embodiments the ramp segments 64, 66 are formed from C channel. As a result, the legs of the C channel may, at least partially, account for the thickness of the ramp segments 64, 66. Moreover, the legs of the C channel may be removed from a portion of the ramp segments 64, 66, thereby decreasing the upstream second segment thickness 140. In this manner, the thickness of the second segment 102 may decrease in the upstream direction 130.

As illustrated in FIG. 8, the third segment 104 is coupled to the second segment 102 and extends in the upstream direction 130 for a third segment length 142. In the illustrated embodiment, the third segment length 142 is less than the first segment length 108 and the second segment length 112. However, in certain embodiments, the third segment length 142 may be greater than or equal to the first segment length 108 and/or the second segment length 112. As described above, it should be appreciated that the third segment length 142 is particularly selected to accommodate the pig 34 and/or the pig receiver 14. That is, the third segment length 142 may be modified based on the size of the pig 34 and/or the pig receiver 14.

In the illustrated embodiment, a third segment thickness 144 is less than a first segment thickness 146 and the downstream second segment thickness 138. However, it should be appreciated that in certain embodiments the third segment thickness 144 may be greater than or equal to the first segment thickness 146 and the downstream second segment thickness 138. Moreover, as shown in the illustrated embodiment, the upstream second segment thickness 140 is substantially equal to the third segment thickness 144. However, it should be appreciated that in certain embodiments the third segment thickness 144 may be greater than or less than the upstream second segment thickness 140. The third segment thickness 144 determines the distance the third segment surface 118 is above the inner diameter of the tubular 20. As a result, the larger the third segment thickness 144, the farther way from the inner diameter the third segment surface 118. Therefore, in certain embodiments, the third segment thickness 144 may be particularly selected based on the diameter of the pig 34 to facilitate movement of the pig 34 along the ramp segments 64, 66 and toward the ring 62.

Furthermore, as shown in FIG. 8, the third segment 104 tapers downwardly in the upstream direction 130 such that an end of the third segment 104 is substantially flat. Because the end is substantially flat, the pig 34 may be readily guided toward the pig ramp 60 as the pig 34 is driven through the tubular 20. As will be appreciated, if the third segment 104 is too thick (e.g., the third thickness 144 extended the entire length of the third segment 104) then the pig 34 may contact or strike the third segment 104 and become lodged in the tubular 20. Moreover, the pig 34 may be damaged or deformed due to contact with the third segment 104. As a result, in the illustrated embodiment, the end of the third segment 104 is substantially flat to enable separation between the pig 34 and the interior wall of the tubular 20 without damaging the pig 34. In this manner, the pig 34 is guided toward the first segment 100.

As shown in FIG. 8, the pig ramp 60 has a pig ramp length 148 formed by the ring thickness 72, the first segment length 108, the second segment length 112, and the third segment length 142. In certain embodiments, the pig ramp length 148 is particularly selected to accommodate the pig 34. For example, the pig ramp length 148 may be longer than a length of the pig 34, thereby providing a sufficient platform to receive and support the pig 34 before the pig 34 is removed from the pig receiver 14. Moreover, the longer pig ramp length 148 may further facilitate removal of debris and liquids from the pig 34. For example, as the pig 34 is propelled along the pig ramp 60, contact between the pig 34 and the ramp segments 64, 66 may scrape debris and fluids from the pig 34. This debris remains in the pig receiver 14, instead of being removed with the pig 34, and thereby decreases emissions when the pig 34 is removed from the pig receiver 14. It should be appreciated that dimensions of the pig ramp 60 may be particularly selected to accommodate the size of the tubular 20 forming the pig receiver 14. For example, larger diameter tubulars 20 may utilize larger diameter rings 62 and/or longer ramp segments 64, 66.

FIG. 9 is a rear cross-sectional view, taken along line 9-9, of the pig ramp 60. As shown in the illustrated embodiment, the ramp segments 64, 66 are coupled to the ring 62 on the back side 68 (e.g., upstream side 130) of the ring 62. In the illustrated embodiment, the holes 136 are arranged about the circumference 134 of the ring 62. In the illustrated embodiment, there are five holes 136, however, in other embodiments there may be more or fewer holes 136. As shown, there is a first hole 136a arranged along a radial axis 158. Additionally, second and third holes 136b, 136c are positioned at a first hole angle 160, relative to the radial axis 158. For example, in certain embodiments, the first hole angle 160 can be approximately 30 degrees, approximately 35 degrees, approximately 40 degrees, approximately 45 degrees, approximately 50 degrees, or any other reasonable angle. Moreover, as illustrated, fourth and fifth holes 136d, 136e are positioned at a second hole angle 162, relative to the radial axis 158. In certain embodiments, the second hole angle 162 can be approximately 90 degrees, approximately 95 degrees, approximately 100 degrees, approximately 105 degrees, approximately 110 degrees, or any other reasonable angle. In certain embodiments, the holes 136 may receive fasteners or the like to secure the seal 86 to the ring 62. Moreover, as described above, in certain embodiments the fasteners may end through the holes 136 to drive the seal 86 outward from the longitudinal axis 78, thereby securing the pig ramp 60 to the tubular 20 when the pig ramp 60 is positioned within the pig receiver 14.

As shown in FIG. 9, the lip 88 is arranged at the lower portion 90 of the ring 62 to facilitate coupling of the ramp segments 64, 66 to the ring 62. As illustrated, the lip 88 has a lip height 164 that extends radially inward toward the longitudinal axis 78 from the outer diameter 70. It should be appreciated that the lip height 164 may be varied to facilitate damming of the fluid 46 that accumulates in the pig receiver 14 before the pig 34 is removed from the pig receiver 14. For example, if the lip height 164 is approximately 2 inches, then approximately 2 inches of liquid may accumulate in the pig receiver 14 and still be retained when the pig 34 is removed from the pig receiver 14. As will be appreciated, the lip height 164 may be adjusted to accommodate different sizes of pigs 34 utilized in the pipeline 30. That is, because the lip height 164 extends inwardly, toward the longitudinal axis 78, the lip height 164 effectively reduces the clearance for the pig 34 being removed through the ring 62. As a result, the lip height 164 may be particularly selected based on the anticipated outer diameter of the pig 34. In the illustrated embodiment, the ramp segments 64, 66 are coupled to the lip 88 such that the lip height 164 is substantially equal to a ramp segment height 166. As described above, the ramp segments 64, 66 are arranged at angles about the circumference 134 of the ring 62, which positions the respective ramp segment surfaces (e.g., the first segment surface 110, the second segment surface 116, the third segment surface 118) at angles. In the illustrated embodiment, the ramp segments 64, 66 are arranged at ramp segment angles 168, 170 with respect to the radial axis 158. For example, the ramp segment angles 168, 170 may be approximately 10 degrees, approximately 15 degrees, approximately 20 degrees, approximately 25 degrees, approximately 30 degrees, or any other reasonable angle. Furthermore, while the ramp segment angles 168, 170 are substantially equal in the illustrated embodiment, in other embodiments the ramp segment angles 168, 170 may be different. That is, the ramp segments 64, 66 may not be arranged substantially symmetrically about the radial axis 158. By arranging the ramp segments 64, 66 at the angles 168, 170, the pressure applied to the pig ramp 60 by the weight of the pig 34 may be readily distributed along the curvature of the ring 62, thereby efficiently distributing the force. That is, the likelihood of deformation of the pig ramp 60 and/or the pig 34 may be reduced due to the distribution of the forces along the ramp segments 64, 66.

Figure 10:
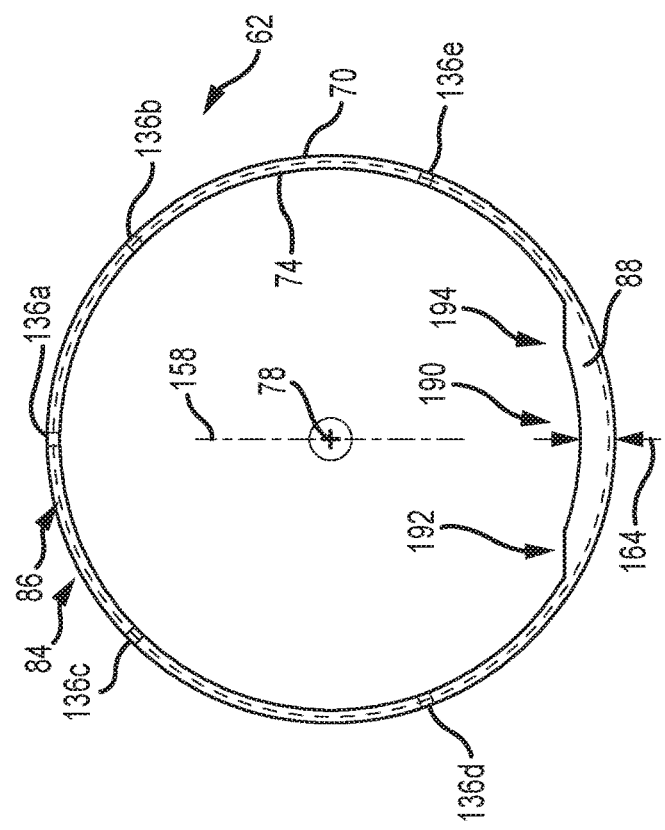
FIG. 10 is a front elevational view of the pig ramp of FIG. 6, in accordance with embodiments of the present disclosure.

FIG. 10 is a front elevational view of the pig ramp 60. In the illustrated embodiment, the lip 88 is visible at the lower portion 90 of the ring 62. As described above, the ramp segments 64, 66 are coupled to the back side 68 of the ring 62 at the lip 88. In the illustrated embodiment, the lip 88 includes a curved center portion 190 and adjacent flat side portions 192, 194. It should be appreciated that the flat side portions 192, 194 may not be flat (e.g., horizontal, perpendicular to the radial axis 158) in all embodiments. For example, the flat side portions 192, 194 may be arranged at acute or obtuse angles, relative to the radial axis 158. In this manner, the lip 88 may be shaped to accommodate pigs 34 having a variety of sizes.

Furthermore, as described above, in certain embodiments the lip height 164 may be particularly selected due to the size of the pig 34 and/or the anticipated volume of fluid 46 accumulating within the tubular 20. For example, in operation the lip 88 acts, at least in part along with the ring 62, as a dam to block the fluid 46 from collecting near the door 42 of the pig receiver 14. By increasing the lip height 164, a larger amount of fluid 46 may accumulate within the tubular 20. However, because the lip 88 extends inwardly toward the longitudinal axis 78, increasing the lip height 164 decreases the clearance for the pig 34 passing through the ring 62. As such, the lip height 164 is particularly selected based on the size of the pig 34, among other factors.

Figure 11:
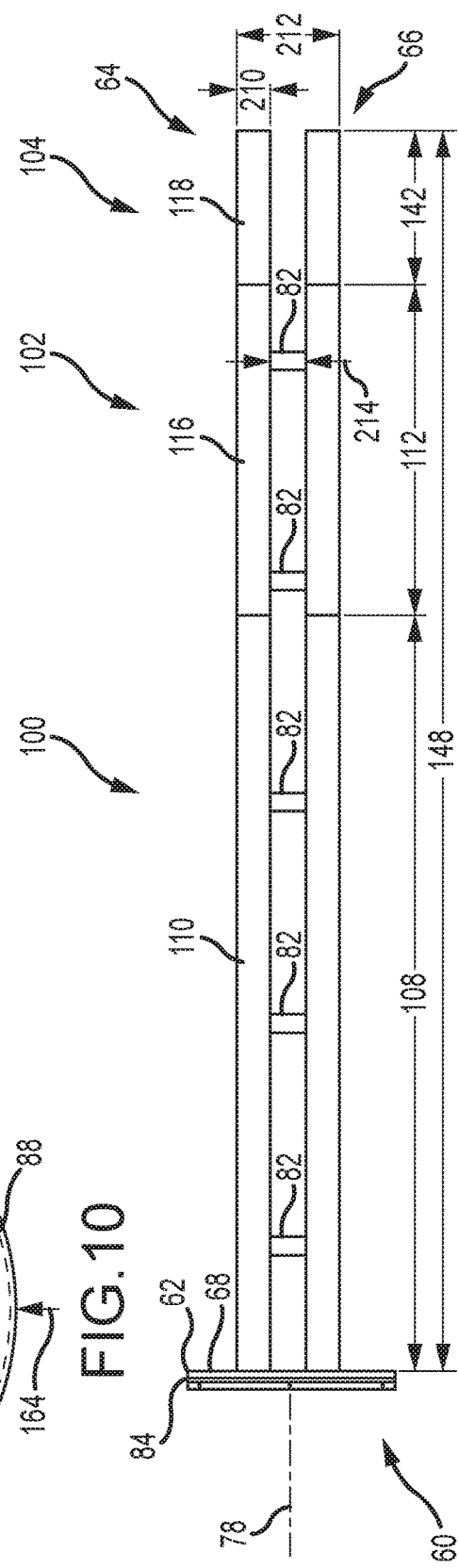
FIG. 11 is a top plan view of the pig ramp of FIG. 6, in accordance with an embodiment of the present disclosure.

FIG. 11 is a top plan view of the pig ramp 60. As illustrated, the pig ramp 60 extends the pig ramp length 148 with the ramp segments 64, 66 coupled to the ring 62. In the illustrated embodiment, the respective first, second, and third segments 100, 102, 104 of the ramp segments 64, 66 are axially aligned along the respective ramp segment axis 106. In other words, the ramp segments 64, 66 are substantially parallel to the longitudinal axis 78. Moreover, as shown in the illustrated embodiment, the ramp connectors 82 are arranged between the ramp segments 64, 66 along the pig ramp length 148. In the illustrated embodiment, there are six ramp connectors 82 extending along the pig ramp length 148. However, it should be appreciated that in other embodiments there may be more or fewer ramp connectors 82. In certain embodiments, the ramp connectors are arranged equally spaced along the pig ramp length 148. However, in certain embodiments, additional ramp connectors 82 may be arranged at areas that are anticipated to receive larger loads. For example, the pig 34 may rest on the first segment 100 before the pig 34 is removed from the pig receiver 14. Accordingly, additional ramp connectors 82 may be positioned along the first segment 100 to accommodate the weight of the pig 34.

In the illustrated embodiment, the ramp segments 64, 66 have a respective segment width 210. It should be appreciated that the segment width 210 may be particularly selected to accommodate the size of various pigs 34. For example, larger, heavier pigs may utilize wider segment widths 210 to support the additional size and weight of the pig 34. Moreover, as shown, the pig ramp 60 includes a pig ramp width 212 substantially equal to the segment widths 210 of the ramp segments 64, 66 and a connector width 214. In the illustrated embodiment, the pig ramp width 212 is less than the outer diameter 70 of the ring 62. In certain embodiments, the pig ramp width 212 may be less than the inner diameter 74 of the ring 62.

Figure 12:
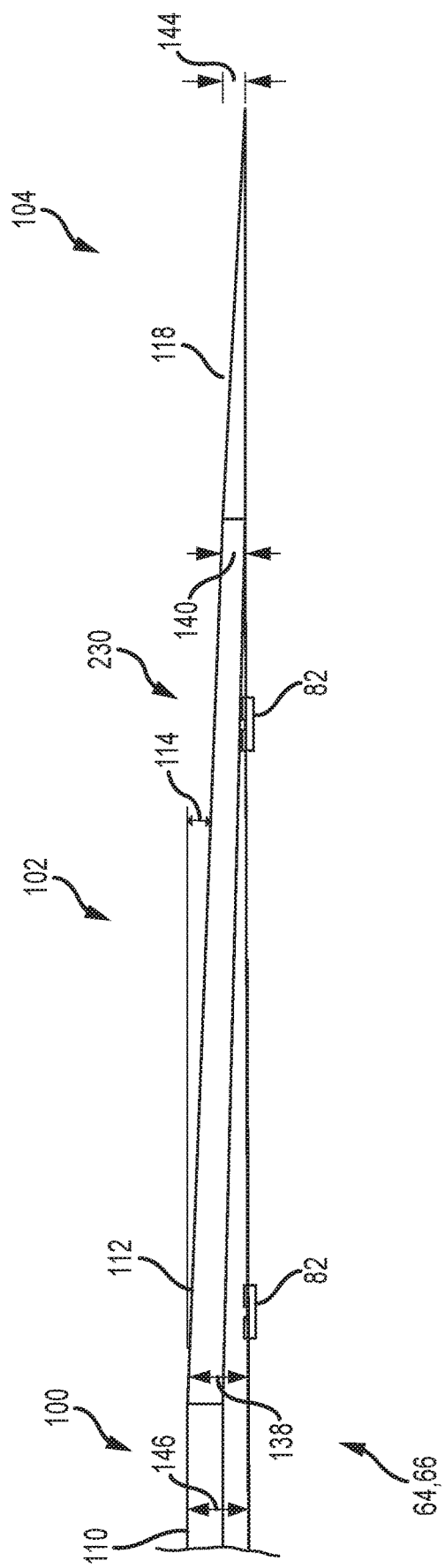
FIG. 12 is a partial detailed view of the pig ramp of FIG. 6, in accordance with an embodiment of the present disclosure.

FIG. 12 is a partial detail view illustrating a transition 230 formed by the second segment 102. As described above, the second segment 102 is arranged between the first segment 100 and the third segment 104. Moreover, the angle 114 is formed between the first segment surface 110 and the second segment surface 116 because the second segment 102 is downwardly inclined relative to the first segment 100. In certain embodiments, the first and second segments 100, 102 are formed from C channel, as described above. Therefore, the legs of the C channel may be reduced (e.g., removed) in order to form the downward incline of the second segment 102. In other words, the downstream second segment thickness 138 is greater than the upstream second segment thickness 140 due to the removal of the C channel forming the ramp segments 64, 66. In the illustrated embodiment, the upstream second segment thickness 140 is substantially equal to the third segment thickness 144. However, it should be appreciated that in other embodiments the upstream second segment thickness 140 and the third segment thickness 144 may not be substantially equal.

Moreover, as shown in FIG. 12, the third segment 104 tapers downwardly such that the end of the third segment 104 (e.g., the upstream 130 side) is substantially flat. That is, the third segment 104 is very thin at the end to facilitate removal of the pig 34 from contact with the wall of the tubular 20 without damaging the pig 34. For example, if the third segment 104 were too thick, the pig 34 may contact the third segment 104 and become stuck in the tubular 20. Moreover, contacting the third segment 104 at high velocities may damage the pig 34, if the thickness were too large, and therefore the end of the third segment 104 tapers down to a substantially flat thickness to facilitate directing the pig 34 onto the ramp segments 64, 66 such that the fluid 46 accumulating downstream of the pig 34 and along the pig 34 may drain from the pig 34 and become dammed by the ring 62 to facilitate removal of the pig 34 from the pig receiver 14 while also reducing emissions upon removal.

Figure 13:
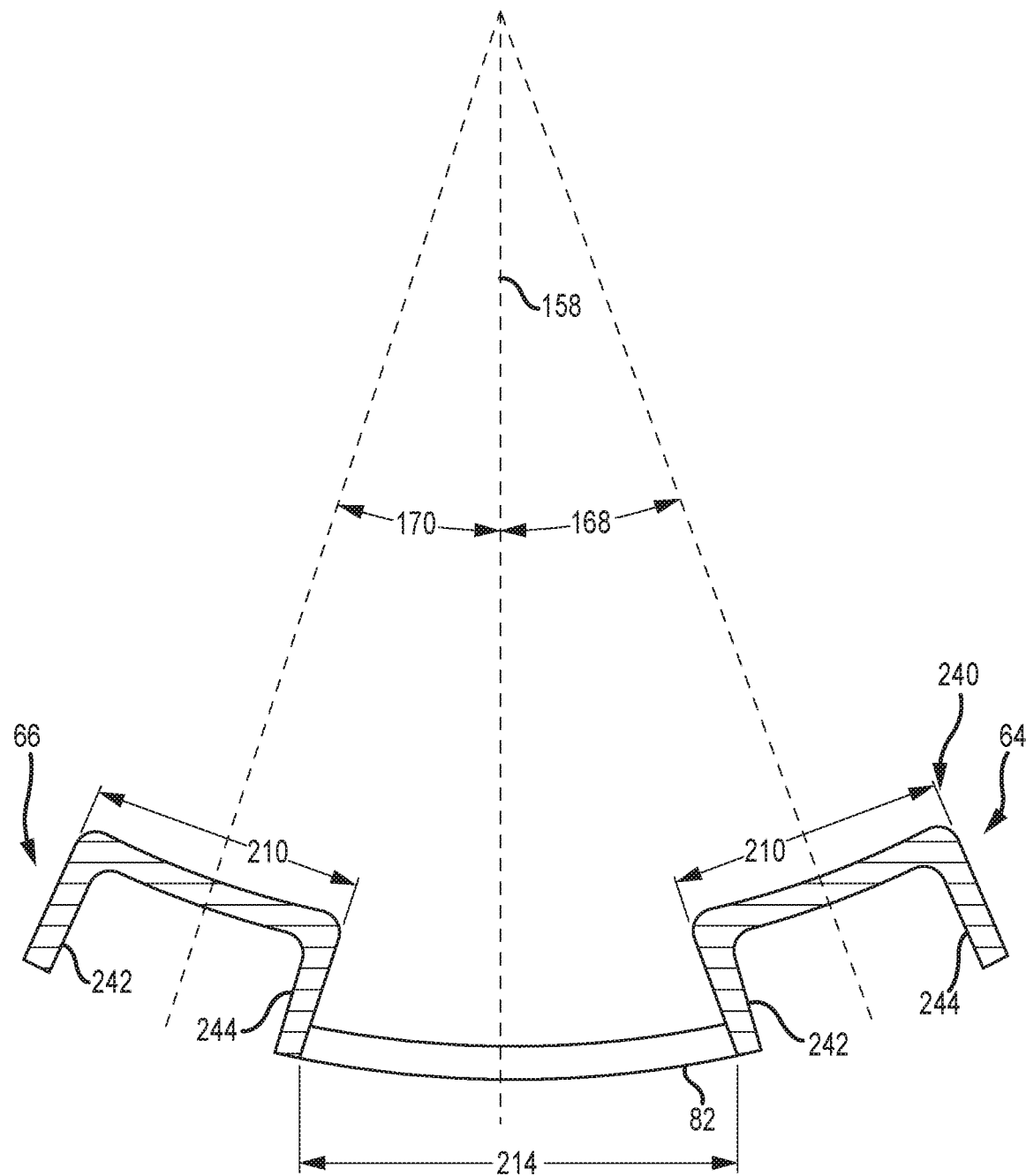
FIG. 13 is a partial sectional view, taken along line 13-13, of the pig ramp of FIG. 6, in accordance with an embodiment of the present disclosure.

FIG. 13 is a partial sectional view, taken along line 13-13, of the ramp segments 64, 66 coupled together via the ramp connector 82. As described above, the ramp segments 64, 66 are arranged at the ramp segment angles 168, 170, relative to the radial axis 158 to facilitate efficient distribution of the force of the pig 34 when the pig 34 is positioned on the ramp segments 64, 66. As such, the respective surfaces (e.g., first segment surface 110, second segment surface 116, third segment surface 118) are arranged at angles with respect to the radial axis 158. As will be appreciated, positioning the ramp segments 64, 66 at angles facilitates receiving and supporting the pig 34 because the pig 34 may have a substantially cylindrical shape. Furthermore, positioning the ramp segments 64, 66 at angles may further lift the pig 34 above the bottom wall of the tubular 20, thereby forming more space for fluid 46 to accumulate as it drips off of the pig 34.

In the illustrated embodiment, the ramp connector 82 extends between the ramp segments 64, 66 to couple the ramp segments 64, 66 together. As described above, in the illustrated embodiment the ramp segments 64, 66 are formed, at least partially, by C channels having a top portion 240 and a pair of legs 242, 244. However, it should be appreciated that in other embodiments the ramp segments 64, 66 may be formed from solid structures, square channel, standard pipe, or any other suitably shaped material. In the illustrated embodiment, the ramp connector 82 extends between the respective legs 242, 244 of the ramp segments 64, 66. However, it should be appreciated that, in certain embodiments, the ramp connector 82 may couple the ramp segments 64, 66 together via the respective top portions 240.

Figure 14:
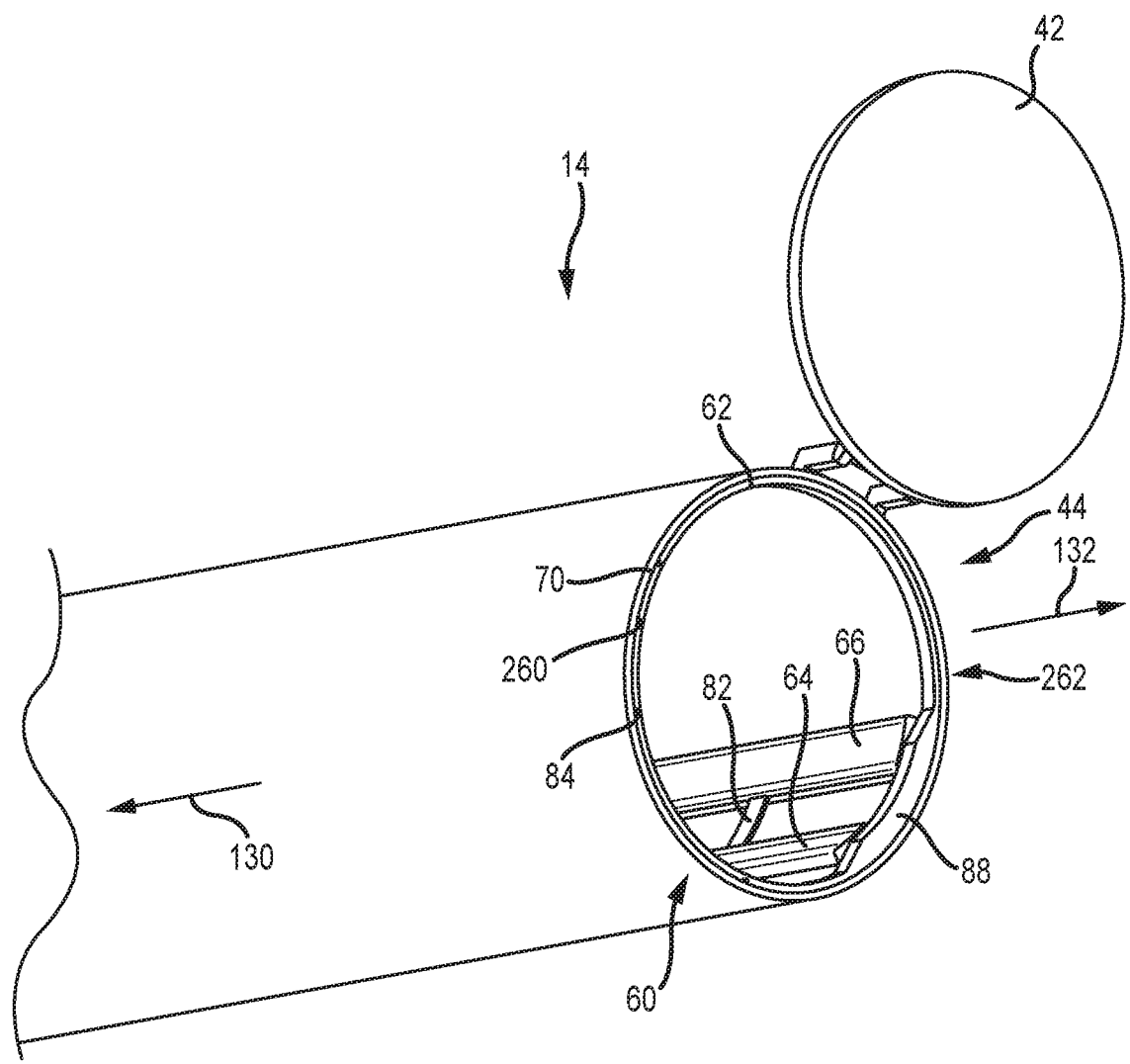
FIG. 14 is a perspective view of an embodiment of the pig ramp of FIG. 6 arranged within a pig receiver, in accordance with an embodiment of the present disclosure.

FIG. 14 is a front perspective view of an embodiment of the pig ramp 60 arranged within the pig receiver 14. As described above, in certain embodiments the pig receiver 14 is formed, at least partially, by a tubular 20 having the outlet 44 and the door 42. The pig ramp 60 is inserted into the pig receiver 14 such that the ring 62 is proximate the outlet 44 and the ramp segments 64, 66 extend into the pig receiver 14 in the upstream direction 130. While the illustrated embodiment includes the pig ramp 60 positioned closely to the outlet 44, in other embodiments the pig ramp 60 may be positioned farther into the tubular 20. It should be appreciated that the position of the pig ramp 60 within the tubular 20 may be particularly selected to accommodate a variety of operating conditions, such as space around the pig receiver 14, instrumentation associated with the pig receiver 14, and the like. As described above, in certain embodiments the pig ramp 60 includes the groove 84 and the seal 86 to facilitate a substantially sealed connection between the ring 62 and an inner diameter 260 of the tubular 20. Moreover, in certain embodiments, one or more fasteners may extend through the holes 136 to drive the seal 86 outward and toward the inner diameter 260 to thereby secure the pig ramp 60 to the tubular 20 and/or form a fluid tight seal between the pig ramp 60 and the inner diameter 260. In this manner, the ring 62 of the pig ramp 60 may act as a dam to prevent fluids 46 that accumulate within the tubular 20 from flowing toward the outlet 44 when the pig 34 is removed from the pig receiver 14. However, it will be appreciated that in certain embodiments the ring 62 may not include the groove 84 and/or the seal 86 and that the outer diameter 70 of the ring 62 may be particularly selected to securely position the pig ramp 60 within the pig receiver 14.

In the illustrated embodiment, the pig ramp 60 is arranged within the pig receiver 14 such that the lower portion 90 of the ring 62 is proximate a lower portion 262 of the pig receiver 14. In other words, the pig ramp 60 is arranged within the pig receiver 14 such that the ramp segments 64, 66 are arranged along the lower portion 262 of the pig receiver 14. Because of the angled arrangement of the ramp segments 64, 66, the pig ramp 60 sits securely in the pig receiver 14. That is, the angled arrangement of the ramp segments 64, 66 enables the ramp segments 64, 66 to substantially conform to the shape of the tubular 20.

Figure 15:
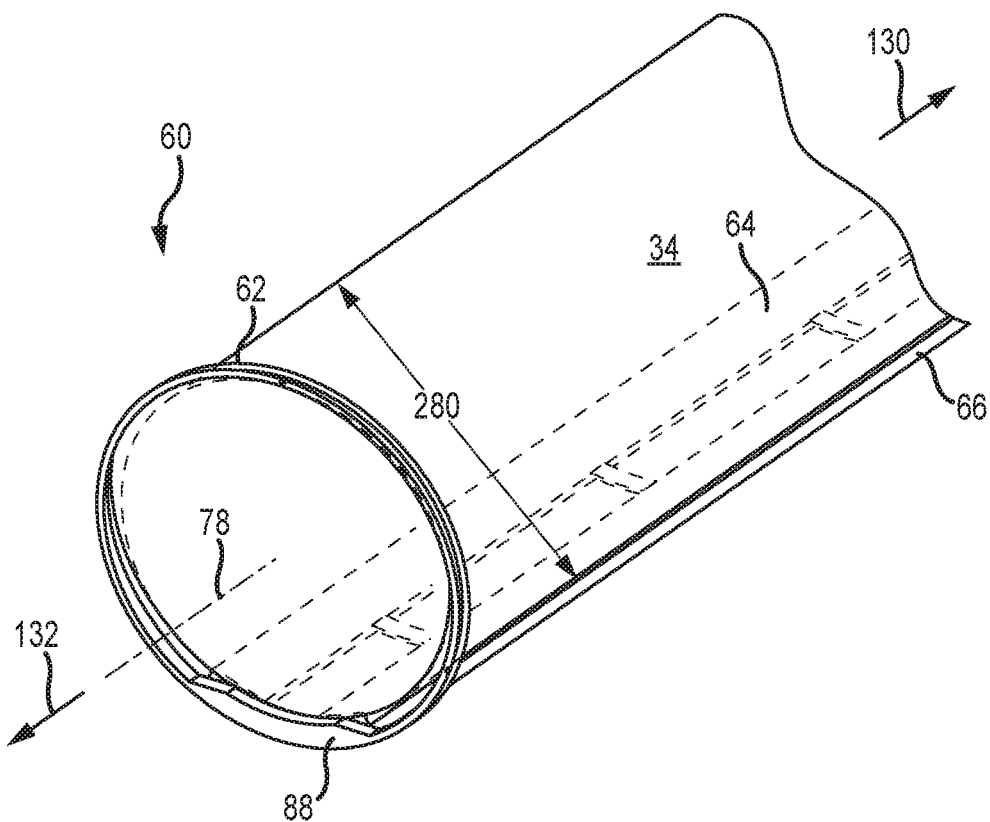
FIG. 15 is a perspective view of an embodiment of a pig positioned on the pig ramp of FIG. 6, in accordance with an embodiment of the present disclosure.

FIG. 15 is a front perspective view of an embodiment of the pig 34 positioned on the pig ramp 60. As described above, the pig 34 is arranged on the ramp segments 64, 66 after the pig 34 is moved to the pig receiver 14. In the illustrated embodiment, the pig 34 is positioned on the first segment 100 of the ramp segments 64, 66. As shown, the pig 34 is elevated upon the ramp segments 64, 66 such that the pig 34 is positioned at a higher elevation than the lip 88. Accordingly, the fluid 46 that propelled the pig 34 through the pipeline 30 may accumulate below the pig 34 and be dammed via the ring 62 when the pig receiver 14 is opened and the pig 34 is removed.

As described above, the lip height 164 extends inwardly toward the longitudinal axis 78, thereby decreasing the clearance for the pig 34 to pass through the ring 62. In the illustrated embodiment, the ring inner diameter 74 is greater than an outer diameter 280 of the pig 34. As a result, the pig 34 can pass through the ring 62 when the pig 34 is removed from the pig receiver 14.

Figure 16:
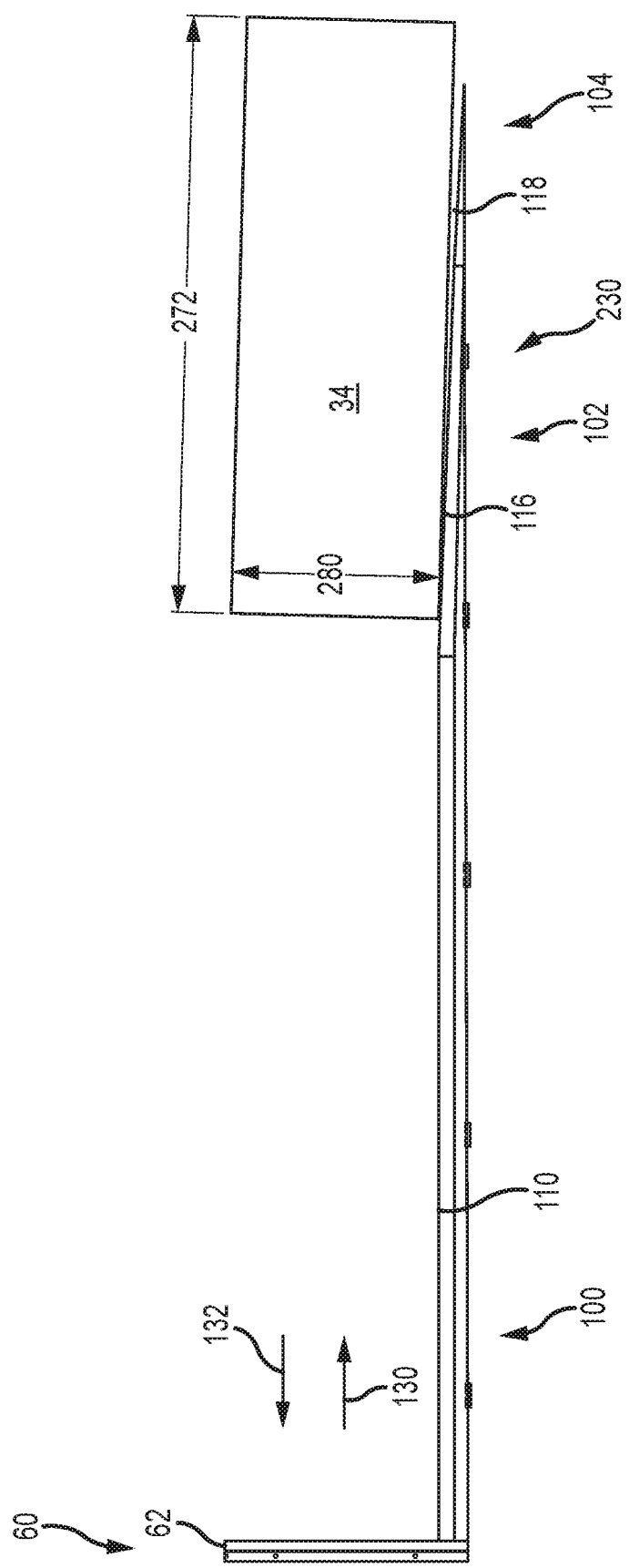
FIG. 16 is a side elevational view of an embodiment of a pig positioned on the pig ramp of FIG. 6, in accordance with an embodiment of the present disclosure.

FIG. 16 is a side elevational view of an embodiment of the pig 34 moving onto the pig ramp 60. In the illustrated embodiment, the pig 34 moves in the downstream direction 132 and contacts the third segment 104. As described above, in certain embodiments, the end of the third segment 104 tapers down to be substantially flat to enable separation of the pig 34 from the tubular wall 270. The third segment 104 separates the pig 34 from the tubular wall 270 to direct the pig 34 upward and toward the first segment 100. Thereafter, the pig 34 travels along the transition 230 of the second segment 102 and toward the first segment 100. In this manner, the lower third segment surface 118 and second segment surface 116 are utilized to separate the pig 34 from the wall 270 and direct the pig 34 toward the ring 62.

As described above, in certain embodiments, fluid 46 may be positioned downstream of the pig 34 as the pig is directed toward the pig ramp 60. This fluid 46 may accumulate at the outlet 44 and drain out of the tubular 20 when the pig receiver 14 is opened to remove the pig 34. However, as shown in the illustrated embodiment, the fluid 46 will accumulate below the ramp segments 64, 66 and be dammed from the outlet 44 via the ring 62. As a result, when the pig 34 is removed from the pig receiver 14, the fluid 46 will remain in the tubular 20.

Figure 17:
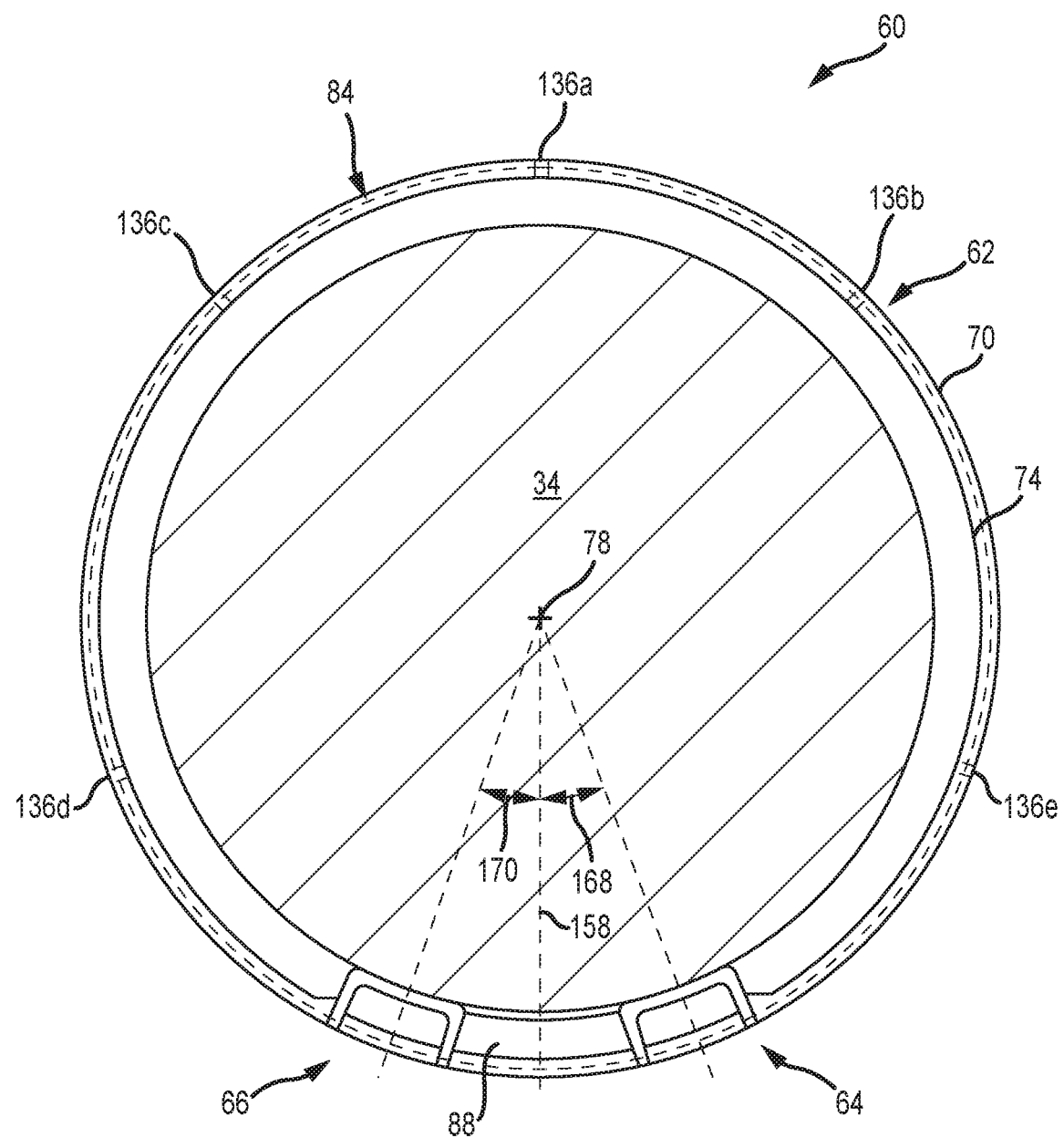
FIG. 17 is a rear elevational view of an embodiment of a pig positioned on the pig ramp of FIG. 6, in accordance with an embodiment of the present disclosure.

FIG. 17 is a rear elevational view of an embodiment of the pig 34 positioned on the pig ramp 60. As described above, by positioning the ramp segments 64, 66 at the respective ramp segment angles 168, 170 the pig 34 is supported on the ramp segments 64, 66 for removal from the pig receiver 14.

The angled position of the ramp segments 64, 66 substantially block or minimize side-to-side movement of the pig 34 on the ramp segments 64, 66, thereby facilitating removal from the pig receiver 14. Moreover, as described above, the ramp segments 64, 66 elevate the pig 34 up and away from the tubular wall 270 of the pig receiver 14. As a result, the fluid 46 may accumulate below the pig 34, and also be blocked from flowing out of the pig receiver 14 via the damming effect of the ring 62. For example, the lip 88 may block the flow of fluid 46 out of the pig receiver 14.

Figure 18:
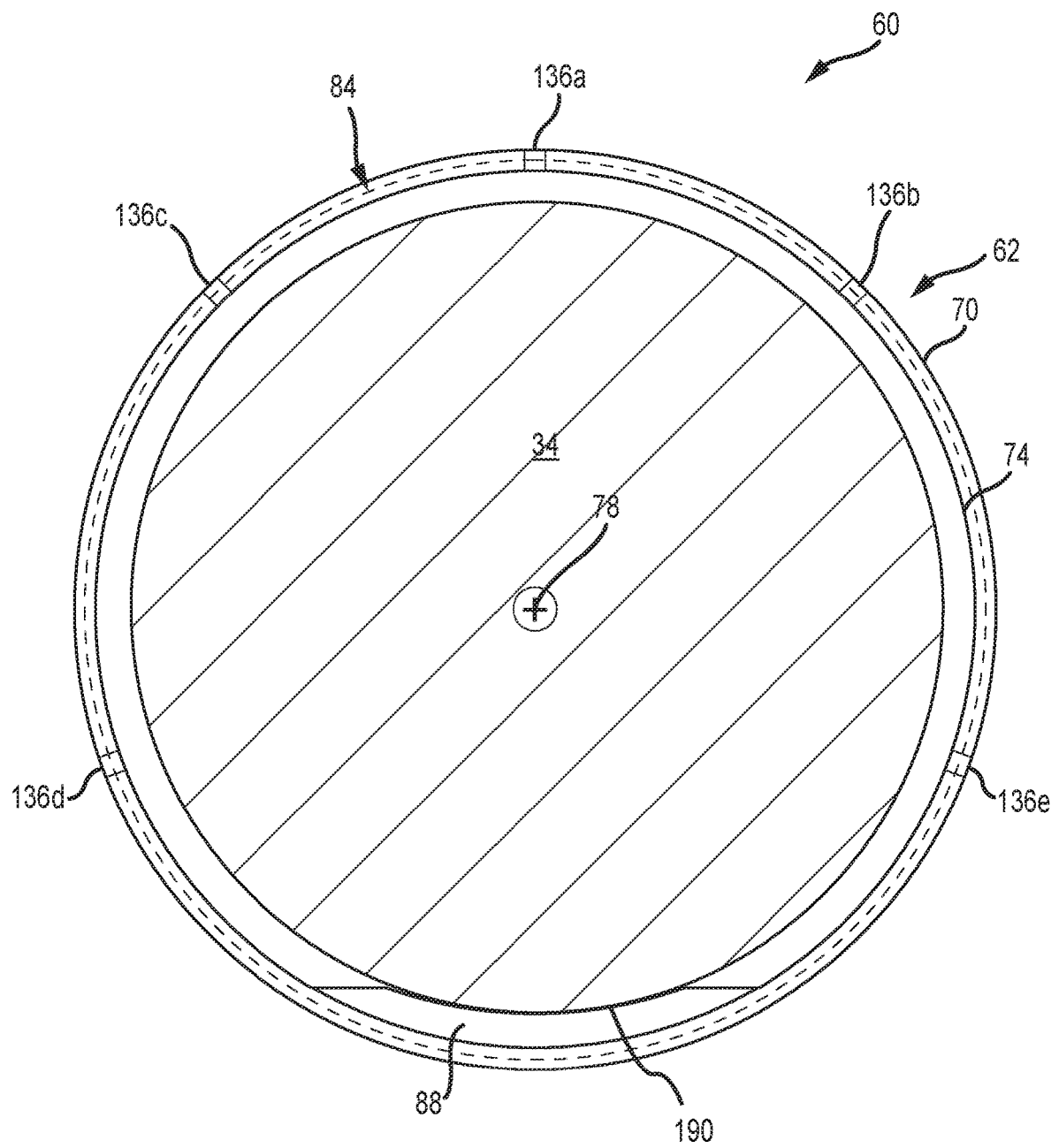
FIG. 18 is a front elevational view of an embodiment of a pig positioned on the pig ramp of FIG. 6, in accordance with an embodiment of the present disclosure.

FIG. 18 is a front elevational view of an embodiment of the pig 34 positioned on the pig ramp 60. In the illustrated embodiment, the curved center portion 190 is arranged to substantially conform to the curvature of the pig 34, thereby facilitating removal of the pig 34 from the pig ramp 60. In certain embodiments, the lip 88 may be utilized to scrape and/or remove debris and liquid from the pig 34 as the pig 34 is pulled through the ring 62. In this manner, the pig 34 can be cleaned before being removed from the pig receiver 14. Moreover, as described above, the lip 88 is utilized to dam fluid accumulating beneath the pig 34 from flowing out of the pig receiver 14 when the pig 34 is removed. For example, because the pig 34 is arranged on the ramp segments 64, 66 and elevated above the tubular wall 270 of the pig receiver 14, fluid may accumulate below the pig 34. However, when the pig receiver 14 is opened, the fluid may flow out of the outlet 44 if there is no material blocking the flow path. By incorporating the lip 88 with the ring 62, the fluid 46 may be blocked from flowing out of the tubular 20 when the pig 34 is removed, thereby reducing emissions.

Figure 19:
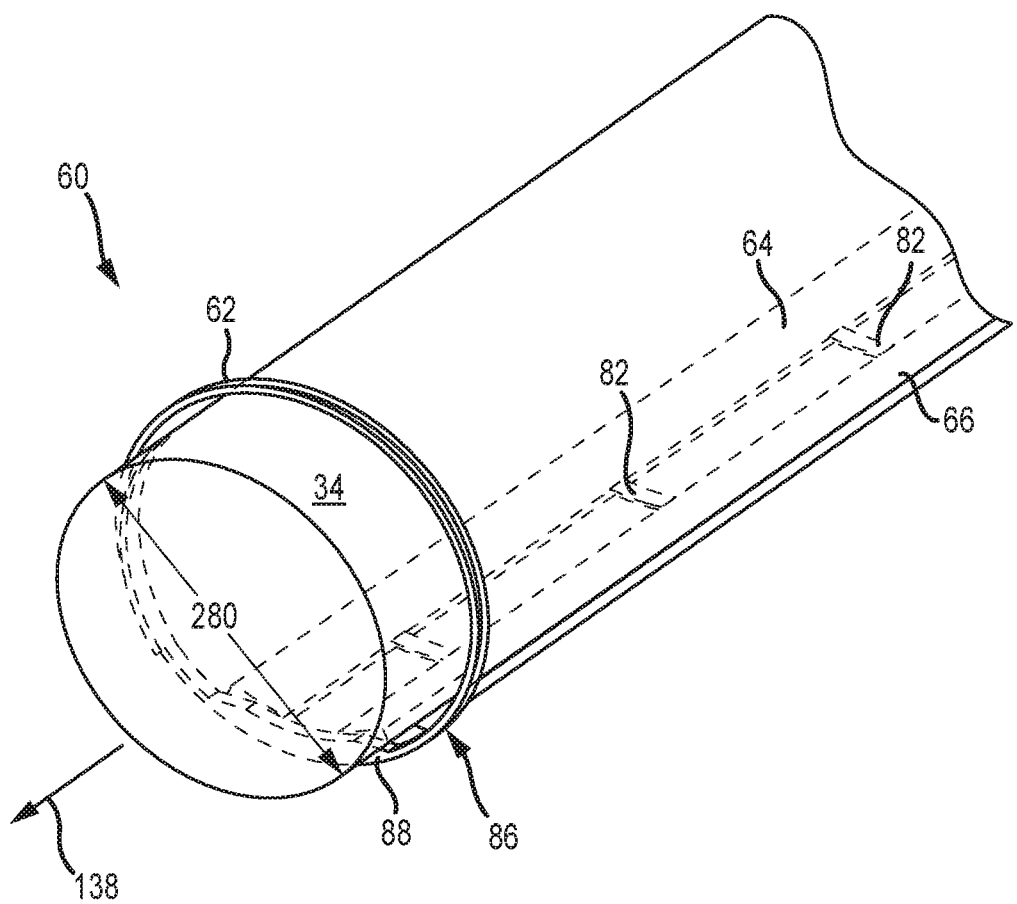
FIG. 19 is a perspective view of an embodiment of a pig being removed from the pig ramp of FIG. 6, in accordance with an embodiment of the present disclosure.

FIG. 19 is a front perspective view of an embodiment of the pig 34 being removed from the pig ramp 60. As described above, in certain embodiments, the pig 34 is pulled through the ring 62 in the downstream direction 132 when the pig 34 is removed from the pig receiver 14. In the illustrated embodiment, the pig 34 has a smaller outer diameter 280 than the inner diameter 74 of the ring 62, and as a result, the pig 34 can be removed through the ring 34 without removing the pig ramp 60 from the pig receiver 14. Moreover, as described above, in certain embodiments the pig 34 also contacts the lip 88 of the ring 62 as the pig 34 is moved in the downstream direction 132. Contact between the pig 34 and the lip 88 further removes debris and liquid from the pig 34, thereby facilitating the cleaning process to reduce emissions when the pig 34 is removed from the pig receiver 14. Additionally, as described above, the lip 88 acts to dam the fluids accumulating below the pig 34 due to the elevational position of the pig 34 as a result of being positioned on the ramp segments 64, 66.

Figure 20:
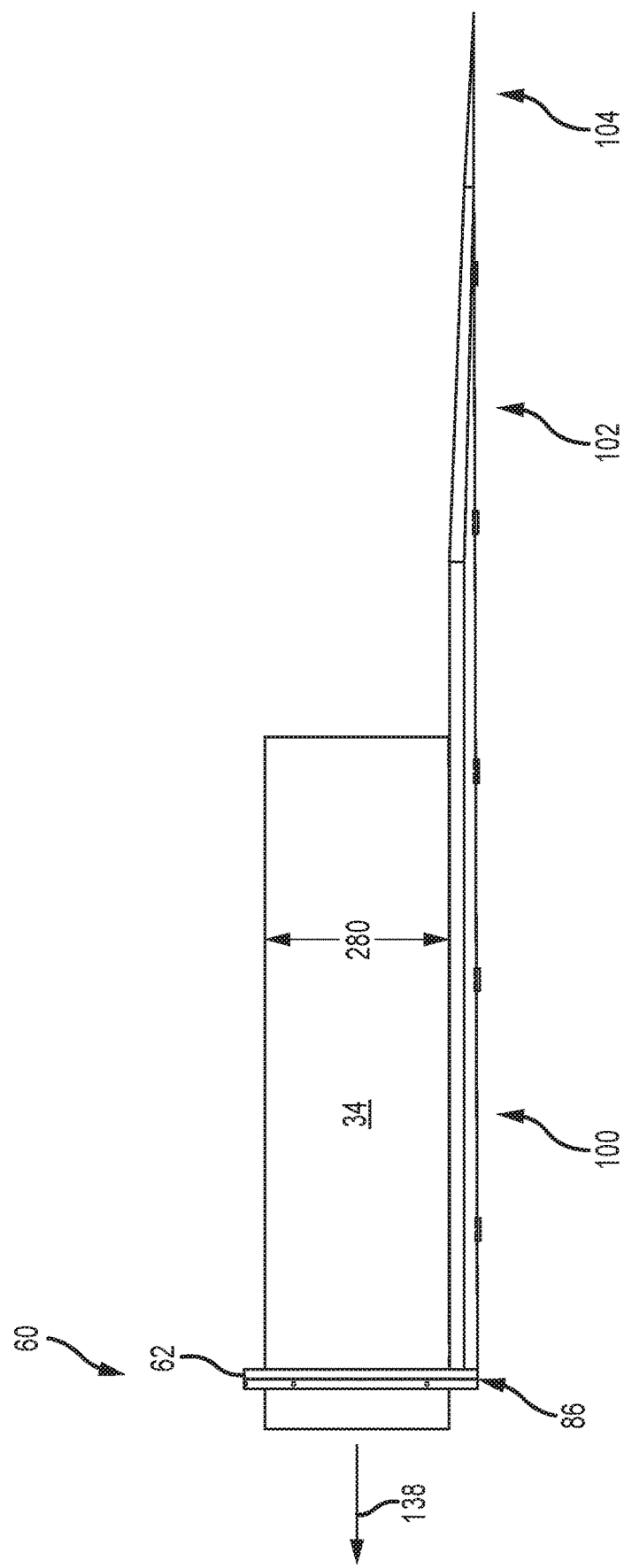
FIG. 20 is a side elevational view of an embodiment of a pig being removed from the pig ramp of FIG. 6, in accordance with an embodiment of the present disclosure.

FIG. 20 is a side elevational view of an embodiment of the pig 34 being removed from the pig ramp 60. As described above, in certain embodiments, the pig 34 is positioned on the first segment 100 and then moved in the downstream direction 132 to be removed from the pig receiver 14. The pig 34 is readily removed through the ring 62 without removing the pig ramp 60 from the pig receiver 14. Moreover, as illustrated, the fluid 46 accumulates below the pig 34, but does not exit the pig receiver 14 when the pig 34 is removed. That is, the ring 62 effectively dams the fluid 46 from flowing through the outlet 44, thereby decreasing emissions during pig removal.

Figure 21:
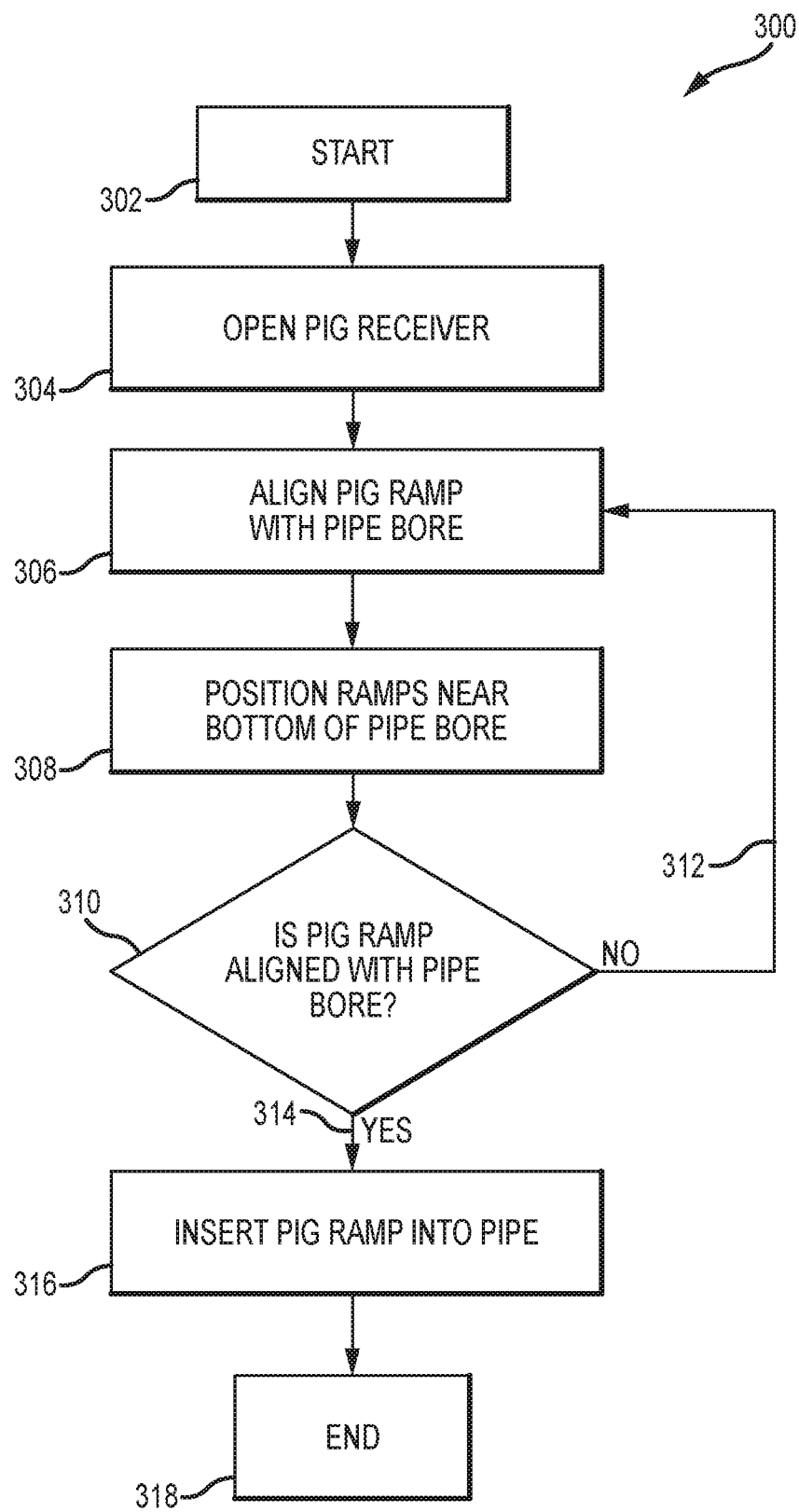
FIG. 21 is a flow chart of an embodiment of a method for installing the pig ramp of FIG. 6 in a pig receiver, in accordance with an embodiment of the present disclosure.

FIG. 21 is a flow chart of an embodiment of a method 300 for installing the pig ramp 60 in the pig receiver 14. The method 300 begins at the start (block 302). First, the pig receiver 14 is opened (block 304). For example, an operator may open the outlet 44 by moving the door 42 about an axis to an open position. As a result, the pig receiver 14 is open when the operator can access the interior of the tubular 20 which forms at least a portion of the pig receiver 14. Next, the pig ramp 60 is aligned with the outlet 44 (block 306). For example, an operator may align the pig ramp 60 with the opening leading toward the interior of the tubular 20. As will be appreciated, alignment enables the pig ramp 60 to be fully inserted into the tubular 20. If the pig ramp 60 is not aligned, the ramp segments 64, 66 may block insertion of the pig ramp 20 into the tubular 20, thereby blocking closure of the door 42 and sealing of the pig receiver 14. Then, the ramp segments 64, 66 are arranged near the tubular wall 270 at the lower portion 262 of the pig receiver 14 (block 308). The ramp segments 64, 66 are arranged at the lower portion 262 of the pig receiver 14 to enable the pig 34 to be lifted up and/or separated from the tubular wall 270. That is, the ramp segments 64, 66 generate separation between the pig 34 and the tubular wall 270, thereby facilitating the removal of debris and liquids from the pig 34. Next, the alignment of the pig ramp 60 with the pig receiver 14 is verified (operator 310). For example, the operator may verify that the pig ramp 60 can be fully inserted into the pig receiver 14. Moreover, the operator may visually inspect the position of the ramp segments 64, 66 to ensure proper alignment. If the pig ramp 60 is not aligned (line 312), the method 300 returns to block 306. If the pig ramp is aligned (line 314), the pig ramp 60 is inserted into the pig receiver 14 (block 316). For example, the operator may install the pig ramp 60 within the inner diameter 260 of the tubular 20 forming at least a portion of the pig receiver 14. As described above, the pig ramp 60 is installed within the pig receiver 14 when the door 42 can be closed over the outlet 44. Then, the method 300 is ended (block 318). In this manner, the pig ramp 60 can be installed within the pig receiver 14 for use in pipeline maintenance and inspection operations.

Figure 22:
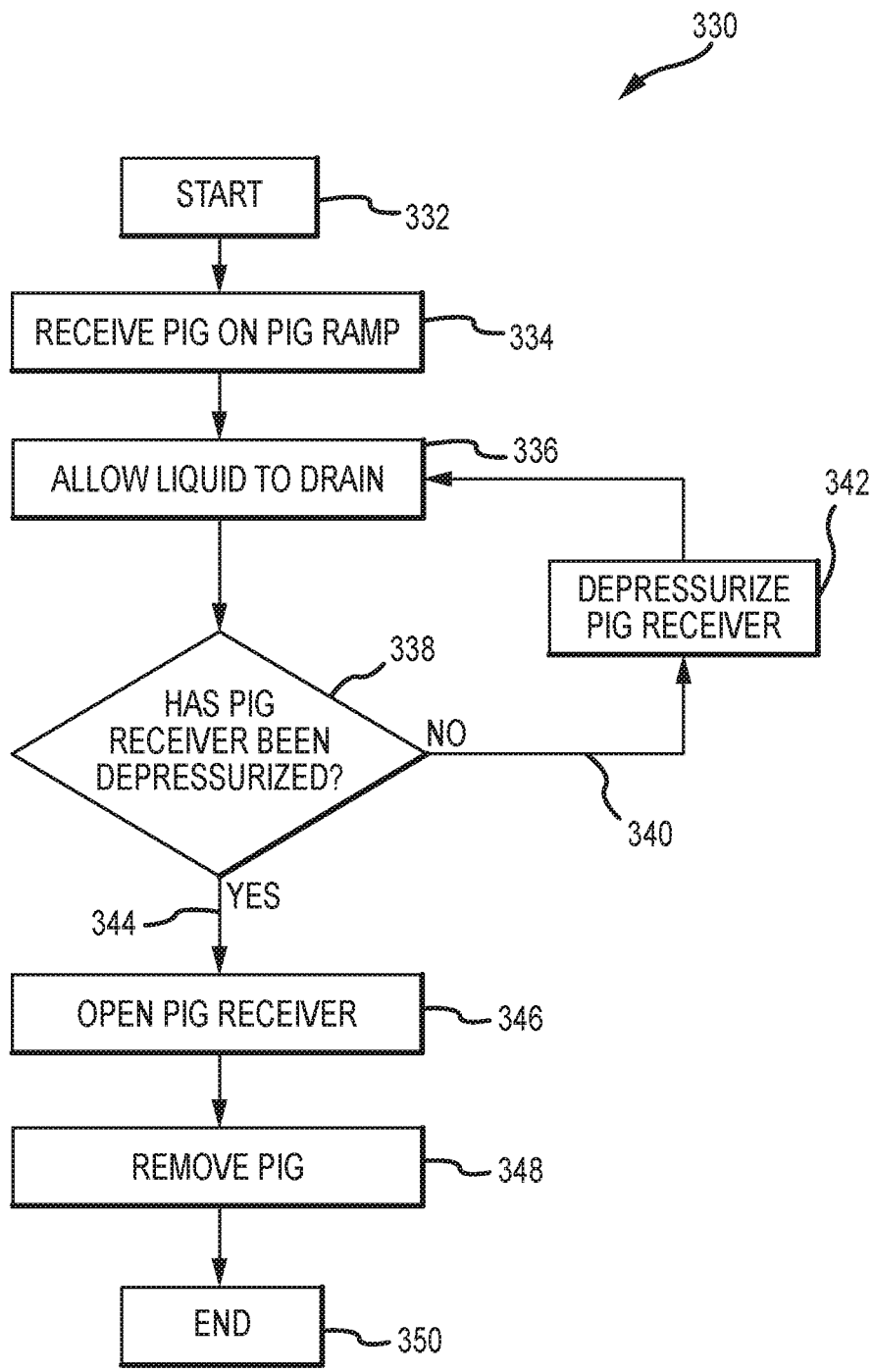
FIG. 22 is a flow chart of an embodiment of a method for removing a pig from the pig ramp of FIG. 6, in accordance with an embodiment of the present disclosure.

FIG. 22 is a flow chart of an embodiment of a method 330 for removing the pig 34 from the pig receiver 14. As described above, after the pig 34 completes pigging operations, the pig 34 is diverted to the pig receiver 14 from the pipeline 30 for removal. The method beings at the start (block 332). Next, in certain embodiments, the pig 34 is received upon the pig ramp 60 (block 334). For example, the fluid within the pipeline 30 drives the pig 34 toward the pig receiver 14. As the pig 34 approaches the pig ramp 60, the ramp segments 64, 66 separate the pig 34 from the inner walls of the tubular 20, thereby directing the pig 34 onto the pig ramp 60. Next, the liquid is drained from the pig 34 (block 336). For example, because the ramp segments 64, 66 of the pig ramp 60 elevate the pig 34 above the bottom wall of the tubular 20, the liquid accumulating on and/or around the pig 34 drains downwardly toward the bottom of the tubular 20. As a result, the pig 34 may be substantially dry when the pig 34 is removed from the pig receiver 14 because the liquid drains off of the pig 34 via gravity. Next, the operator checks whether the pig receiver 14 has been depressurized (operator 338). If the pig receiver 14 has not been depressurized (line 340), then the pig receiver 14 is depressurized (block 342). For example, the vents 29, 41 may be utilized to release the pressure accumulated within the pig receiver 14. If the pig receiver 14 has been depressurized (line 344), then the pig receiver 14 is opened (block 346). For example, the door 42 may be moved to an open position to enable access to the interior of the tubular 20 via the outlet 44. Thereafter, the pig 34 is removed from the pig receiver 14 (block 348). For example, the pig 34 is extracted through the ring 62 as the pig ramp 60 remains within the pig receiver 14. In this manner, the accumulated liquid is dammed from exiting the tubular 20 via the ring 62 of the pig ramp 60. As a result, emissions may be decreased during pig removal. After the pig 14 is removed, the method ends (block 350).

Figure 23:
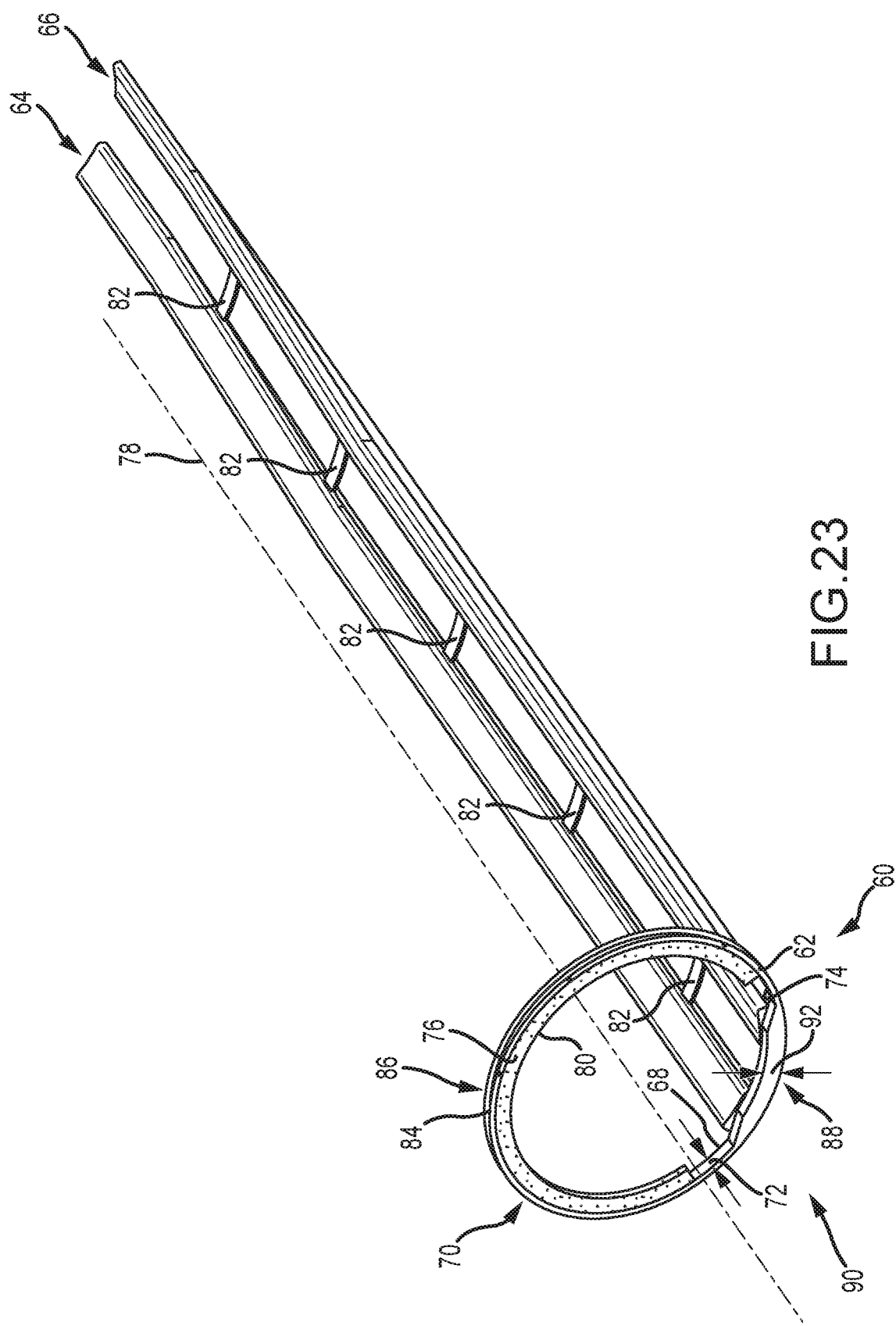
FIG. 23 is a perspective view of an embodiment of a pig ramp, in accordance with an embodiment of the present disclosure.

FIG. 23 is a front perspective view of an embodiment of the pig ramp 60 for use in the pig receiver 14. In the illustrated embodiment, the pig ramp 60 includes the ring 62 (e.g., the frame, the frame portion) and the pair of ramp segments 64, 66 extending from the ring 62. As was described above, in certain embodiments the ramp segments 64, 66 are coupled to the ring 62 at angles (e.g., along the curvature of the ring 62) to facilitate receiving and supporting the pig 34. In the illustrated embodiment, the ramp segments 64, 66 are coupled to the back side 68 of the ring 62. In operation, the back side 68 and the ramp segments 64, 66 will extend into the pig receiver 14 in a direction opposite the flow of the pig 34 (e.g., opposite arrow 36 in FIG. 1). As will be described below, the pig 34 travels along the ramp segments 64, 66 toward the ring 62 for subsequent removal from the pig receiver 14.

In the illustrated embodiment, the ring 62 has a substantially cylindrical shape that enables the ring 62, and the pig ramp 60 itself, to be inserted into the pig receiver 14 such that the ring 62 substantially corresponds to the inner diameter of the pig receiver 14. In other words, the outer diameter 70 of the ring 62 is particularly selected to fit within the inner diameter of the tubular 20 that forms at least a portion of the pig receiver 14. As illustrated, the ring 62 has the thickness 72 and the inner diameter 74. The inner diameter 74 is necessarily smaller than the inner diameter of the tubular 20, and therefore provides reduced clearance for the pig 34 when the pig 34 is removed from the pig receiver 14. As will be described below, this reduced diameter enables the pig ramp 60 to remove debris and/or liquid that is stuck to the pig 34 before removal from the pig receiver 14, thereby reducing emissions that may be caused by the removal of the pig 34.

As shown in FIG. 23, the pig ramp 60 includes a gasket 76. The gasket 76 is coupled to the ring 62 via fasteners (not shown) that arrange the gasket 76 circumferentially about the inner diameter 74. In the illustrated embodiment, the gasket 76 extends radially inward, toward the longitudinal axis 78 of the pig ramp 60, and forms a gasket inner diameter 80. The gasket inner diameter 80 is smaller than the inner diameter 74, which further reduces the clearance that the pig 34 passes through when the pig 34 is removed from the pig receiver 14. Accordingly, the pig 34 is cleaned of debris and/or liquid as the pig 34 passes through the gasket inner diameter 80. In certain embodiments, the gasket 76 is formed from flexible or semi-flexible materials, such as rubber, silicone, metal, neoprene, nitrile rubber, fiberglass, polytetrafluoroethylene (e.g., PTFE or Teflon), cork-elastomer, or plastic polymer (e.g., polychlorotrifluoroethylene). Therefore, as the pig 34 passes through the inner diameter 80 and out of the pig receiver 14, the gasket 76 may flex or bend as it cleans and removes debris and liquid from the pig 34. As will be appreciated, the material that forms the gasket 76 may be particularly selected to accommodate the various materials that may be flowing through the pipeline 30. For example, gaskets 76 used with heavy oils may be formed from fluorocarbon rubber, or gaskets 76 used with natural gas may be formed from nitrile rubber. In this manner, the gasket 76 may be utilized repeatedly to effectively clean debris and liquid from the pig 34 before the pig 34 is removed from the pig receiver 14.

Returning to the ramp segments 64, 66, in the illustrated embodiment the ramp segments 64, 66 are coupled together via the plurality of ramp connectors 82. While the illustrated embodiment includes the plurality of ramp connectors 82, in other embodiments there may be only one ramp connector 82 or no ramp connectors 82. As will be described below, in certain embodiments the ramp connectors 82 includes a curve or bend due to the angular mounting of the ramp segments 64, 66 to the ring 62. Moreover, the angular bend of the ramp connectors 82 redistributes forces along the curved edge more effectively than a straight edge would. However, it should be appreciated that each ramp connector 82 may not be identical. For example, some ramp connectors 82 may include curved edges while other ramp connectors may have substantially straight edges.

In the illustrated embodiment, the ring 62 includes the groove 84 formed along the circumference of the ring 62. In certain embodiments, the groove 84 may receive the seal 86 that is positioned, at least partially, within the groove 84. For example, a portion of the seal 86 may extend radially outward from the groove 84. The seal 86 may form a barrier between the ring 62 and the inner diameter of the tubular 20 of the pig receiver 14, thereby substantially blocking liquid or gaseous emission from flowing out of the pig receiver 14 through the space between the ring 62 and the tubular 20. Moreover, the seal 86 may be utilized to maintain the position of the pig ramp 60 within the pig receiver 14. For example, as described above, product flowing through the pipeline 30 is utilized to drive movement of the pig 34 through the pipeline 30. In certain embodiments, the pig 34 may impart a force on the pig ramp 60 when the pig 34 is driven toward the pig receiver 14. The seal 86 may, at least partially, absorb a portion of the force imparted by the pig 34, thereby preventing the pig ramp 60 from moving or sliding within the pig receiver 14.

Furthermore, as shown in the illustrated embodiment, the ring 62 includes the lip 88 at the lower portion 90 of the ring 62. As will be described below, the lip 88 extends radially inward toward the longitudinal axis 78 and forms a surface that enables the ramp segments 64, 66 to couple to the ring 62. This is, because the thickness 92 of the lip 88 is greater than the thickness 72 of the ring 62, larger forces can be transmitted to the lip 88, thereby improving the reliability and longevity of the pig ramp 60.

Figure 24:
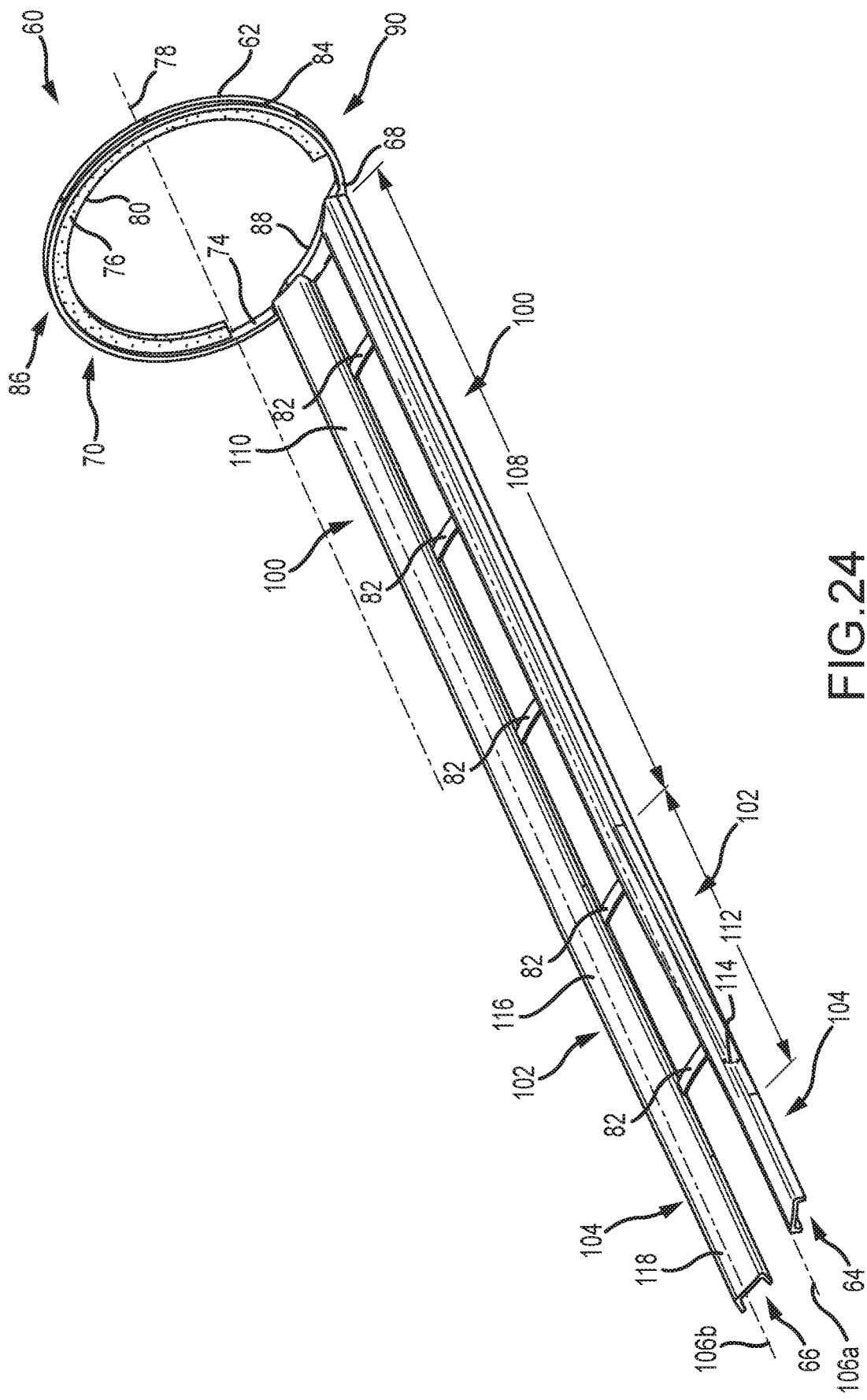
FIG. 24 is a rear perspective view of the pig ramp of FIG. 23, in accordance with an embodiment of the present disclosure.

FIG. 24 is a rear perspective view of the pig ramp 60. As shown in the illustrated embodiment, the ramp segments 64, 66 extend longitudinally away from the ring 62 and substantially parallel to the longitudinal axis 78. The ramp segments 64, 66 are coupled to the lip 88 on the back side 68 of the ring 62. In certain embodiments, the ramp segments 64, 66 are welded to the lip 88. However, in other embodiments, the ramp segments 64, 66 can be otherwise connected to the lip 88, for example, via fasteners, adhesives, or the like. In operation, the pig 34 will rest on the ramp segments 64, 66 when it is in the pig receiver 14. Accordingly, the connection between the ramp segments 64, 66 and the ring 62 is particularly selected to provide sufficient strength and flexibility to receive pigs 34 having a variety of sizes and weights.

In the illustrated embodiment, the ramp segments 64, 66 are positioned at angles relative to one another along the circumference of the ring 62. In other words, the ramp segments 64, 66 are arranged along the arc formed by the ring 62 to provide an angled platform to receive the pig 34. As will be described below, this angled position of the ramp segments 64, 66 enables the pig ramp 60 to receive pigs 34 having a variety of sizes. Moreover, the angled position of the ramp segments 64, 66 directs debris and liquid from the pig 34 downward toward the inner diameter of the tubular 20 forming the pig receiver 14. In this manner, the debris and liquid can be removed from the pig 34 before the pig 34 is removed from the pig receiver 14, thereby reducing emissions during removal.

As shown in FIG. 24, the ramp segments 64, 66 each include the first segment 100, the second segment 102, and the third segment 104. That is, the respective ramp segment axis 106 of the ramp segments 64, 66 extends along the ramp segment 64 substantially parallel to the longitudinal axis 78. Moreover, each of the first segment 100, the second segment 102, and the third segment 104 is arranged substantially coaxially along the ramp segment axis 106. In certain embodiments, the ramp segments 64, 66 may be substantially identical to one another. Also, in certain embodiments, the ramp segments 64, 66 may not be identical for one another. For example, one may be longer, shorter, wider, positioned at a different angle, or have different segment lengths.

In the illustrated embodiment, the first segment 100 has the first segment length 108 extending longitudinally away from the ring 62 along the respective ramp segment axis 106a, 106b. The first segment length 108 may be particularly selected to be substantially equal to a length of the pig 34. However, in other embodiments, the first segment length 108 may be longer than or shorter than the length of the pig 34. As will be appreciated, selecting the first segment length 108 to be substantially similar to the length of the pig 34 provides support for the pig 34 on the pig ramp 60. In the illustrated embodiment, the first segment surface 110 is substantially planar. That is, the first segment surface 108 is substantially flat and substantially parallel to the longitudinal axis 78. This provides a flat, secure surface for the pig 34. However, it should be appreciated that in other embodiments the first segment surface 110 may not be planar and/or flat. For example, the first segment surface 110 may include knurling, textures, adhesives, or other features to further secure the pig 34 to the first segment surface 110.

As shown in FIG. 24, the second segment 102 has the second segment length 112 that is shorter than the first segment length 108, in the illustrated embodiment. However, it should be appreciated that, in certain embodiments, the second segment length 112 may be greater than or equal to the first segment length 108. In the illustrated embodiment, the second segment 102 is downwardly angled, relative to the first segment 100. In other words, the angle 114 is formed between the first segment surface 110 and the second segment surface 116. In certain embodiments, the angled second segment surface 116 facilitates the drainage and removal of liquids from the pig 34. For example, liquid on the pig 34 may run down toward the ramp segments 64, 66, via gravity. As the liquid flows down the ramp segments 64, 66, the angled second segment surface 116 directs the liquid away from the pig 34 and toward the third segment 104. In this manner, liquids removed from the pig 34 are directed away from the pig 34, thereby decreasing emissions when the pig 34 is removed from the pig receiver 14. Moreover, as will be described below, the angled second segment 102 may facilitate positioning the pig 34 on the pig ramp 60. For example, as shown in the illustrated embodiment, the far end (e.g., the end farther away from the ring 62) of the second segment 102 is at a lower vertical position than the first segment 100. As a result, the second segment 102 will be positioned closer to the inner bore of the tubular 20 forming the pig receiver 14 than the first segment 100. As the pig 34 is driven toward the pig receiver 14, the lower second segment 102 enables the pig ramp 60 to direct larger pigs 34 toward the ring 62, thereby enabling operation of the pig ramp 60 with a variety of pig 34 sizes. Furthermore, as described in detail above, positioning the pig 34 on the ramp segments 64, 66 elevates the pig 34 above the inner tubular wall 270 of the tubular 20, thereby forming an area for the fluid 46 to accumulate before the pig 34 is removed from the pig receiver 14.

In the illustrated embodiment, the third segment 104 is coupled to the second segment 102, which is coupled to the first segment 100. In certain embodiments, the first, second, and third segments 100, 102, 104 are coupled together via welding, fasteners, or the like. However, in certain embodiments, the first, second, and third segments 100, 102, 104 are an integral piece forming the respective ramp segments 64, 66. Moreover, as illustrated, the first, second, and third segments 100, 102, 104 are arranged in a substantially side-by-side coaxial relationship. That is, the ramp segments 64, 66 are substantially parallel to the longitudinal axis 78. However, in certain embodiments, the ramp segments 64, 66 may be inwardly angled (e.g., toward the longitudinal axis) or outwardly angled (e.g., away from the longitudinal axis).

As shown in FIG. 24, the third segment surface 118 is positioned lower than the first segment surface 110 and the second segment surface 116. In other words, because the third segment 104 is coupled to the downwardly angled second segment 102, the third segment 104 is arranged lower (e.g., closer to the inner diameter of the tubular 102) than the first and second segments 100, 102. In operation, the third segment 104 may be utilized to lift and direct the pig 34 away from the inner diameter of the tubular 102 forming the pig receiver 14 and toward the first segment 100. For example, in certain embodiments, the pig 34 contacts the inner diameter of the tubular 102 in order to remove debris, sediment, deposits, and the like from the walls of the tubular 102. As the pig 34 is moved toward the pig ramp 60, the third segment 104 may contact the pig 34 first, because the third segment 104 is closer to the walls of the tubular 102. As a result, the third segment 104 may provide separation of the pig 34 from the walls of the tubular 20, thereby directing the pig 34 toward the ring 62 for subsequent removal from the pig receiver 14.

Figure 25:
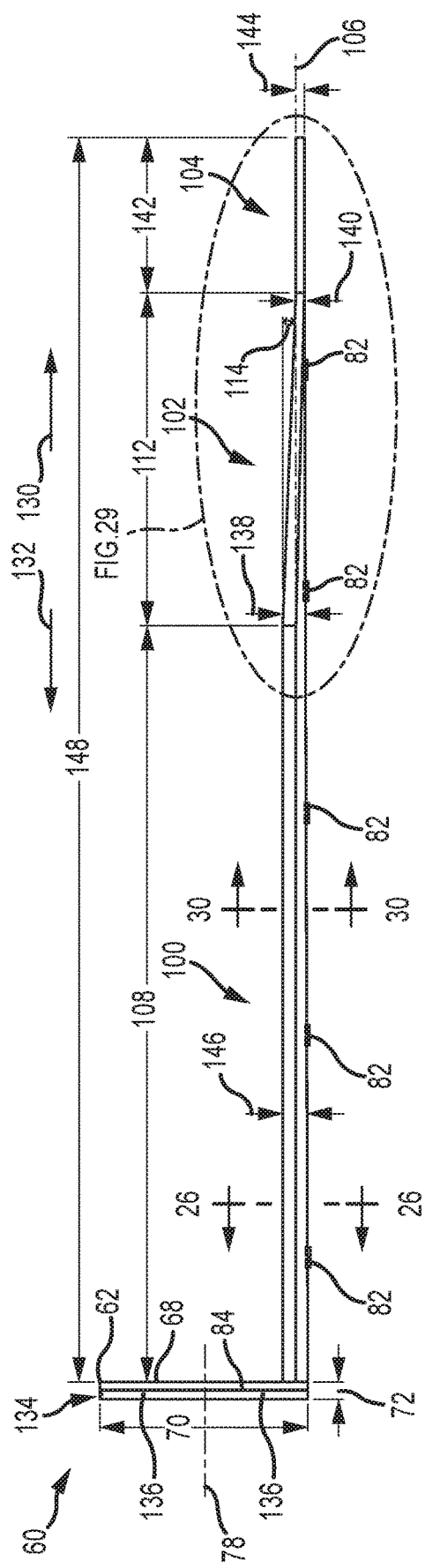
FIG. 25 is a side elevational view of the pig ramp of FIG. 23, in accordance with an embodiment of the present disclosure.

FIG. 25 is a side elevational view of the pig ramp 60. In operation, as will be described below, the ring 62 is arranged proximate the outlet 44 of the pig receiver 14 and the ramp segments 64, 66 extend inwardly (e.g., longitudinally away from the ring 62) into the tubular 20 forming the pig receiver 14. Accordingly, the arrow 130 will be utilized to represent the upstream direction (relative to the direction of movement of the pig 34) and the arrow 132 will be utilized to represent the downstream direction (relative to the direction of movement of the pig 34).

In the illustrated embodiment, the ring 62 is arranged at the upstream side 130 of the pig ramp 60. As illustrated, the ring 62 includes the groove 84 extending substantially about a circumference 134 of the ring 62. In other words, the groove 84 may extend substantially about the entire ring 62, thereby facilitating installation of a seal 86 about the ring 62. However, in certain embodiments, the groove 84 and the seal 86 may be omitted. Furthermore, in the illustrated embodiment, the ring 62 includes holes 136 for receiving fasteners to couple the gasket 76 to the ring. The illustrated embodiment includes two visible holes 136, however, in other embodiments there may be more or fewer holes. Furthermore, the holes 136 may be evenly spaced about the circumference 134 of the ring 62. For example, in certain embodiments, the ring 62 includes five holes 136 positioned at different locations about the circumference 134. In certain embodiments, the holes 136 may be formed within the groove 84. However, in other embodiments, for example, where there is no groove 84, the holes 136 are formed in any reasonable position along the circumference 134 of the ring 62.

As shown in FIG. 25, the ramp segments 64, 66 extend in the upstream direction 130 from the back side 68 of the ring 62. In certain embodiments, the ramp segments 64, 66 are formed from steel channel (e.g., C channel, c-shaped structural steel) having legs that end farther downward (e.g., toward the inner diameter of the pipe) than the top surface. As described above, the first segment 100 extends in the upstream direction 130 for the first segment length 108. The first segment surface 110 is substantially parallel to the longitudinal axis 78, in the illustrated embodiment, and provides a seating surface for the pig 34 when the pig 34 is driven toward the ring 62. As will be appreciated, the first segment length 108 may be particularly selected to accommodate a variety of pig receiver 14 configurations and pigs 34.

In the illustrated embodiment, the second segment 102 is coupled to the first segment 102 and extends in the upstream direction 130 for the second segment length 112. As described above, the angle 114 is formed between the first segment surface 110 and the second segment surface 116. In other words, the second segment surface 116 is downwardly angled relative to the first segment surface 110. As a result, the second segment surface 116 is lower (e.g., closer to the bottom wall of the tubular 20) than the first segment surface 110, when the pig ramp 60 is positioned in the pig receiver 14. Therefore, the pig 34 may be separated from the inner wall of the tubular 20 and directed toward the first segment surface 110 when the pig 34 is driven along the second segment length 112.

In certain embodiments, the second segment 102 includes a variable thickness. That is, a downstream second segment thickness 138 may be larger than an upstream second segment thickness 140. For example, as described above, in certain embodiments the ramp segments 64, 66 are formed from C channel. As a result, the legs of the C channel may, at least partially, account for the thickness of the ramp segments 64, 66. Moreover, the legs of the C channel may be removed from a portion of the ramp segments 64, 66, thereby decreasing the upstream second segment thickness 140. In this manner, the thickness of the second segment 102 may decrease in the upstream direction 130.

As illustrated in FIG. 25, the third segment 104 is coupled to the second segment 102 and extends in the upstream direction 130 for the third segment length 142. In the illustrated embodiment, the third segment length 142 is less than the first segment length 108 and the second segment length 112. However, in certain embodiments, the third segment length 142 may be greater than or equal to the first segment length 108 and/or the second segment length 112. As described above, it should be appreciated that the third segment length 142 is particularly selected to accommodate the pig 34 and/or the pig receiver 14. That is, the third segment length 142 may be modified based on the size of the pig 34 and/or the pig receiver 14.

In the illustrated embodiment, the third segment thickness 144 is less than the first segment thickness 146 and the downstream second segment thickness 138. However, it should be appreciated that in certain embodiments the third segment thickness 144 may be greater than or equal to the first segment thickness 146 and the downstream second segment thickness 138. Moreover, as shown in the illustrated embodiment, the upstream second segment thickness 140 is substantially equal to the third segment thickness 144. However, it should be appreciated that in certain embodiments the third segment thickness 144 may be greater than or less than the upstream second segment thickness 140. The third segment thickness 144 determines the distance the third segment surface 118 is above the inner diameter of the tubular 20. As a result, the larger the third segment thickness 144, the farther way from the inner diameter the third segment surface 118. Therefore, in certain embodiments, the third segment thickness 144 may be particularly selected based on the diameter of the pig 34 to facilitate movement of the pig 34 along the ramp segments 64, 66 and toward the ring 62. Moreover, in certain embodiments, the third segment 104 may taper down to be substantially flat at the end, as described in detail above. However, in certain embodiments, as illustrated in FIG. 25, the end of the third segment 104 may be taper down to be substantially flat.

As shown in FIG. 25, the pig ramp 60 has the pig ramp length 148 formed by the ring thickness 72, the first segment length 108, the second segment length 112, and the third segment length 142. In certain embodiments, the pig ramp length 148 is particularly selected to accommodate the pig 34. For example, the pig ramp length 148 may be longer than a length of the pig 34, thereby providing a sufficient platform to receive and support the pig 34 before the pig 34 is removed from the pig receiver 14. Moreover, the longer pig ramp length 148 may further facilitate removal of debris and liquids from the pig 34. For example, as the pig 34 is propelled along the pig ramp 60, contact between the pig 34 and the ramp segments 64, 66 may scrape debris from the pig 34. This debris remains in the pig receiver 14, instead of being removed with the pig 34, and thereby decreases emissions when the pig 34 is removed from the pig receiver 14.

Figure 26:
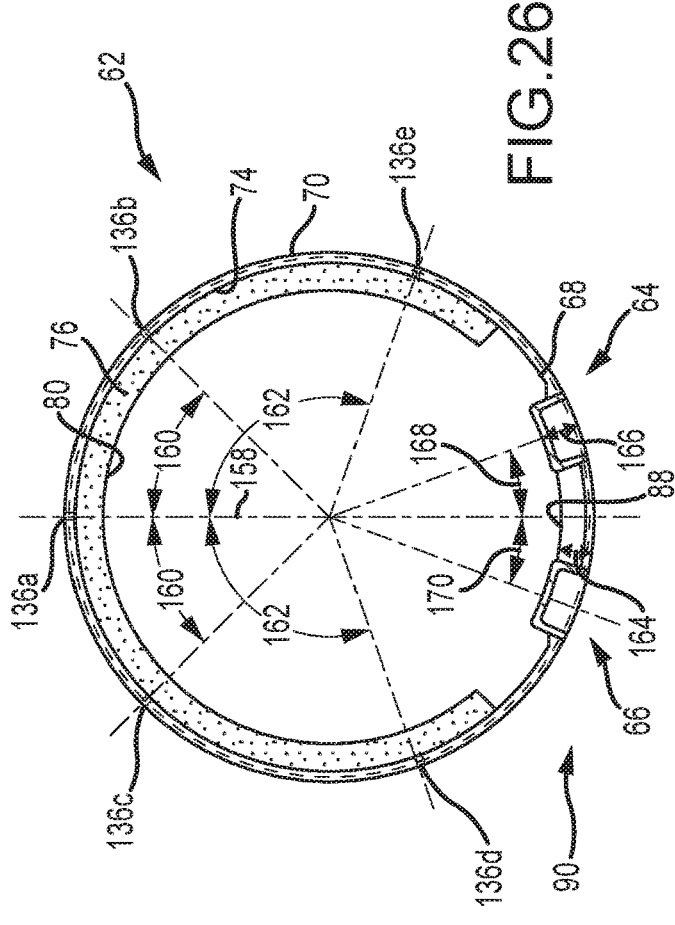
FIG. 26 is a rear sectional view, taken along line 26-26, of the pig ramp of FIG. 23, in accordance with an embodiment of the present disclosure.

FIG. 26 is a rear cross-sectional view, taken along line 26-26, of the pig ramp 60. As shown in the illustrated embodiment, the ramp segments 64, 66 are coupled to the ring 62 on the back side 68 (e.g., upstream side 130) of the ring 62. In the illustrated embodiment, the gasket 76 extends radially inward toward the longitudinal axis 78, forming the gasket inner diameter 80. As shown, the gasket inner diameter 80 is less than the inner diameter 74 of the ring 62. Accordingly, as the pig 34 is removed from the pig receiver 14 through the ring 62, the pig 34 will contact the gasket 76, which will clean and/or remove debris and liquids from the pig 34.

In the illustrated embodiment, the holes 136 are arranged about the circumference 134 of the ring 62. In the illustrated embodiment, there are five holes 136, however, in other embodiments there may be more or fewer holes 136. As shown, there is the first hole 136a arranged along the radial axis 158. Additionally, second and third holes 136b, 136c are positioned at the first hole angle 160, relative to the radial axis 158. For example, in certain embodiments, the first hole angle 160 can be approximately 30 degrees, approximately 35 degrees, approximately 40 degrees, approximately 45 degrees, approximately 50 degrees, or any other reasonable angle. Moreover, as illustrated, fourth and fifth holes 136d, 136e are positioned at the second hole angle 162, relative to the radial axis 158. In certain embodiments, the second hole angle 162 can be approximately 90 degrees, approximately 95 degrees, approximately 100 degrees, approximately 105 degrees, approximately 110 degrees, or any other reasonable angle. As a result, the gasket 76 may be supported and coupled to the ring 62 from a variety of positions, thereby improving rigidity of the gasket 76 and reducing the likelihood of premature wear.

As shown in FIG. 26, the lip 88 is arranged at the lower portion 90 of the ring 62 to facilitate coupling of the ramp segments 64, 66 to the ring 62. As illustrated, the lip 88 has the lip height 164 that extends radially inward toward the longitudinal axis 78 from the outer diameter 70. In the illustrated embodiment, the ramp segments 64, 66 are coupled to the lip 88 such that the lip height 164 is substantially equal to the ramp segment height 166. As described above, the ramp segments 64, 66 are arranged at angles about the circumference 134 of the ring 62, which positions the respective ramp segment surfaces (e.g., the first segment surface 110, the second segment surface 116, the third segment surface 118) at angles. In the illustrated embodiment, the ramp segments 64, 66 are arranged at ramp segment angles 168, 170 with respect to the radial axis 158. For example, the ramp segment angles 168, 170 may be approximately 10 degrees, approximately 15 degrees, approximately 20 degrees, approximately 25 degrees, approximately 30 degrees, or any other reasonable angle. Furthermore, while the ramp segment angles 168, 170 are substantially equal in the illustrated embodiment, in other embodiments the ramp segment angles 168, 170 may be different. That is, the ramp segments 64, 66 may not be arranged substantially symmetrically about the radial axis 158.

FIG. 27 is a front elevational view of the pig ramp 60. As illustrated, the ring 62 includes the gasket 76 extending radially inward toward the longitudinal axis 78. The gasket 76 is utilized to clear and/or clean debris and liquids from the pig 34 when the pig 34 is removed through the ring 62. For example, the gasket 76 may be formed from a flexible or semi-flexible material that bends and/or gives when the pig 34 is removed through the ring 62. As the gasket 76 drives back to its original position (e.g., before the pig 34 is removed) the force of the gasket 76 against the pig 34 scrapes the debris and liquid off of the pig 34, thereby decreasing emissions when the pig 34 is removed from the pig receiver 14.

In the illustrated embodiment, the lip 88 is visible at the lower portion 90 of the ring 62. As described above, the ramp segments 64, 66 are coupled to the back side 68 of the ring 62 at the lip 88. In the illustrated embodiment, the lip 88 includes the curved center portion 190 and adjacent flat side portions 192, 194. It should be appreciated that the flat side portions 192, 194 may not be flat (e.g., horizontal, perpendicular to the radial axis 158) in all embodiments. For example, the flat side portions 192, 194 may be arranged at acute or obtuse angles, relative to the radial axis 158. In this manner, the lip 88 may be shaped to accommodate pigs 34 having a variety of sizes.

FIG. 28 is a top plan view of the pig ramp 60. As illustrated, the pig ramp 60 extends the pig ramp length 148 with the ramp segments 64, 66 coupled to the ring 62. In the illustrated embodiment, the respective first, second, and third segments 100, 102, 104 of the ramp segments 64, 66 are axially aligned along the respective ramp segment axis 106. In other words, the ramp segments 64, 66 are substantially parallel to the longitudinal axis 78. Moreover, as shown in the illustrated embodiment, the ramp connectors 82 are arranged between the ramp segments 64, 66 along the pig ramp length 148. In the illustrated embodiment, there are six ramp connectors 82 extending along the pig ramp length 148. However, it should be appreciated that in other embodiments there may be more or fewer ramp connectors 82. In certain embodiments, the ramp connectors are arranged equally spaced along the pig ramp length 148. However, in certain embodiments, additional ramp connectors 82 may be arranged at areas that are anticipated to receive larger loads. For example, the pig 34 may rest on the first segment 100 before the pig 34 is removed from the pig receiver 14. Accordingly, additional ramp connectors 82 may be positioned along the first segment 100 to accommodate the weight of the pig 34.

In the illustrated embodiment, the ramp segments 64, 66 have a respective segment width 210. It should be appreciated that the segment width 210 may be particularly selected to accommodate the size of various pigs 34. For example, larger, heavier pigs may utilize wider segment widths 210 to support the additional size and weight of the pig 34. Moreover, as shown, the pig ramp 60 includes a pig ramp width 212 substantially equal to the segment widths 210 of the ramp segments 64, 66 and a connector width 214. In the illustrated embodiment, the pig ramp width 212 is less than the outer diameter 70 of the ring 62. In certain embodiments, the pig ramp width 212 may be less than the inner diameter 74 of the ring 62 and the gasket inner diameter 80.

Figure 29:
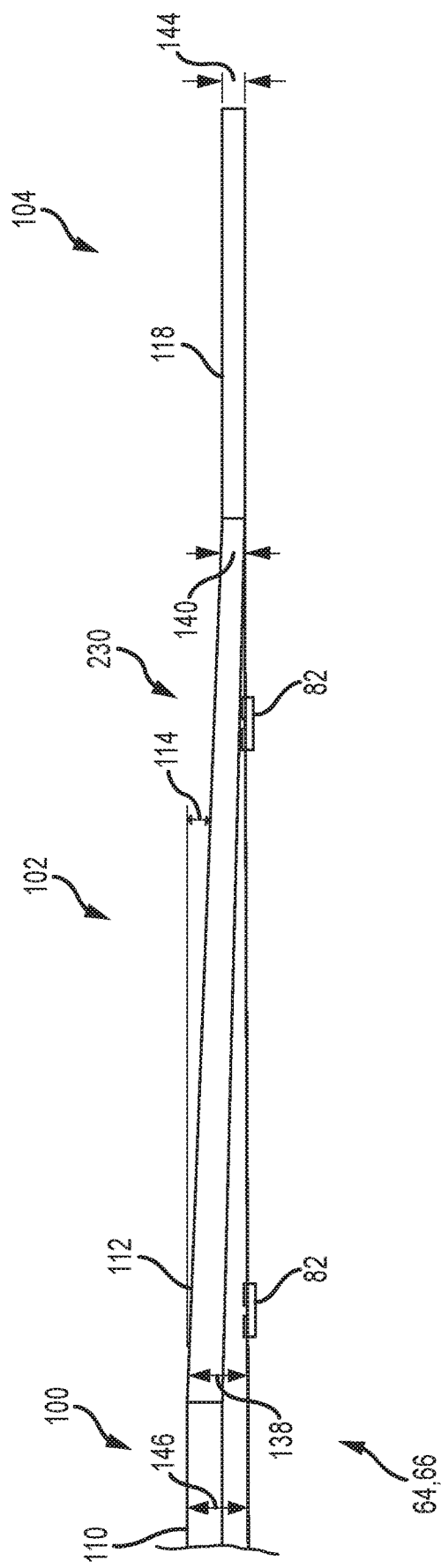
FIG. 29 is a partial detailed view of the pig ramp of FIG. 23, in accordance with an embodiment of the present disclosure.

FIG. 29 is a partial detail view illustrating a transition 230 formed by the second segment 102. As described above, the second segment 102 is arranged between the first segment 100 and the third segment 104. Moreover, the angle 114 is formed between the first segment surface 110 and the second segment surface 116 because the second segment 102 is downwardly inclined relative to the first segment 100. In certain embodiments, the first and second segments 100, 102 are formed from C channel, as described above. Therefore, the legs of the C channel may be reduced (e.g., removed) in order to form the downward incline of the second segment 102. In other words, the downstream second segment thickness 138 is greater than the upstream second segment thickness 140 due to the removal of the C channel forming the ramp segments 64, 66. In the illustrated embodiment, the upstream second segment thickness 140 is substantially equal to the third segment thickness 144. However, it should be appreciated that in other embodiments the upstream second segment thickness 140 and the third segment thickness 144 may not be substantially equal.

Figure 30:
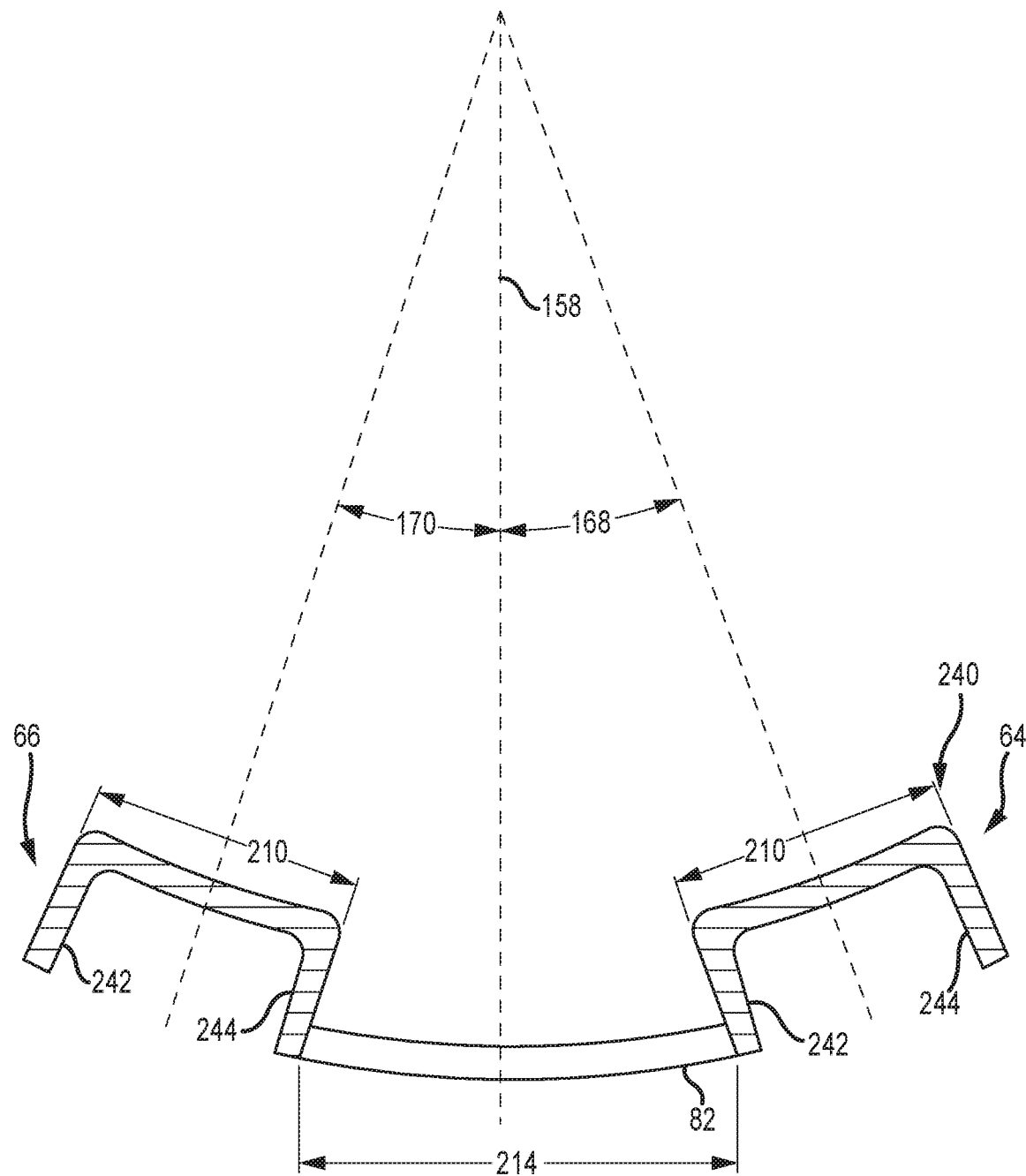
FIG. 30 is a partial sectional view, taken along line 30-30, of the pig ramp of FIG. 23, in accordance with an embodiment of the present disclosure.

FIG. 30 is a partial sectional view, taken along line 30-30, of the ramp segments 64, 66 coupled together via the ramp connector 82. As described above, the ramp segments 64, 66 are arranged at the ramp segment angles 168, 170, relative to the radial axis 158. As such, the respective surfaces (e.g., first segment surface 110, second segment surface 116, third segment surface 118) are arranged at angles with respect to the radial axis 158. As will be appreciated, positioning the ramp segments 64, 66 at angles facilitates receiving and supporting the pig 34 because the pig 34 may have a substantially cylindrical shape.

In the illustrated embodiment, the ramp connector 82 extends between the ramp segments 64, 66 to couple the ramp segments 64, 66 together. As described above, in the illustrated embodiment the ramp segments 64, 66 are formed, at least partially, by C channels having the top portion 240 and the pair of legs 242, 244. However, it should be appreciated that in other embodiments the ramp segments 64, 66 may be formed from solid structures, square channel, standard pipe, or any other suitably shaped material. In the illustrated embodiment, the ramp connector 82 extends between the respective legs 242, 244 of the ramp segments 64, 66. However, it should be appreciated that, in certain embodiments, the ramp connector 82 may couple the ramp segments 64, 66 together via the respective top portions 240.

Figure 31:
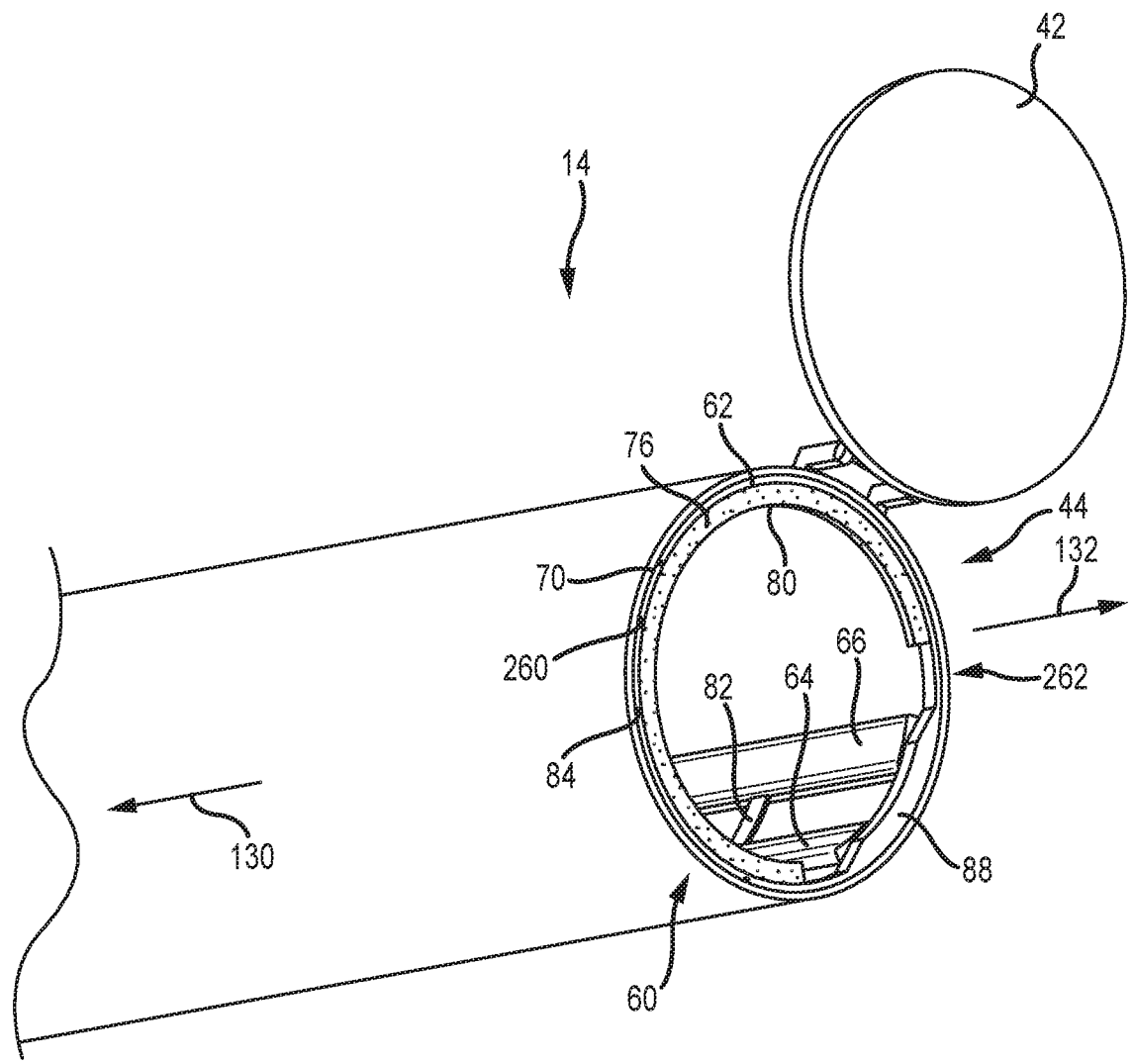
FIG. 31 is a perspective view of an embodiment of the pig ramp of FIG. 23 arranged within a pig receiver, in accordance with an embodiment of the present disclosure.

FIG. 31 is a front perspective view of an embodiment of the pig ramp 60 arranged within the pig receiver 14. As described above, in certain embodiments, the pig receiver 14 is formed, at least partially, by the tubular 20 having the outlet 44 and the door 42. The pig ramp 60 is inserted into the pig receiver 14 such that the ring 62 is proximate the outlet 44 and the ramp segments 64, 66 extend into the pig receiver 14 in the upstream direction 130. As described above, in certain embodiments the pig ramp 60 includes the groove 84 and the seal 86 to facilitate a substantially sealed connection between the ring 62 and an inner diameter 260 of the tubular 20. However, it will be appreciated that in certain embodiments the ring 62 may not include the groove 84 and/or the seal 86 and that the outer diameter 70 of the ring 62 may be particularly selected to securely position the pig ramp 60 within the pig receiver 14.

In the illustrated embodiment, the pig ramp 60 is arranged within the pig receiver 14 such that the lower portion 90 of the ring 62 is proximate a lower portion 262 of the pig receiver 14. In other words, the pig ramp 60 is arranged within the pig receiver 14 such that the ramp segments 64, 66 are arranged along the lower portion 262 of the pig receiver 14. Because of the angled arrangement of the ramp segments 64, 66, the pig ramp 60 sits securely in the pig receiver 14. That is, the angled arrangement of the ramp segments 64, 66 enables the ramp segments 64, 66 to substantially conform to the shape of the tubular 20.

Figure 32:
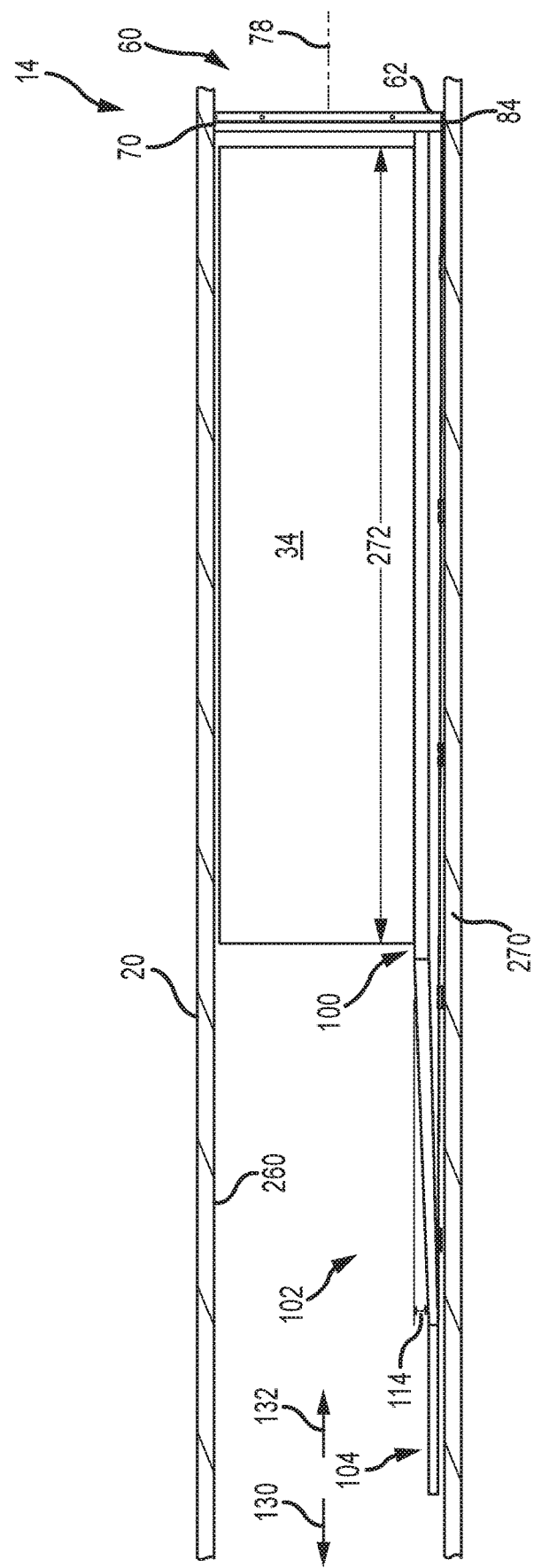
FIG. 32 a schematic sectional view of an embodiment of a pig arranged on the pig ramp of FIG. 23, in accordance with an embodiment of the present disclosure.

FIG. 32 is a partial side elevational view of an embodiment of the pig ramp 60 arranged within the pig receiver 14. As described above, the pig ramp 60 is positioned within the tubular 20 of the pig receiver 14 such that the ring 62 is positioned proximate the outlet 44 and the ramp segments 64, 66 extend longitudinally in the upstream direction 130. In the illustrated embodiment, the first segment 100 is not in contact with the wall 270 of the tubular 20. However, it should be appreciated that, in certain embodiments, the first segment thickness 146 may be particularly selected such that the first segment 100 is in contact with the wall 270. Furthermore, in the illustrated embodiment, the second segment 102 is downwardly angled such that the second segment 102 contacts the wall 270. Moreover, the third segment 104 also contacts the wall 270 to facilitate separation of the pig 34 from the wall 270. That is, as the pig 34 travels through the pipeline 30 and is directed toward the pig receiver 14, the pig 34 contacts the third segment 104 and is separated from the wall 270, thereby directing the pig 34 up the transition 230 and onto the first segment 100.

In the illustrated embodiment, the pig 34 is positioned on the first segment 100 of the ramp segments 64, 66. The pig 34 has been simplified for this discussion and features, such as brushes or tools extending from the pig 34 and into contact with the tubular 20, have been omitted for clarity. As illustrated, a pig length 272 is approximately equal to the first segment length 108. However, it should be appreciated that, in certain embodiments, the pig length 272 may be greater than or less than the first segment length 108. For example, the pig length 272 may be greater than the first segment length 108 and hang over the second segment 102. In the illustrated embodiment, the ramp segments 64, 66 position the pig 34 above the wall 270 proximate the lower portion 262 of the tubular 20, thereby enabling drainage of debris and liquid from the pig 34. For example, droplets of liquid may drain along the pig 34 (e.g., via gravity) and down toward the ramp segments 64, 66. As a result, the liquid remains in the tubular 20 when the pig 34 is removed from the pig receiver 14, thereby reducing emissions upon removal.

Figure 33:
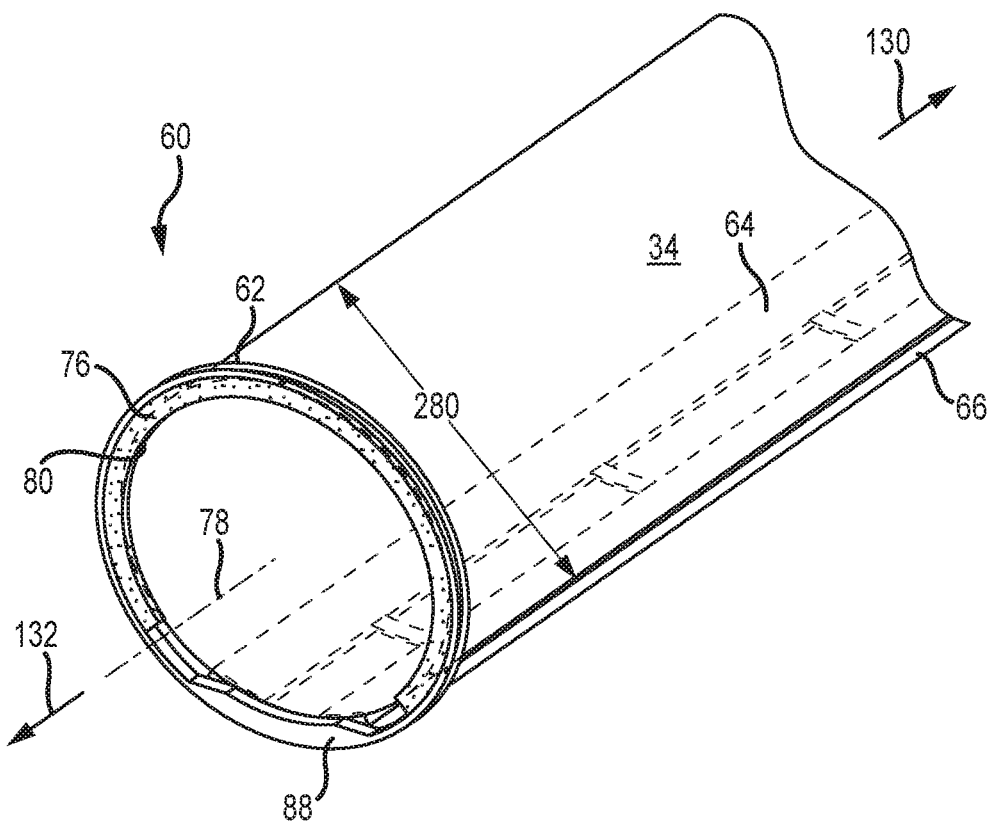
FIG. 33 is a perspective view of an embodiment of a pig positioned on the pig ramp of FIG. 23, in accordance with an embodiment of the present disclosure.

FIG. 33 is a front perspective view of an embodiment of the pig 34 positioned on the pig ramp 60. As described above, the pig 34 is arranged on the ramp segments 64, 66 after the pig 34 moved to the pig receiver 14. In the illustrated embodiment, the pig 34 is positioned on the first segment 100 of the ramp segments 64, 66. As shown, the inner diameter 80 of the gasket 76 is smaller than the outer diameter 280 of the pig 34. As a result, when the pig 34 is removed from the pig receiver 14 (e.g., through the ring 62), the gasket 76 will contact the pig 34 and clean debris and liquid from the outer diameter 280 of the pig 34. Accordingly, the debris and liquid will remain within the pig receiver 14 after the pig 34 is removed, thereby reducing emissions.

Figure 34:
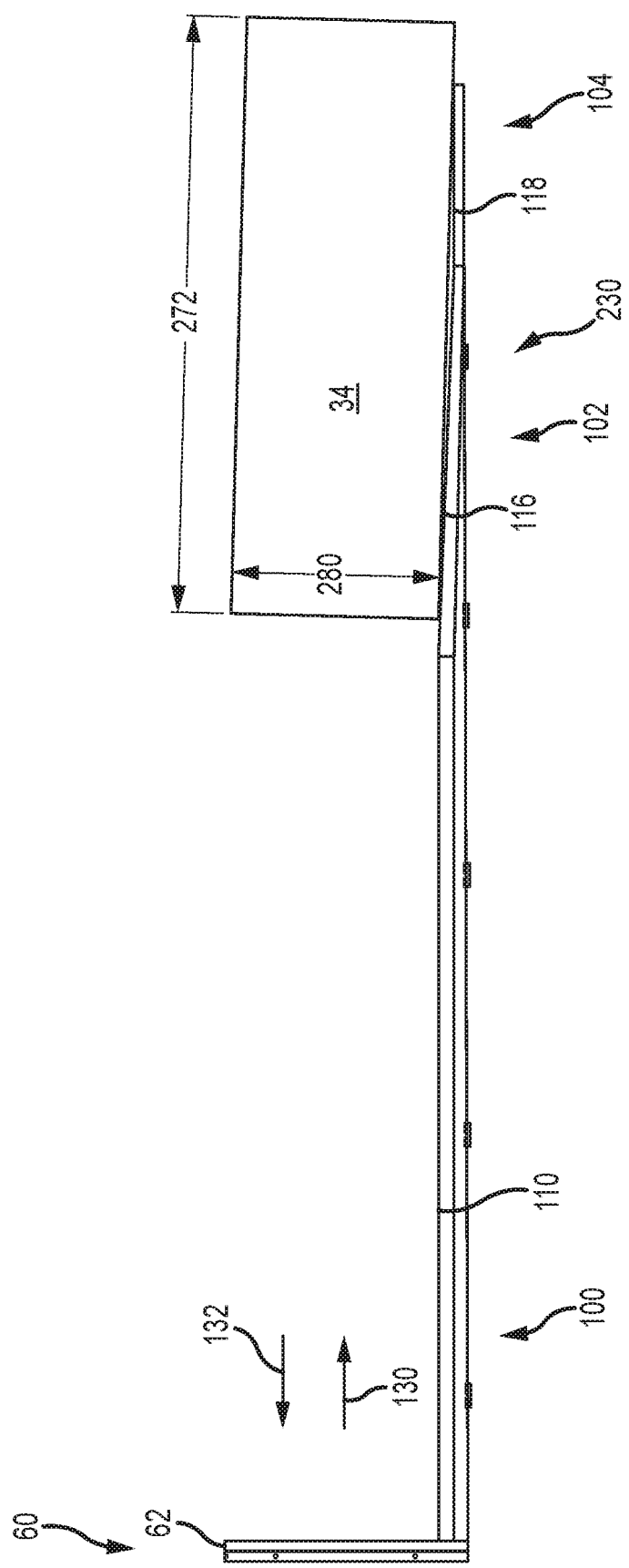
FIG. 34 is a side elevational view of an embodiment of a pig positioned on the pig ramp of FIG. 23, in accordance with an embodiment of the present disclosure.

FIG. 34 is a side elevational view of an embodiment of the pig 34 moving onto the pig ramp 60. In the illustrated embodiment, the pig 34 moves in the downstream direction 138 and contacts the third segment 104. The third segment 104 separates the pig 34 from the tubular wall 270 to direct the pig 34 upward and toward the first segment 100. Thereafter, the pig 34 travels along the transition 230 of the second segment 102 and toward the first segment 100. In this manner, the lower third segment surface 118 and second segment surface 116 are utilized to separate the pig 34 from the wall 270 and direct the pig 34 toward the ring 62.

Figure 35:
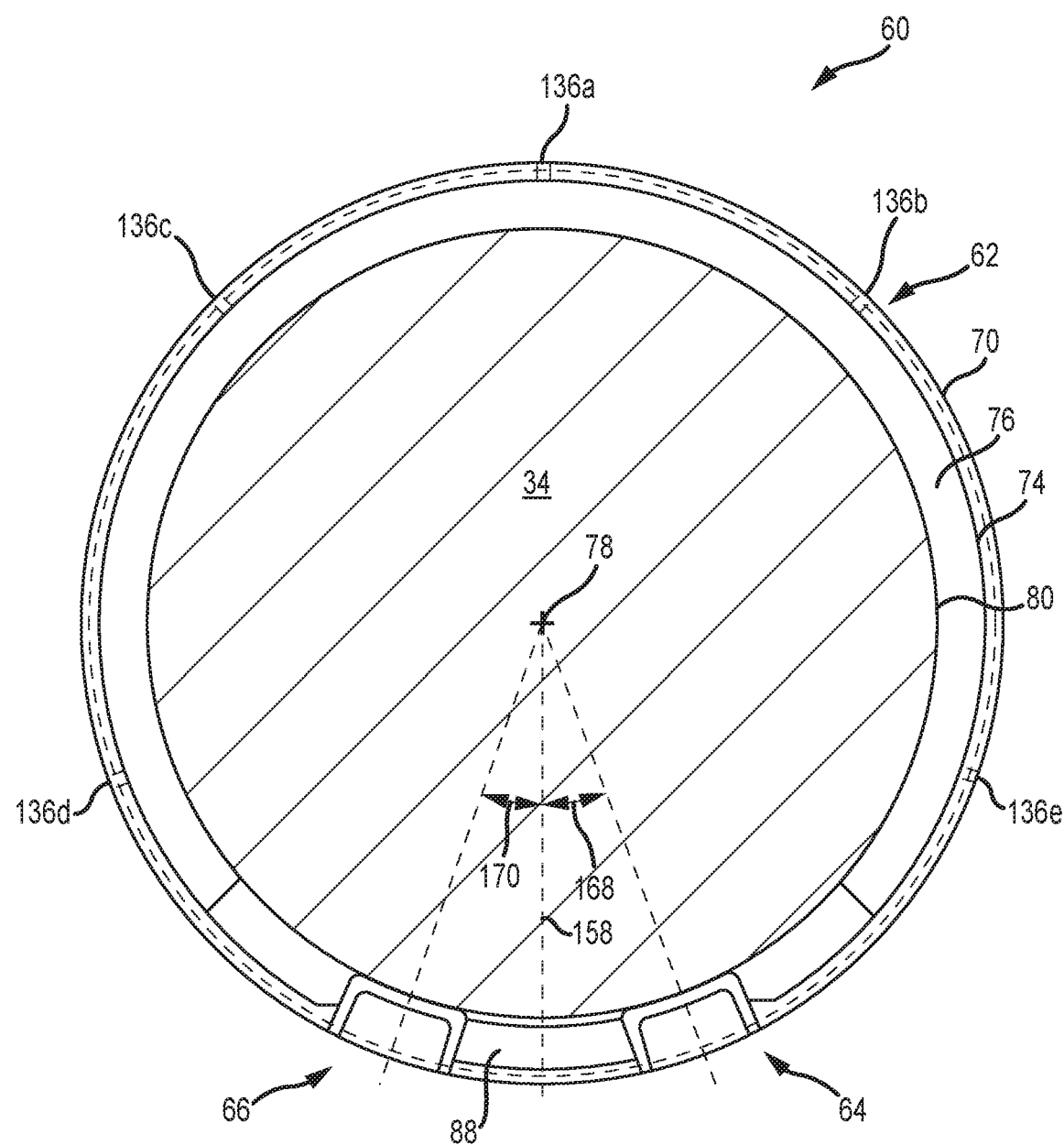
FIG. 35 is a rear elevational view of an embodiment of a pig positioned on the pig ramp of FIG. 23, in accordance with an embodiment of the present disclosure.

FIG. 35 is a rear elevational view of an embodiment of the pig 34 positioned on the pig ramp 60. As described above, by positioning the ramp segments 64, 66 at the respective ramp segment angles 168, 170 the pig 34 is supported on the ramp segments 64, 66 for removal from the pig receiver 14. The angled position of the ramp segments 64, 66 substantially block or minimize side-to-side movement of the pig 34 on the ramp segments 64, 66, thereby facilitating removal from the pig receiver 14. In the illustrated embodiment, the pig outer diameter 280 is larger than the gasket inner diameter 80. As a result, when the pig 34 is removed through the ring 62 the gasket 76 will contact the pig 34 and remove debris and liquid positioned along the pig 34. For example, the gasket 76 will flex as the pig 34 is pulled through the ring 62, as the resilience of the gasket 76 drives in the opposite direction of movement of the pig 34, the gasket 76 will scrape and remove debris and liquid from the pig 34. In the illustrated embodiment, the gasket 76 is coupled to the ring 62 via fasteners (e.g., bolts, screws, rivets, etc.) and extends radially inward toward the longitudinal axis 78.

Figure 36:
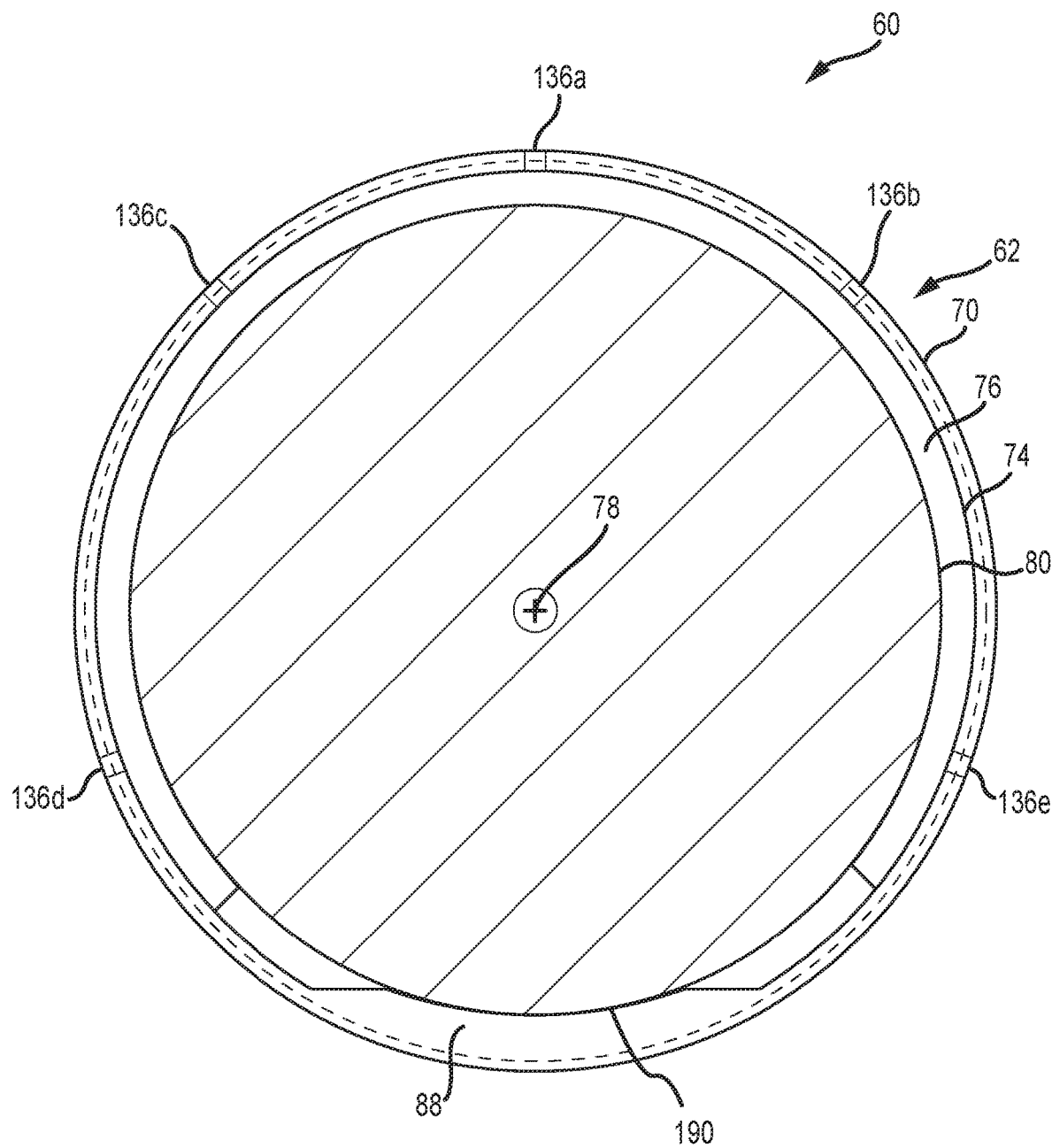
FIG. 36 is a front elevational view of an embodiment of a pig positioned on the pig ramp of FIG. 23, in accordance with an embodiment of the present disclosure.

FIG. 36 is a front elevational view of an embodiment of the pig 34 positioned on the pig ramp 60. In the illustrated embodiment, the ring 62 includes the gasket 76 coupled to the ring 62 via fasteners extending through the holes 136. As illustrated, the inner diameter 80 of the gasket 76 is smaller than the outer diameter 280 of the pig 34, and as a result, the pig 34 will contact the gasket 76 as the pig 34 is pulled through the ring 62. In the illustrated embodiment, the curved center portion 190 is arranged to substantially conform to the curvature of the pig 34, thereby facilitating removal of the pig 34 from the pig ramp 60. In certain embodiments, the lip 88 may be utilized to scrape and/or remove debris and liquid from the pig 34 as the pig 34 is pulled through the ring 62. In this manner, the pig 34 can be cleaned before being removed from the pig receiver 14.

Figure 37:
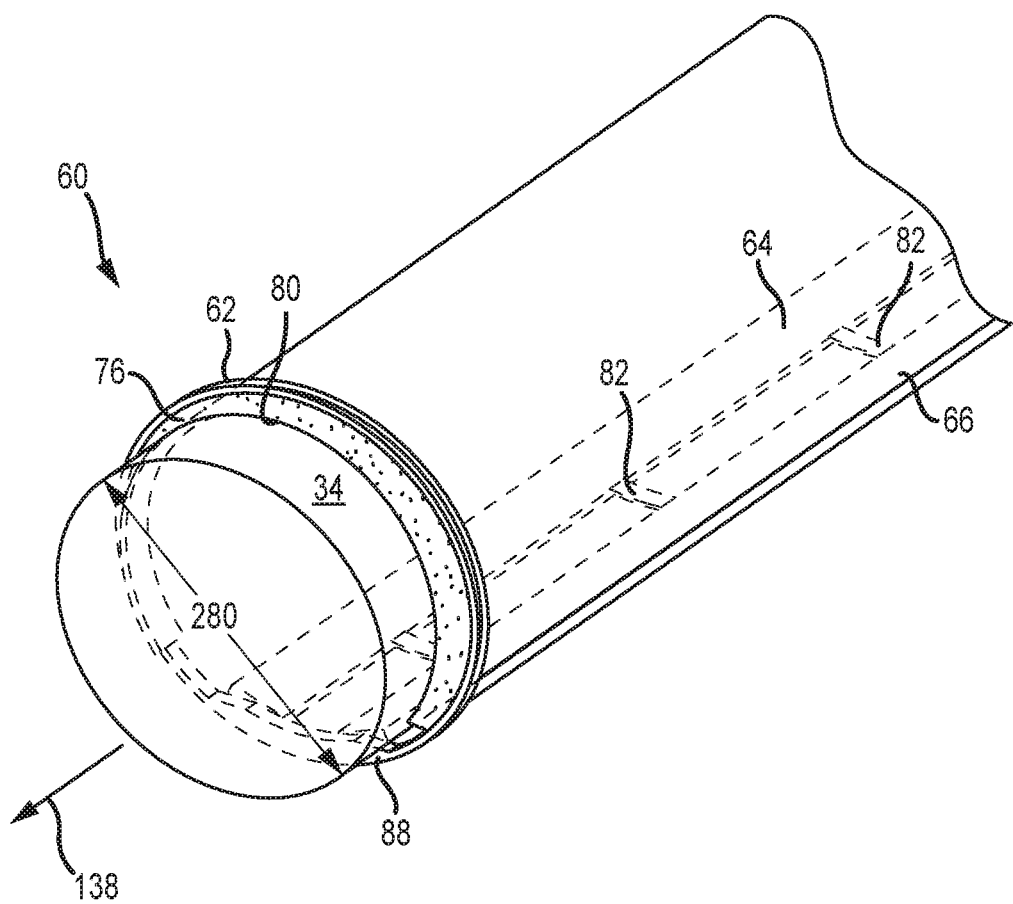
FIG. 37 is a perspective view of an embodiment of a pig being removed from the pig ramp of FIG. 23, in accordance with an embodiment of the present disclosure.

FIG. 37 is a front perspective view of an embodiment of the pig 34 being removed from the pig ramp 60. As described above, in certain embodiments, the pig 34 is pulled through the ring 62 in the downstream direction 132 when the pig 34 is removed from the pig receiver 14. In the illustrated embodiment, the inner diameter 80 of the gasket 76 is smaller than the outer diameter 280 of the pig 34. As a result, when the pig 34 is pulled through the ring 62, the pig 34 will contact the gasket 76. In certain embodiments, the gasket 76 is made from a flexible or semi-flexible, resilient material such as rubber. As the pig 34 travels through the ring 62, the gasket 76 flexes and/or deforms (e.g., elastically deforms) as the pig 34 is removed. Because the gasket 76 is made from resilient material, the gasket 76 resists the force applied by the pig 34, thereby scraping against the sides of the pig 34 to remove debris and liquid as the pig 34 is removed from the pig receiver 14. Moreover, as described above, in certain embodiments the pig 34 also contacts the lip 88 of the ring 62 as the pig 34 is moved in the downstream direction 132. Contact between the pig 34 and the lip 88 further removes debris and liquid from the pig 34, thereby facilitating the cleaning process to reduce emissions when the pig 34 is removed from the pig receiver 14.

Figure 38:
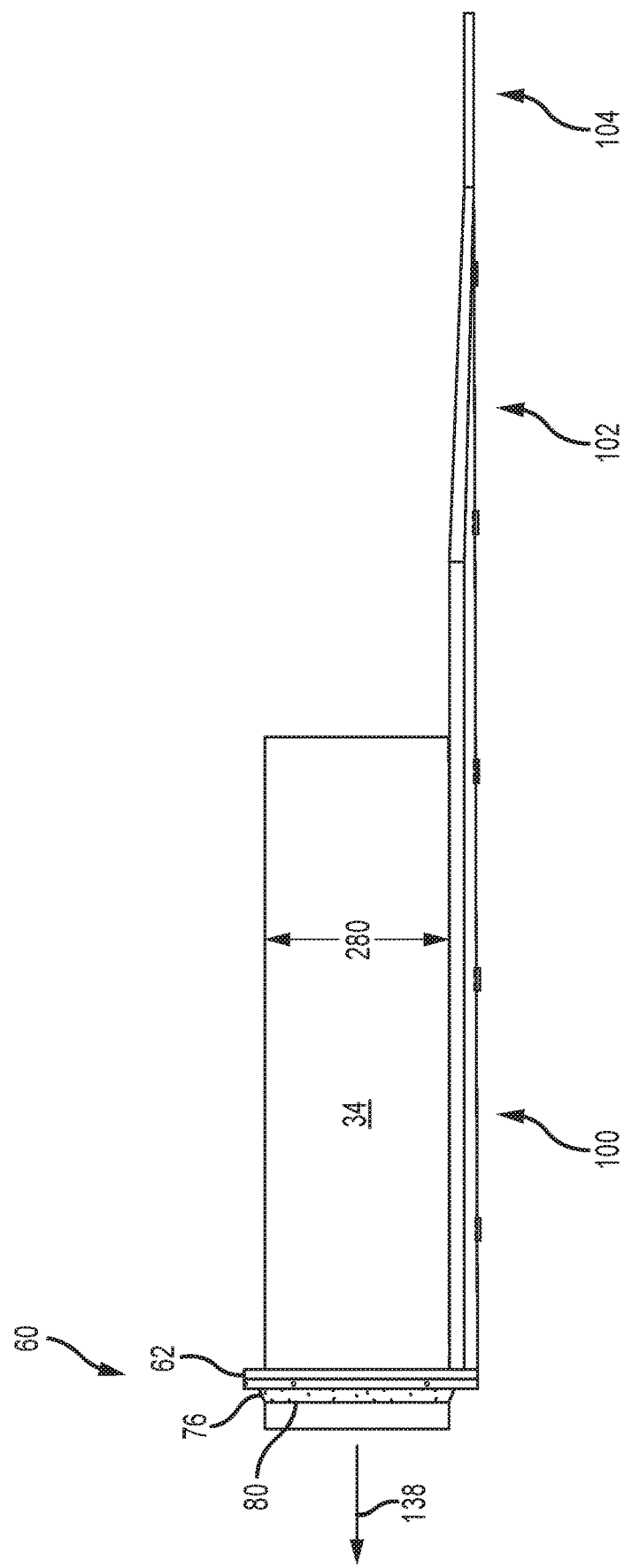
FIG. 38 is a side elevational view of an embodiment of a pig being removed from the pig ramp of FIG. 23, in accordance with an embodiment of the present disclosure.

FIG. 38 is a side elevational view of an embodiment of the pig 34 being removed from the pig ramp 60. As described above, in certain embodiments, the pig 34 is positioned on the first segment 100 and then moved in the downstream direction 132 to be removed from the pig receiver 14. In the illustrated embodiment, the gasket inner diameter 80 is smaller than the outer diameter 280 of the pig 34, and therefore when the pig 34 is moved through the ring 62 the pig 34 contacts the gasket 76. As illustrated, the gasket 76 extends substantially about the ring 62. Furthermore, the pig 34 contacts the gasket 76 as the pig 34 moves in the downstream direction 132, causing the gasket 76 to flex due to the force of the pig 34. As the pig 34 moves through the ring 62, the gasket 76 contacts the outer diameter 280 of the pig 34 and scrapes and cleans debris and liquids from the pig 34. In this manner, the pig 34 is cleaned before being removed from the pig receiver 14, thereby reducing emissions.

Figure 39:
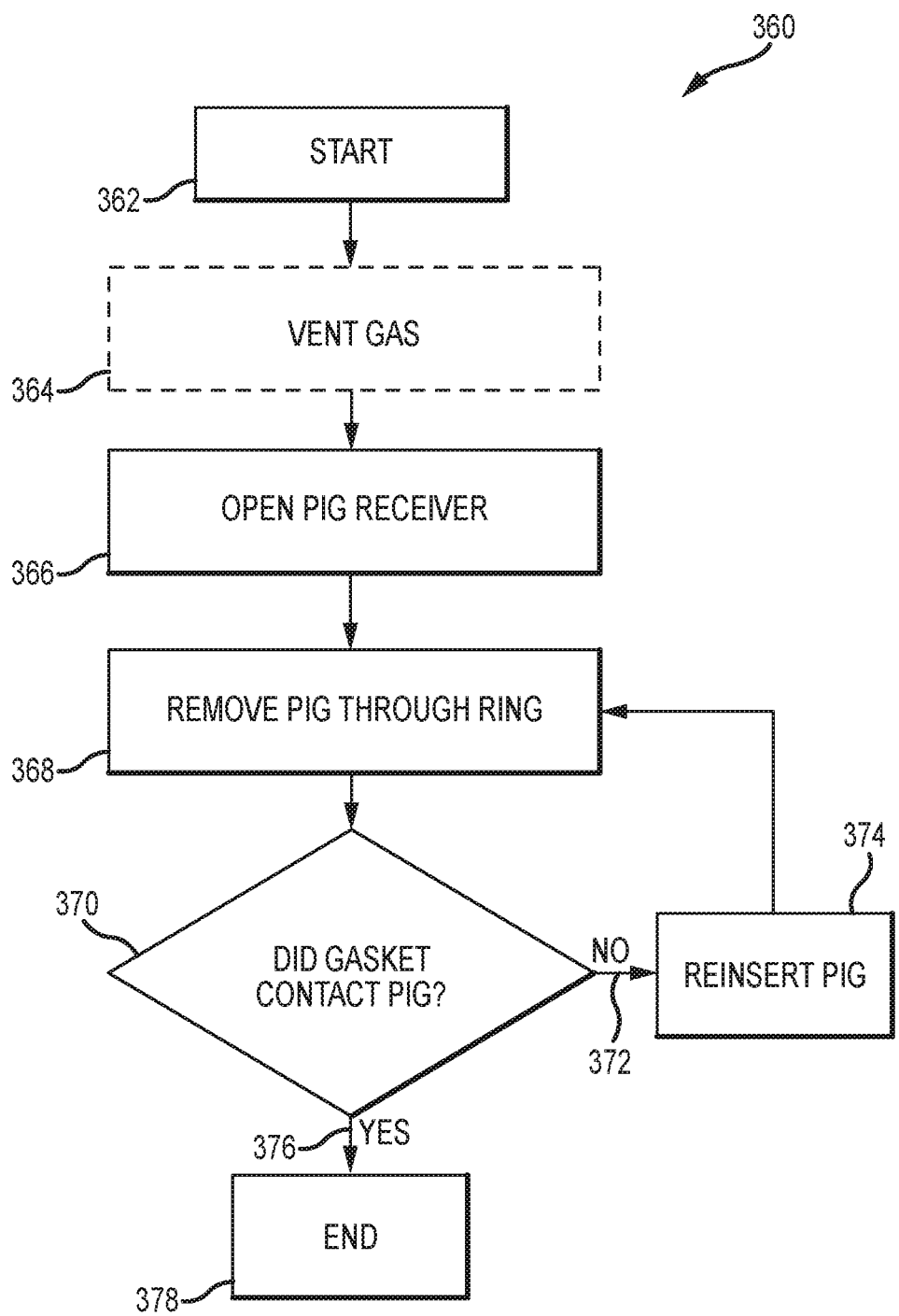
FIG. 39 is a flow chart of an embodiment of a method for removing a pig from the pig ramp of FIG. 23, in accordance with an embodiment of the present disclosure.

FIG. 39 is a flow chart of an embodiment of a method 360 for removing the pig 34 from the pig receiver 14. As described above, after the pig 34 completes pigging operations, the pig 34 is diverted to the pig receiver 14 from the pipeline 30 for removal. The method begins at the start (block 362). Next, in certain embodiments, gas may be vented from the pig receiver 14 (block 364). For example, hydrocarbon gas may build up in the pig receiver 14 due to the diversion of the pig 34 toward the pig receiver 14. In order to avoid emissions, due to the release of hydrocarbon gas, the gas in the pig receiver 14 may vented via the vents 40. Then, the pig receiver 14 is opened (block 366). The outlet 44 to the pig receiver 14 may be opened via removal of the door 42. Moreover, in embodiments where the gas is vented from the pig receiver 14, opening the pig receiver 14 may be simplified because additional pressure is not acting on the door 42. Next, the pig 34 is removed through the ring 62 of the pig ramp 60 (block 368). As described above, the pig 34 may be pulled through the ring 62 in the downstream direction 132 to facilitate removal from the pig receiver 14. Because the ring 62 is substantially the same size as the inner diameter 260 of the tubular 20, in certain embodiments, removal through the ring 62 enables the pig 32 to be removed while the pig ramp 60 maintains a seal on the tubular wall 270, thereby blocking the debris and liquid on the pig 34 from exiting the pig receiver 14. Next, the operator checks whether the gasket 76 contacts the pig 34 (operator 370). In certain embodiments, the gasket 76 is utilized to clean the pig 34 of debris and liquid. For example, as described above, the gasket 76 has a smaller inner diameter 80 than the pig outer diameter 280, in certain embodiments, and thereby contacts the pig 34 as the pig 34 is moved in the downstream direction 132. Moreover, contact between the gasket 76 and the pig 34 facilitates removal of the debris and liquid from the pig 34, while also keeping the removed debris and liquid within the pig receiver 14. If the gasket 76 does not contact the pig 34 (line 372), the pig 34 is reinserted through the ring 62 (block 374). Then, the method 330 returns to block 338. If the gasket 76 does contact the pig 34 (line 376), the method ends (block 378). Accordingly, cleaning of the pig 34 before removal from the pig receiver 14 can be accomplished via the pig ramp 60.

As described in detail above the pig ramp 60 includes the ramp segments 64, 66 extending longitudinally away from the ring 62. In certain embodiments, the ramp segments 64, 66 are arranged at the ramp segment angles 168, 170, relative to the radial axis 158 to position the ramp segments 64, 66 to receive and support the pig 34. The angular position of the ramp segments 64, 66 not only elevates the pig 34 above a tubular wall 270 of the pig receiver 14, but also redistributes the force of the weight of the pig 34. In certain embodiments, the ramp segments 64, 66 are coupled together via the plurality of ramp connectors 82 arranged along the length 148 of the pig ramp 60. As described above, the pig ramp 60 is arranged within the tubular 20 forming at least a portion of the pig receiver 14. Accordingly, the pig 34 is moved through the ring 62 of the pig receiver 14 as the pig 34 is removed from the pig receiver 14. In certain embodiments, fluid 46 may accumulate in the pig receiver 14 after the pig 34 is directed to the pig ramp 60. The ring 62 of the pig ramp 60 may act as a dam to block the accumulated fluid 46 from exiting the outlet 44 of the pig receiver 14 when the pig 34 is removed, thereby decreasing emissions. In certain embodiments, the ring 62 includes the gasket 76 extending radially inward to form the inner diameter 80. As the pig 34 moves through the ring 62, the pig 34 contacts the gasket 76, which acts to scrape and/or remove debris and liquid from the pig 34. In this manner, the pig 34 is cleaned before removal from the pig receiver 14, thereby decreasing emissions.

This application claims the benefit of, and is a continuation of U.S. patent application Ser. No. 16/150,454, filed Oct. 3, 2018, titled "PIG RAMP, SYSTEM AND METHOD," which is a continuation of U.S. patent application Ser. No. 15/987,057, filed May 23, 2018, titled "PIG RAMP, SYSTEM AND METHOD," which is a continuation of U.S. patent application Ser. No. 15/896,172, filed Feb. 14, 2018, titled "PIG RAMP, SYSTEM AND METHOD," now U.S. Pat. No. 10,012,340, issued Jul. 3, 2018, which is a continuation of U.S. patent application Ser. No. 15/896,149, filed Feb. 14, 2018, titled "PIG RAMP, SYSTEM AND METHOD," now U.S. Pat. No. 10,094,508, issued Oct. 9, 2018, which is a divisional of U.S. patent application Ser. No. 15/798,479, filed Oct. 31, 2017, titled "PIG RAMP, SYSTEM AND METHOD," now U.S. Pat. No. 10,001,240, issued Jun. 19, 2018, which is related to, and claims the benefit of, U.S. Provisional Application No. 62/416,646, filed Nov. 2, 2016, titled "PIG RAMP SYSTEM AND METHOD," all of which are incorporated herein by reference in their entireties.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A launching and receiving station connected to a pipeline system, the launching and receiving station comprising:
   a first tubular defining at least a portion of a pig launcher and positioned to launch a pig into a substantially tubular pipeline system, the first tubular having an inlet with a first moveable cover and a first bore;

a second tubular defining at least a portion of a pig receiver positioned to receive a pig therein, the second tubular having an outlet with a second moveable cover and a second bore;

a pig ramp positioned within an interior volume of the pig receiver to receive and support the pig when positioned thereon, the pig ramp having a ring portion through which a pig passes therethrough, when being inserted or removed, and also being positioned within the interior volume of the pig receiver to dam accumulated fluid when positioned in the pig receiver; and a gas vent connected to and in fluid communication with the pig receiver, the gas vent being positioned to vent gas from the pig receiver prior to opening the second moveable cover and when positioned to remove the pig from the pig receiver.

2. The launching and receiving station as defined in claim 1, wherein the pig launcher comprises a skid having a frame to support portions of pipes of the pipeline system.

3. The launching and receiving station as defined in claim 2, wherein the pig launcher comprises footers to support portions of pipes of the pipeline system and thereby define a substantially stationary launching and receiving station.

4. The launching and receiving station as defined in claim 1, wherein at least a portion of the pig ramp include a fluid tight seal formed between a portion of the pig ramp and a portion of the second bore of the pig receiver.

5. The launching and receiving station as defined in claim 4, wherein at least a portion of the pig ramp blocks the accumulated fluid when positioned in the pig receiver from flowing out of the outlet of the pig receiver.

6. The launching and receiving station as defined in claim 1, wherein the pig ramp includes one or more ramp segments longitudinally extending in the interior volume of the pig receiver.

7. The launching and receiving station as defined in claim 6, wherein the one or more ramp segments is arranged at an angle with respect to a radial axis of the portion of the pig ramp to receive and support the pig above a wall portion of the pig receiver.

8. The launching and receiving station as defined in claim 1, wherein the pig ramp includes a lip of the portion to slide the pig along when removing the pig from the pig receiver, the lip being positioned to remove debris accumulating on the pig and keep the debris within the pig receiver when the pig is removed from the pig receiver.

9. The launching and receiving station as defined in claim 8, further comprising a gasket positioned about an inner diameter of a portion of the pig ramp such that the gasket contacts the pig as the pig is removed.

10. The launching and receiving station as defined in claim 1, wherein the pig ramp includes a frame portion having an outer diameter that is substantially similar to an inner diameter of the bore of the pig receiver, the frame portion being positioned proximate the outlet and having an inner diameter larger than an outer diameter of the pig.

11. A pig receiving station connected to a pipeline system, the pig receiving station comprising:

a tubular defining at least a portion of a pig receiver positioned to receive a pig therein, the tubular having an outlet with a moveable cover and a bore;

a pig ramp positioned within an interior volume of bore of the pig receiver to receive and support the pig when positioned thereon, the pig ramp having a ring portion through which a pig passes therethrough, when being inserted or removed, and also being positioned within the pig receiver to dam accumulated fluid when positioned in the pig receiver; and a gas vent connected to and in fluid communication with the pig receiver, the gas vent being positioned to vent gas from the pig receiver prior to opening the moveable cover and when positioned to remove the pig from the pig receiver.

12. The pig receiving station as defined in claim 11, further another tubular having another bore thereby to define a pig launcher and comprising a skid having a frame to support portions of pipes of the pipeline system.

13. The pig receiving station as defined in claim 11, further comprising another tubular having another bore thereby to define a pig launcher and comprising footers to support portions of pipes of the pipeline system, thereby collectively to define a substantially stationary launching and receiving station.

14. The pig receiving station as defined in claim 11, wherein at least a portion of the pig ramp include a fluid tight seal formed between a portion of the pig ramp and a portion of the bore of the pig receiver.

15. The pig receiving station as defined in claim 14, wherein at least a portion of the pig ramp blocks the accumulated fluid when positioned in the pig receiver from flowing out of the outlet of the pig receiver.

16. The pig receiving station as defined in claim 11, wherein the pig ramp includes one or more ramp segments longitudinally extending in the interior volume of the pig receiver.

17. The pig receiving station as defined in claim 16, wherein the one or more ramp segments is arranged at an angle with respect to a radial axis of the portion of the pig ramp to receive and support the pig above a wall portion of the pig receiver.

18. The pig receiving station as defined in claim 11, wherein the pig ramp includes a lip of the portion to slide the pig along when removing the pig from the pig receiver, the lip being positioned to remove debris accumulating on the pig and keep the debris within the pig receiver when the pig is removed from the pig receiver.

19. The pig receiving station as defined in claim 18, further comprising a gasket positioned about an inner diameter of a portion of the pig ramp such that the gasket contacts the pig as the pig is removed.

20. The pig receiving station as defined in claim 11, wherein the pig ramp includes a frame portion having an outer diameter that is substantially similar to an inner diameter of the bore of the pig receiver, the frame portion being positioned proximate the outlet and having an inner diameter larger than an outer diameter of the pig.

21. A pig receiving station connected to a pipeline system, the pig receiving station comprising:

a tubular defining at least a portion of a pig receiver positioned to receive a pig therein, the tubular having an outlet with a moveable cover and a bore;

a pig ramp positioned within an interior volume of bore of the pig receiver to receive and support the pig when positioned thereon, the pig ramp also being positioned within the pig receiver to dam accumulated fluid when positioned in the pig receiver, wherein the pig ramp includes a lip to slide the pig along when removing the pig from the pig receiver, the lip being positioned to remove debris accumulating on the pig and keep the debris within the pig receiver when the pig is removed from the pig receiver; and a gas vent connected to and in fluid communication with the pig receiver, the gas vent being positioned to vent gas from the pig receiver prior to opening the moveable cover and when positioned to remove the pig from the pig receiver.

22. The pig receiving station as defined in claim 2, wherein at least a portion of the pig ramp blocks the accumulated fluid when positioned in the pig receiver from flowing out of the outlet of the pig receiver.

23. The pig receiving station as defined in claim 21, wherein the pig ramp includes one or more ramp segments longitudinally extending in the interior volume of the pig receiver.

24. The pig receiving station as defined in claim 1, further comprising a gasket positioned about an inner diameter of a portion of the pig ramp such that the gasket contacts the pig as the pig is removed.

25. The pig receiving station as defined in claim 21, wherein the pig ramp includes a frame portion having an outer diameter that is substantially similar to an inner diameter of the bore of the pig receiver, the frame portion being positioned proximate the outlet and having an inner diameter larger than an outer diameter of the pig.

* * * * *